US012771406B2

(12) United States Patent
Lafontaine et al.

(10) Patent No.: US 12,771,406 B2
(45) Date of Patent: Oct. 20, 2026

(54) SYSTEM AND METHOD FOR COHERENT ARRAYING OF SIGNALS TRANSMITTED FROM A SWARM OF MOBILE PLATFORMS LIKE SMALL SATELLITES

(71) Applicant: TELTRIUM, Inc., Greenbelt, MD (US)

(72) Inventors: Richard Lafontaine, Bethesda, MD (US); Theodore Benjamin, Vienna, VA (US); Yiru Zhou, Potomac, MD (US)

(73) Assignee: Teltrium, Inc., Greenbelt, MD (US)

( * ) Notice: Subject to any disclaimer, the term of this patent is extended or adjusted under 35 U.S.C. 154(b) by 125 days.

(21) Appl. No.: 18/645,543

(22) Filed: Apr. 25, 2024

(65) Prior Publication Data

US 2025/0385712 A1 Dec. 18, 2025

Related U.S. Application Data

(60) Provisional application No. 63/498,146, filed on Apr. 25, 2023.

(51) Int. Cl.

*H04B 7/024* (2017.01)
*H04B 7/08* (2006.01)
*H04L 5/00* (2006.01)

(52) U.S. Cl.

CPC ........... *H04B 7/024* (2013.01); *H04B 7/0854* (2013.01); *H04L 5/0048* (2013.01)

(58) Field of Classification Search

CPC ...... H04B 7/024; H04B 7/0854; H04L 5/0048
See application file for complete search history.

(56) References Cited

U.S. PATENT DOCUMENTS

2011/0275308 A1* 11/2011 Grobert .................... H04K 3/42 455/1
2019/0074893 A1* 3/2019 Kaen ........................ H04B 7/19
2021/0253276 A1* 8/2021 Halperin .............. B64G 1/1007
2023/0370155 A1* 11/2023 VanderMeulen .. H04B 7/18517

* cited by examiner

*Primary Examiner* — David S Huang

(74) *Attorney, Agent, or Firm* — Rosenberg, Klein & Lee

(57) ABSTRACT

Swarm Array Coherent Combining (SACC) system utilizes Destination-Based Arraying of individual signals transmitted from nodes arranged in a swarm, where nodes are not burdened with the precise timing and phasing pre-conditioning. The SACC system achieves this objective via an initial Beacon/Preamble signal structure and format that quickly starts the process of closed-loop tracking of the carrier and captures fine signal timing to align the nodes' signals for the coherent summing, and a feedback/correlation scheme that "extracts" each individual node channel signal from being buried in noise to enable closed-loop carrier tracking of the individual nodes' signals, thereby accounting for the ongoing differential Doppler across nodes that would otherwise preclude coherent combining operations.

29 Claims, 71 Drawing Sheets zynqRadioPN_Param_init.m X +

```
function SimParams = zynqRadioPN_Param_init()
% ========================================================%
% --------------PN ACQUISITION PARAMETERS----------------------------%
% ========================================================%

%SimParams.PN_Bitlength = 4000;
%SimParams.PN_Sequence_Polonominal = 'z^12 + z^11 + z^8 + z^6 + 1'; % 4095 Polynominal

SimParams.PN_Bitlength = 10;
SimParams.PN_Sequence_Polonominal = 'z^4 + z^3 + 1'; % 15 Polynominal


SimParams.PN_Sequence_Order = max(str2double(regexp(SimParams.PN_Sequence_Polonominal, ' \d* ' , 'Match ' ) ) ) ;
SimParams.PN_Sequence_INIT = zeros(1, SimParams.PN_Sequence_Order);
SimParams.PN_Sequence_INIT (1, end) = 1;

pnSequence = comm.PNSequence( " Polynomial " , SimParams.PN_Sequence_Polonominal) ;
pnSequence.VariableSizeOutput = true;
pnSequence.InitialConditions = SimParams.PN_Sequence_INIT;

%TODO research if we shall instead truncate the beginning of the sequence
SimParams.PN_Sequence_binary = pnSequence(SimParams.PN_Bitlength);
SimParams.PN_Sequence_Halfcode_binary = repelem(SimParams.PN_Sequence_binary, 2);


SimParams.AcquisitionMask_Ratio = 2;
SimParams.HalfChips_Length = SimParams.PN_Bitlength * 2;
SimParams.AcqusitionMask_Length = SimParams.HalfChips_Length/SimParams.AcquisitionMask_Ratio;

SimParams.Correlation_Peak_Threshold = 0.8; %Number TBD
SimParams.Correlation_Timeout = 20; %Number TBD
% ========================================================%
% --------------PN TRACKING PARAMETERS----------------------------%
% ========================================================%

% TDRSS STGT Document - Table 4-10 (Page 211/Page 4-44) MAR DG1 Mode 1 selected
SimParams.Trck_LoopFilter_Alpha = 0.00903320;
SimParams.Trck_LoopFilter_Beta = 0.00122070;
SimParams.Trck_Idx            = 3; % For Early, On Time, and Late
SimParams.Trck_Fs             = 1e6;
SimParams.Trck_PNSequence     = repelem(SimParams.PN_Sequence_binary, 6);
```

*FIG. 16*

```
    %% FOR DISRIMINATOR
InPNseq         = length(PN_Sequence_Tracking);
Shift           = ON_Time_PN_Old_Idx + 1;
Strt            = Shift(1) - PN_Sampling_Rate_Ratio/2 - 1;
Array           = mod(Strt:1nPNseq+Strt - 1 + PN_Sampling_Rate_Ratio,InPNseq) + 1;
PN_OT_Idx       = Array(PN_Sampling_Rate_Ratio/2 + 1);
PN_OT           = PN_Sequence_Tracking(PN_OT_Idx);
PN_Erly_Idx     = Array(1);
PN_Erly         = PN_Sequence_Tracking(PN_Erly_Idx);
PN_Late_Idx     = Array(PN_Sampling_Rate_Ratio + 1);
PN_Late         = PN_Sequence_Tracking(PN_Late_Idx);
PN_Erly         = fi (PN_Erly,1,16,14);
PN_OT           = fi (PN_OT,1,16,14);
PN_Late         = fi(PN_Late,1,16,14);
PN_Erly_Idx     = int16 (PN_Erly_Idx);
PN_Late_Idx     = int16 (PN_Late_Idx);
PN_OT_Idx       = int16 (PN_OT_Idx);
```

*FIG. 28*

```
%% MAPPING LOOP ERROR
%% SHIFT RIGHT

if LoopFilterError > fi(0.09065,1,27,10) && LoopFilterError <= fi(2.81111, 1, 27, 10)    && Delta_Error ~= fi(0, 1, 27,10)
    % if LoopFilterError > 1.32 && LoopFilterError <= 4.2 && Delta_Error ~= fi(0, 1, 27,10)
    Shift                = Step - 1;
    Strt                 = int16(Shift - Half_Ratio - 1);
    if(Strt + 1 >lnPNseq) || (Strt + 1 <= 0) %% PN_Erly_Idx = mod(Strt,lnPNseq) + 1;
        PN_Erly_Idx = abs(1nPNseq - abs(Strt)) + 1; %% calculate element in next sequence
    else
        PN_Erly_Idx = Strt + 1;
    end
    if(Strt + Half_Ratio + 1 >lnPNseq) || (Strt + Half_Ratio + 1 <= 0) %% PN_Erly_Idx = mod(Strt, lnPNseq) + 1;
        PN_OT_Idx          = abs(lnPNseq - (Strt + Half_Ratio + 1)) ; %% calculate element in next sequence
    else
        PN_OT_Idx          = Strt + Half_Ratio + 1;
    end
    if(Strt + PN_Sampling_Rate_Ratio + 1 >lnPNseq) || (Strt + PN_Sampling_Rate_Ratio + 1 <= 0) %% PN_Erly_Idx = mod(Strt, lnPNseq) + 1;
        PN_Late_Idx = abs(lnPNseq - abs(Strt + PN_Sampling_Rate_Ratio)) + 1; %% calculate element in next sequence
    else
        PN_Late_Idx        = Strt + PN_Sampling_Rate_Ratio + 1;
    end
    PN OT              = PN_Sequence_Tracking(PN_OT_Idx);
    PN_Erly            = PN~Sequence_Tracking(PN_Erly_Idx);
    PN_Late            = PN_Sequence_Tracking(PN_Late_Idx);
elseif LoopFilterError > fi (2.8111,1, 27, 10) && Delta_Error ~= fi(0, 1, 27, 10)

    % elseif LoopFilterError > 4.2 && Delta_Error ~= fi(0, 1 , 27,10)
    Shift              = Step - 2;
    Strt               = int16(Shift - Half_Ratio - 1);
    if(Strt + 1 >lnPNseq) || (Strt + 1 <= 0) %% PN_Erly_Idx = mod(Strt, lnPNseq) + 1;
        PN_Erly_Idx    = abs(lnPNseq - abs(Strt)) + 1; %% calculate element in next sequence
    else
        PN_Erly_Idx = Strt + 1;
    end
    if(Strt + Half_Ratio + 1 >lnPNseq) || (Strt + Half_Ratio + 1 <= 0) %% PN_Erly_Idx = mod(Strt, lnPNseq) + 1;
        PN_OT_Idx      = abs(lnPNseq - (Strt + Half_Ratio + 1)) ; %% calculate element in next sequence
    else
        PN_OT_Idx    = Strt + Half_Ratio + 1;
    end
    if(Strt + PN_Sampling_Rate_Ratio + 1 >lnPNseq) || (Strt + PN_Sampling_Rate_Ratio + 1 <=0) %% PN_Erly_Idx = mod(Strt, lnPNseq) + 1;
        PN_Late_Idx = abs(lnPNseq - abs(Strt + PN_Sampling_Rate_Ratio)) + 1; %% calculate element in next sequence
    end
    PN_OT              = PN_Sequence_Tracking(PN_OT_Idx);
    PN_Erly            = PN_Sequence_Tracking(PN_Erly_Idx);
    PN_Late            = PN_Sequence_Tracking(PN_Late_Idx);
```

*FIG. 30*

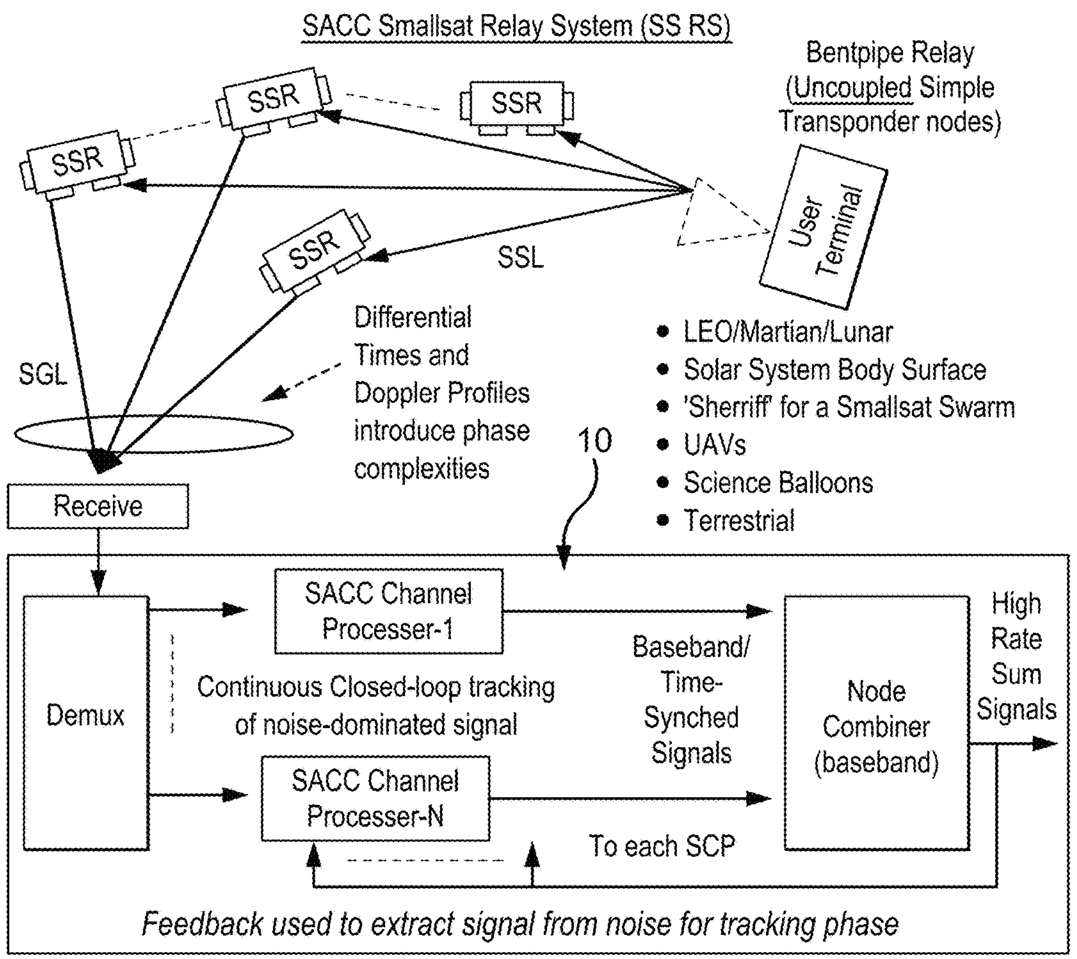

Key Unique Features

- Places no burden on space nodes — simple transponder
- No coupling or coordinated required among nodes within a the swarm
- No need for e 'Sheriff or -'Mothership'
- All tracking done autonomously without calibration or pre-known user ephemeris
- In particular, the SSRS inherently supports replenishment and enhancements when nodes are added or replaced by simple GT SCP changes/additions
- SSRS is a realizable and cost effective solution for what was term 'Fractionated Architecture' under the 2013 NASA Multi-Center 'Space Based Relay Study (SBRS)

Wide-Ranging Benefits of a large Spaced-Based Phased-Array for Data Relay:

- Phased Array has been playing a major role for Space Relay such as the TDRSS MA Phased Array which has been supporting NASA Comm for > 35 years
- Individual antenna elements that are small and thus have a wide Field of View to service a large spatial area of users
- By appropriately phase adjusting the elements, a highly directive sum signal beam is formed electronically

*FIG. 39*

SYSTEM AND METHOD FOR COHERENT ARRAYING OF SIGNALS TRANSMITTED FROM A SWARM OF MOBILE PLATFORMS LIKE SMALL SATELLITES

REFERENCE TO RELATED PATENT APPLICATION(S)

This Utility Patent Application is based on a Provisional Patent Application Ser. No. 63/498,146 filed on 25 Apr. 2023.

FIELD OF THE INVENTION

The present invention is directed to signal processing, and in particular, to producing of a coherent combined signal from individual signals transmitted from small mobile independent transmitters or nodes, such as, for example, small satellites (also referred to herein as "smallsats") or Unmanned Airborne Vehicles (UAV's), flying in a group or a swarm.

More in particular, the present invention addresses a novel concept of arraying individual signals transmitted from a swarm (the source) utilizing signal processing at its destination to array and extract individual phasing and timing for coherent combining.

The subject invention is directed to a Destination-Based Arraying of individual signals transmitted from nodes arranged in a swarm, where the nodes are "uncoupled" from each other and are not burdened with the precise timing and phasing pre-conditioning of the transmitted signals, thus relieving the nodes from signals synchronization and coordination complexities, as well as from intra-swarm frequency and time coordination.

The present invention also addresses a concept of the "Destination-Based Arraying" (DBA) supported by the novel signal arraying "Swarm Array Coherent Combining" (SACC) system which attains critical and wide-ranging benefits in (a) the nodes simplification, (b) expanding relay system architecture possibilities, and (c) overall operational flexibility/robustness through "uncoupling" each node channel signal from each other and permitting significantly relaxed time, frequency, and phase requirements of the nodes' transmissions.

Moreover, the subject invention is directed to the SACC system which supports the multiplexing of the transmitted signals from the nodes, so that the multiplexed signal are subsequently demuxed and individually processed at the SACC destination receiver using unique Beacon/Preamble signaling and feedback correlation to support carrier tracking of noise buried in the node signals.

The subject invention also addresses the approach which diminishes, or eliminates, the problems associated with the fact that an individual signal transmitted from a corresponding node is buried in noise at a nominal swarm high data rate, and that the individual signal exhibits ongoing differential Doppler profiles that complicates the end goal of phase-coherent combining of the individual signals transmitted from each node. The subject novel destination-based signal processing scheme supports a continuous closed-loop phase tracking for the signals transmitted from each node, despite being buried in noise. This approach then enables a coherent combining of the nodes transmitted signals with phase-offsets of less than 10°, thereby forming a high-SNR sum signal that can be subsequently demodulated and recovered. The SACC system achieves this objective via the use of an innovative (a) initial Beacon/Preamble signal structure and format that quickly starts the process of closed-loop tracking of the carrier and captures fine signal timing to align the node signals for the coherent summing, and (b) signal feedback/correlation scheme that "extracts" each individual signal from being buried in noise to enable closed-loop carrier tracking of the individual signals from each node, thereby accounting for the ongoing differential Doppler across nodes that would otherwise preclude coherent combining operations.

Furthermore, the present invention provides the novel operationally and architecturally robust SACC system, which is readily implementable with current technology, and which places a minimal technical burden on the individual swarm nodes and on the swarm as a whole, and which provides the basis for the novel "SACC Smallsat Relay System" (SSRS) concept that deploys uncoupled simple smallsat transponders to attain a large Phased Array in space for efficient communications relay.

Even further, the present invention is directed to the "SACC Smallsat Relay System" (SSRS), where no calibration of any link is required (even including crosslinks which are easily accommodated in the SSRS context), and where the SACC/SSRS system can serve as a basis for a robust data relay concept for ubiquitous deployment from unmanned aerial vehicles (UAVs) to LEO and beyond to Deep Space.

BACKGROUND OF THE INVENTION

Over the last several years, the satellite landscape has seen the vast emergence of satellites decreasing in dimensions, which are generically refered to herein as "small satellites", or "smallsats". The small satellite designs offer numerous benefits not only for new scientifical approach, but also for reduced mission costs and increased mission robustness.

Smallsats offer significant potential for relatively inexpensive, rapid deployment and robust space operations, communications, science, etc. However, these smallsats are inherently power-limited and are correspondingly limited in their data rate capabilities over long distances. Accordingly, there is an increasing interest in leveraging the smallsats to perform cooperatively in a swarm to relay high-rate communications to end-receivers, wherein each smallsat (also referred to herein as a "node") would transmit its individual signal that is subsequently "arrayed" together to form a combined signal that has more power and achieves a higher effective data rate.

Historically, communications relay satellites have been designed as large monolithic and costly enterprises, such as the Mars Reconnaissance Orbiter (MRO). For example, the Jet Propulsion Laboratory (JPL) has studied the benefits of using a smallsat swarm around Mars to cooperatively transmit a high-rate downlink and compare this downlink with the MRO downlink. Since each individual smallsat signal is inherently "weak", the goal is to carefully combine (also referred to herein as to array) these individual signals to form a single combined "strong" signal with high Signal-to-Noise Ratio (SNR) to enable viable receiver processing of high data rates.

The traditional concept for the array combining, which is referred to herein as "Spaced-Based Arraying" (SBA), has been studied for more than two decades. The SBA approach has been based on the open-loop transmission of signals in precise time/phase synchronization with all other smallsats emitting signals so that the signals arrive at the end-receiver mutually "self-aligned" (or tuned) in phase and time. Specifically, in accordance with the traditional SBA approach, each node's signal is carefully pre-conditioned in phase and time at the smallsat's transmitter, such that all signals arrive at the receiver coherently (i.e., in near perfect phase alignment with less than 10°-20° differential).

The signal SBA-based fine-tuning is very burdensome and problematic for the space smallsat node, as it requires extensive, complex, coordinated, and ongoing signal conditioning at each node emitter prior to transmission, in addition to precise ephemeris knowledge and prediction. The SBA approach, thus, causes severe burdens on each smallsat/node, as well as on the swarm in its entirety. As a matter of fact, the SBA-based approach has been never implemented and seems problematic in terms of the accuracies required and also of the ability to sufficiently compensate for the differential/time-varying Doppler frequencies and random phases introduced at the end receiver.

Therefore, it would be highly desirable to provide a signal arraying approach for swarm smallsats and to all moving platforms, such as, for example, UAVs or airplanes, (which may be further referred to herein as nodes), which would effectively eliminate the SBA-based space nodes "burdening" with synchronization and coordination complexities.

SUMMARY OF THE INVENTION

It is, therefore, an objective of the present invention to provide a novel concept of forming a combined signal by arraying individual signals transmitted from a swarm of smallsats, UAVs, airplanes, or any other moving platform, utilizing a Destination-Based Arraying (DBA) approach which uses signal processing, at its destination, to extract an individual signal phasing and timing for a coherent combining.

It is another objective of the present invention to provide the signal 'arraying' operation in a way that effectively eliminates the prior SBA-based node synchronization and coordination complexities by implementing the subject "Destination-Based Arraying" (DBA) supported by an innovative arraying system, referred to herein as the "Swarm Array Coherent Combining" (SACC), which utilizes a destination terminal processing of the signal to extract the nodes' phasing and timing for coherent combining so that each node signal could be 'uncoupled' from each other and be alleviated of the precise time and phase requirements.

It is a further objective of the present invention to provide a concept of the "Destination-Based Arraying" (DBA) supported by the novel signal arraying "Swarm Array Coherent Combining" (SACC) system which attains critical and wide-ranging benefits in (a) source node simplification, (b) expanding relay system architecture possibilities, and (c) overall operational flexibility/robustness through "uncoupling" each node channel signal from each other and permitting significantly relaxed time, frequency, and phase requirements of the nodes' transmissions.

Another objective of the subject invention accords with the operational principles of the SACC system which supports the multiplexing of the transmitted signals, so that the multiplexed signal are subsequently demuxed and individually processed at the SACC destination receiver using unique Beacon/Preamble signaling and feedback correlation to support carrier tracking of noise buried in the node signals.

A further objective of the present invention is to provide the novel operationally and architecturally robust SACC system, which is readily implementable with current technology, and which places a minimal technical burden on the individual swarm nodes and on the swarm as a whole, and which provides the basis for the novel "SACC Smallsat Relay System" (SSRS) concept that deploys uncoupled simple smallsat transponders to attain a large Phased Array in space for efficient communications relay.

An additional objective of the present invention is to provide the novel satellite relay concept (also referred to herein as the pseudo, or virtual, space phased array), or the "SACC Smallsat Relay System" (SSRS), which may offer the benefits of a large Phased Array in space by merely using a swarm of simple and 'uncoupled' smallsat transponder nodes, which need neither a precise intra-swarm frequency nor an accurate time coordination.

Furthermore, it is an objective of the present invention to provide a novel "SACC Smallsat Relay System" (SSRS) arising from the "Swarm Array Coherent Combining" (SACC) system, where the SSRS system incorporates a swarm of uncoupled smallsats nodes (which may be considered similar to simple transponders), which effectively act as elements of a large Space Phased Array that provide the standard N-fold gain and a wide field-of-view with all phase alignments or tuning being performed by the SACC destination receiver, for example, a Ground Terminal (GT) receiver, without needing precise node ephemeris knowledge but still accounting for the differential node-Doppler time profiles.

Still another objective of the present invention is to provide a novel "SACC Smallsat Relay System" (SSRS), where no calibration of any links is required (even including crosslinks which are easily accommodated in the SSRS context), and where the SACC/SSRS system can serve a basis for a robust data relay concept for ubiquitous deployment from unmanned aerial vehicles (UAVs) to LEO and beyond to Deep Space.

In one aspect, the present invention constitutes a system for coherent combining of signals transmitted from each node arranged in a swarm. The subject swarm array coherent combining (SACC) system is configured for Destination-Based Arraying (DBA) of a plurality of individual signals transmitted from a plurality of nodes arranged in a swarm. The SACC system includes a receiver and a Radio-Frequency Link (RFL) operatively coupled between a plurality of nodes and the destination receiver. The RFL supports transmission of a plurality of individual signals from the plurality of nodes to the destination receiver over a plurality of node channels, where each node channel is associated with a respective node.

The destination receiver is configured for processing of the plurality of individual signals transmitted from the plurality of nodes to extract a phasing and timing of each individual signal for subsequent coherent combining of the plurality of individual signals transmitted by the plurality of bodes.

The SACC system also includes a Beacon signal structure incorporated in each individual signal at the beginning of the transmission from a respective node. The RFL is configured to multiplex the plurality of individual signals transmitted from the plurality of nodes. The destination receiver is configured to demultiplex the multiplexed individual signals and to individually process each demultiplexed individual signal received at the destination receiver using the Beacon signal structure.

The destination receiver further includes a closed-loop phase tracking sub-system operatively coupled to each demultiplexed individual signal received at the destination receiver for continuous closed-loop phase tracking of each demultiplexed individual signal. The closed-loop phase tracking is being coordinated with the Beacon signal structure.

Each individual signal is buried in noise and is exposed to ongoing differential Doppler profile. To address these issues, the present SACC system further comprises a signal feedback/correlation sub-subsystem included in the destination receiver in operative coupling to the closed-loop phase tracking sub-system. The signal feedback/correlation sub-system is configured to extract each individual signal from noise to enable the closed-loop carrier tracking of each individual signal to account for the ongoing differential Doppler profile.

Each individual signal includes a Beacon signal structure and a Mission Data phase. The Beacon signal structure is transmitted at the beginning of the Mission Data phase. The Beacon signal structure is configured with a Preamble phase having a PN (Pseudo-Noise) code and low rate data, a Transition A phase following the Preamble phase, and a Transition B phase following the Transition A phase.

A Beacon Demodulator (BD) Processing Sub-System embedded in, or operatively associated with, the destination receiver operates to demodulate the Beacon signal structure by closed loop tracking of the PN code and low rate data of the Preamble Phase of the Beacon signal structure to obtain an end time Tp of the Preamble Phase of the Beacon signal structure of each individual signal. At the end time Tp of the Preamble Phase, the plurality of individual signals are at baseband, thus being coherent and time synchronized for subsequent combining.

The subject SACC system further utilizes a plurality of delay buffers, each delay buffer associated with a respective node channel. The destination receiver operates to store, subsequent to the end time Tp of the Preamble Phase of each individual signal, incoming signal samples of each individual signal in the delay buffer associated with the respective node channel until a receipt of the plurality of individual signals transmitted by the plurality of nodes and storing thereof in the plurality of delay buffers has been completed, and to process, in a coordinated fashion, contents of the plurality of delay buffers.

The SACC system further includes a plurality of SACC Channel Processor (SCP) incorporated in the destination receiver, where each SCP corresponds to a respective one of the plurality of nodes channels, an Array Combiner Processing Sub-System operatively coupled to outputs of the plurality of SCPs, and a Swarm Demodulator (SD) Processing Sub-System operatively coupled to an output of the Array Combiner Processing Sub-System. Each SCP of the destination receiver is configured to, subsequent to completing the processing of the Preamble Phase and storing the incoming signal samples arriving after the Preamble Phase of the individual signals in the plurality of delay buffers, perform the Transition A phase processing by continuing the Beacon Signal demodulation by the closed-loop carrier tracking sub-system, and to send the tracked carriers of the plurality of node channels obtained in the Transition A phase to an input of the Array Combiner Processing Sub-System to obtain an Arrayed Combined Signal, and to supply the Array Combined Signal from the output of the Array Combiner Processing Sub-System to an input of the SD Processing Sub-System.

The SD Processing Sub-System is configured to process the Arrayed Combined Signal to output Recovered Swarm demodulated symbols, including a Recovered Mission Code and a Recovered Symbol Clock. The Feedback/Correlation Processing Sub-System feedback the Recovered Mission Code and Recovered Symbol Clock from the SD Processing Sub-System to the plurality of SCPs to correlate each individual signal's Mission Data phase for being extracted from noise and for tracking each individual signal.

The BD Processing Sub-System processes the respective individual signal, to detect its presence through acquisition of the PN code, and to demodulate the Preamble Phase of the respective individual signal for initiating the closed-loop phase tracking to be performed through the Preamble Phase, Transition A and Transition B phases, and Mission Data Phase.

The Feedback/Correlation Processing Sub-System is operatively coupled between the BD Processing Sub-System and the SCPs, and preferably includes a Feedback Correlator (FC) Processing Sub-System operatively coupled to an output of the SD Processing Sub-System to receive therefrom the Recovered Mission Code Symbols and Recovered signal clock for correlation the Recovered Swarm Demodulated Symbols with delayed noisy node samples over duration of accumulation of N symbol, thus producing a correlation combined signal having a sufficient SNR (signal-to-noise ratio), and a Feedback Carrier Loop (FCL) Processing Sub-System operatively coupled to the FC Processing Sub-System to receive therefrom the correlation combined signal having SNR sufficient to drive the closed-loop carrier tracking of each individual node signal.

The destination receiver further comprises:

a Front-End Phase Tuner (FT) operatively coupled between a Front end Receiver of the SCP and the FC/FCL Processing Sub-Systems. The FT Processing Sub-System is configured to mix each individual signal to create I and Q signals for a delay and feedback correlation at the FC Processing Sub-System prior to feedback carrier tracking at the FCL Processing Sub-System.

The destination receiver further includes a SACC Integrated Receiver (S_IR) embedded in each SCP. The SACC S_IR includes a SACC GT Executive Timer (ET) coupled to the plurality of SPC's, with the SACC ET being configured to monitor precise Mission Data phase start time for each individual signal transmitted by the respective node in accordance to the end-time Tp and a predetermined duration of the Transition A and Transition B phases, and an Individual Channel Buffering Correction Sub-System operatively coupled to the SACC ET and between the Front-End Receiver and Array Combiner Processing Sub-System. The Individual Channel Buffering Correction Sub-System may be configured for up-front buffering, in accordance with notifications from the SACC ET, to account for differential arrival time of the individual signals transmitted by the plurality of nodes.

A Polarity Stripping Processing Sub-System is integrated with the SACC S_IR. The Polarity Stripping Processing Sub-System may be configured to process the Combined Signal recovered at the output of the Array Combiner Processing Sub-System, and to make a hard decision on a polarity of the Mission Data in accordance with the Combined Signal by adding together a predetermined number of polarity-striped Mission Symbols to obtain an SNR equivalent to that a single Preamble symbol provides for a successful tracking during the Beacon phase.

In another aspect, the present invention addresses a method for coherent combining of signals transmitted from nodes, such as, for example, satellites, or UAVs, etc., arranged in a swarm. The subject method includes the steps of:

Step A, establishing a swarm array coherent combining (SACC) system configured for Destination-Based Arraying (DBA) of signals transmitted from nodes arranged in a swarm, where the SACC system is designed with a destination receiver, and an RF Link (RFL) operatively coupled between the plurality of nodes and the destination receiver for conveying a plurality of individual signals over a plurality of node channels, with each individual signal being transmitted by a respective node over a respective node channel to the destination receiver;

Step B, transmitting the plurality of individual signals in multiplexed fashion;

Step C, receiving the multiplexed individual signals at the GT receiver; and

Step D, demultiplexing and processing each individual signal at the destination receiver to extract a phasing and timing of each individual signal for subsequent coherent combining of the plurality of individual signals transmitted by the plurality of nodes.

Each individual signal is buried in noise and is exposed to ongoing differential Doppler profile. These problems are addressed in the present method by configuring the destination receiver with a closed-loop phase tracking subsystem operatively coupled to each demultiplexed individual signal for continuous closed-loop phase tracking of each individual signal, and a signal Feedback/Correlation Processing Sub-Subsystem included in the destination receiver in operative coupling to the closed-loop phase tracking sub-system, where the signal Feedback/Correlation Processing Sub-System is configured to extract each individual signal from noise to enable the closed-loop carrier tracking sub-system of each individual signal, thereby accounting for the ongoing differential Doppler profile.

In the present method, each individual signal includes a Beacon Signal and a Mission Data phase. In step (B), the Beacon signal is transmitted at the beginning of the Mission Data phase. The Beacon signal includes a Preamble phase having a PN (Pseudo-Noise) code and low rate data, a Transition A phase following the Preamble phase, and Transition B phase following the Transition A phase. In step (D), the destination receiver starts the Beacon Signal demodulation by closed loop tracking of the PN code and low rate data of the Preamble Phase to obtain an end time Tp of the Preamble Phase of the Beacon signal. At the end time Tp of the Preamble Phase, the plurality of individual signals are at baseband, thus being coherent and time synchronized for subsequent combining.

In the present method, in step (A), each node channel is provided with a respective delay buffer, and in step (D), subsequent to the end time Tp of the Preamble Phase of each individual signal, incoming signal samples of each individual signal are stored in a respective delay buffer until a receipt of the plurality of individual signals transmitted by the plurality of nodes and their storing in the respective delay buffers have been completed. Subsequently, the contents of the plurality of respective delay buffers are processed in a coordinated fashion by the destination receiver.

The subject method also include the following operations:

in step (A), configuring the destination receiver with a plurality of SACC Channel Processors (SCPs), each SCP corresponding to a respective one of the plurality of node channels, operatively coupling an Array Combiner Processing Sub-System to an output of each SCP, and operatively coupling a Swarm Demodulator (SD) Processing Sub-System to an output of the Array Combiner Processing Sub-System; and in step (D), subsequent to completing the processing of the Preamble Phase and storing the individual signals in their respective delay buffers, performing the Transition A phase processing by continuing the Beacon Signal demodulation by continuous closed-loop carrier tracking, and sending the tracked carrier of the plurality of node channels obtained in the Transition A phase to an input of the Array Combiner Processing Sub-System to obtain an Arrayed Combined Signal, and coupling the Arrayed Combined Signal from the output of the Array Combiner Processing Sub-System to an input of the SD Processing Sub-System.

The SD processing Sub-System is configured to process the Arrayed Combined Signal and to generate a Recovered Swarm demodulated symbols, including a Recovered Mission Code and a Recovered Symbol Clock, and to feedback the Recovered Mission Code and Recovered Symbol Clock to plurality of SCPs to correlate each individual signal's Mission Data for being extracted from noise and for tracking each individual signal channel.

The subject method also comprises:

in step (A), configuring the Feedback/Correlation Processing Sub-System with a Feedback Correlator (FC) Processing Sub-System operatively coupled to an input of the SD Processing Sub-System to receive therefrom the Recovered Mission Code Symbols and Recovered signal clock for correlation to produce a correlation combined signal having a sufficient SNR (signal-to-noise ratio), and a Feedback Carrier Loop (FCL) Processing Sub-System operatively coupled to the FC Processing Sub-System to receive therefrom the correlation combined signal having the SNR sufficient to drive the closed-loop carrier tracking of each node's individual signal.

In addition, in step (A), a Front-End Phase Tuner (FT) is coupled between a Front end Receiver of the SCP and the FC/FCL Processing Sub-Systems, where the FT Processing Sub-System is configured to mix individual signals to create I and Q components thereof for a delay and feedback correlation at the FC Processing Sub-System prior to feedback carrier tracking at the FCL Processing Sub-System.

The subject method is further supported by operatively coupling SACC receiver Executive Timer (ET) to the plurality of SPC's, where the SACC ET is configured to monitor precise Mission Data phase start time for each individual signal transmitted by a respective node in accordance to the end-time Tp and a predetermined duration of the Transition A at Transition B phases, and notifying each SCP an amount of delay buffering needed prior to sending each processed individual signal from the respective delay buffer to the Array Combiner Processing Sub-System.

An Individual Channel Buffering Correction Sub-System is operatively coupled to the SACC receiver ET and between the Front-End Receiver and the Array Combiner Processing Sub-System. The Individual Channel Buffering Correction Sub-System operates for upfront buffering, in accordance with notifications from the SACC receiver ET, to account for differential arrival times of the individual signals transmitted by the plurality of nodes.

Furthermore, in step (A), a SACC Integrated Receiver (S_IR) is embedded in each SCP, and the SACC receiver ET, the Individual Channel Buffering Correction Sub-System and a Polarity Stripping Processing Sub-System are embedded in the SACC S_IR. The SACC S_IR operates intermittently in Mode 1 corresponding to the Beacon Signal including the Preamble Phase and the Transition A and Transition B phases, and in Mode 2 corresponding to the Mission Data Phase, In the Mode 2, the Arrayed Combined Signal at the output of the Array Combiner Processing Sub-System is recovered, and a hard decision is made on a polarity of the Mission Data in accordance with the Arrayed Combined Signal by adding a predetermined number of polarity-striped Mission Symbols to obtain an SNR equivalent to that a single Preamble symbol provides for a successful tracking during the Beacon phase.

In the Mode 1, the PN Tracking Processing Sub-System operates to track PN code acquired by the PN Acquisition Processing Sub-System, and recover Preamble Data from the Beacon signal of the individual signal,

- despread the tracked PN code obtained by the PN Tracking Processing Sub-System, and
- submitting a despread tracked PN code of the PN Tracking Processing Sub-System to the Carrier Tracking Processing Sub-System to eliminate carrier offset caused by differential Doppler profile.

The subject system further addresses a SACC Relay System (SRS) where the principles of the subject SACC system can be utilized. The SRS includes a plurality of uncoupled transponders, each transponder being configured to receive and transmit an individual signal, where a plurality of individual signals from the transponders are multiplexed and received at the Front-End Receiver similar to the subject SACC system. The received multiplexed individual signals are demultiplexed, and each demultiplexed individual signal is subsequently processed through a respective SACC Channel Processor and is continuously closed-loop tracked to obtain baseband and time-synchronized signals. The baseband and time-synchronized signals are combined at the signal combiner to recover a high rate combined signal, and the recovered high rate combined signal is feedback to each SCP, resulting in extraction of the individual signals from noise.

These and other objectives and advantages of the present invention will become more apparent when considered in view of further description of the Preferred Embodiment(s) with the accompanying Patent Drawings.

BRIEF DESCRIPTION OF THE DRAWINGS

FIGS. 5-1, 5-2, 5-3, 5-4, 5-5, 5-6, 5-7, and 5-8 are partial views arranged as shown in FIG. 5 and illustrate one of the embodiments of an S_IR configurations with Upfront Buffering to Account for Differential Node Arrival Times with the partial views being collectively referenced as FIG. 5;

FIG. 6 is representative of the subject Buffering required to account for different node arrival times;

FIG. 7 is representative of the SACC Tracking Loop Update;

FIG. 8 depicts the subject Clocking Structure/Analysis;

FIGS. 10-1, 10-2, 10-3, 10-4, 10-5, 10-6, 10-7, and 10-8 are partial views arranged as shown in FIG. 10 and depict the subject SACC S_IR Areas of Focus on Data Polarity Ops with the partial views being collectively referenced as FIG. 10;

FIG. 16 shows the PN Acquisition and PN Tracking Parameters Configuration File in MATLAB;

FIGS. 25-1, 25-2, 25-3, and 25-4 are partial views arranged as shown in FIG. 25 and depict a diagram of the SACC Preamble Integrated Receiver Design Modeling with the partial views being collectively referenced as FIG. 25;

FIG. 28 shows the MATLAB Script for Discrimination Function;

FIG. 30 shows the MATLAB Script for PN Early and Late Samples Update;

DESCRIPTION OF THE PREFERRED EMBODIMENT(S)

Figure 1A:
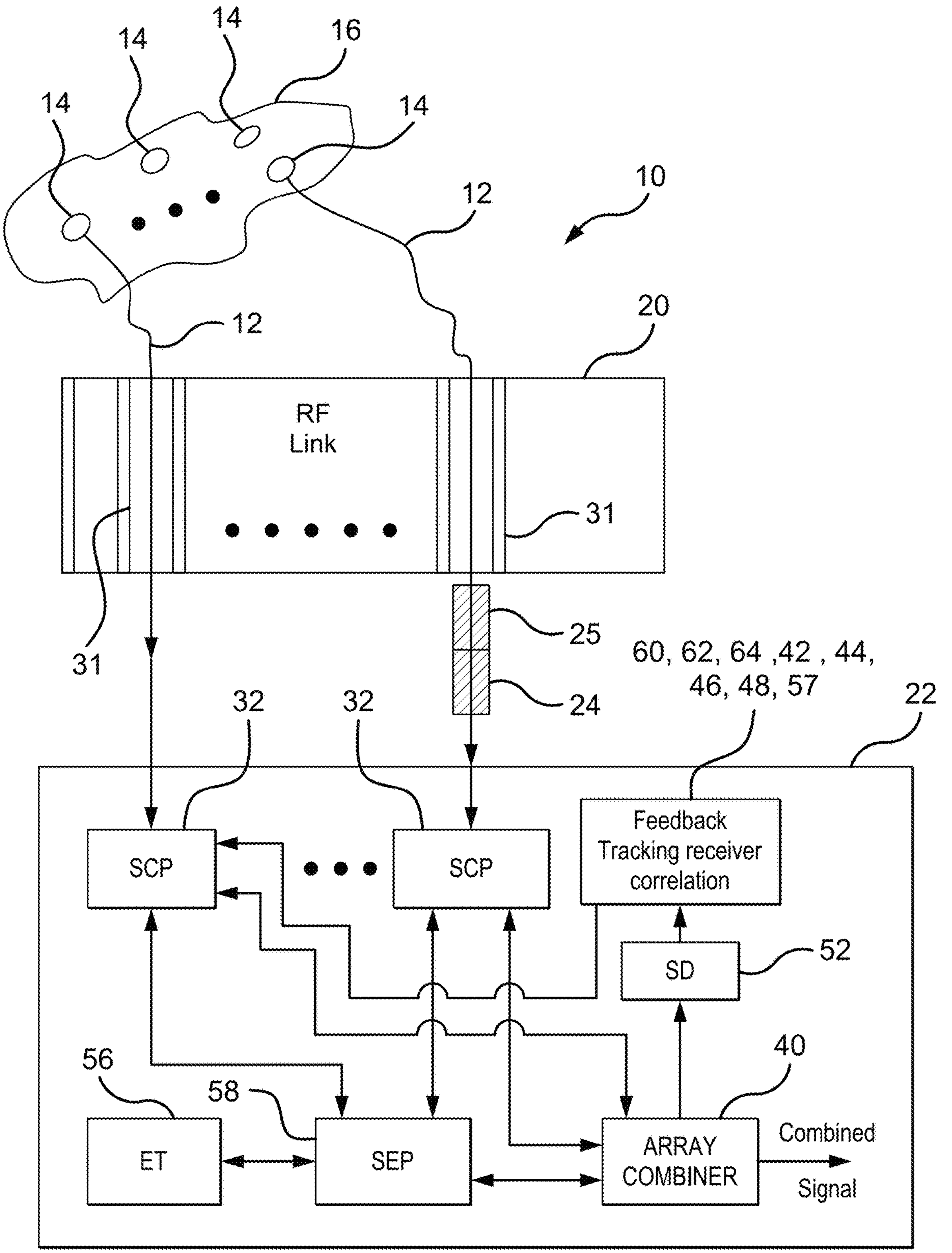
FIG. 1A shows, in a simplified format, the principles of operation of the subject SACC system.

Referring to FIGS. 1A-1B and 2-39, such depict the subject Swarm Array Coherent Combining (SACC) system 10 which has been designed to perform the Destination-Based Arraying (DBA) of signals 12, which in satellite applications, may be referred to herein as a Ground-Based Arraying (GBA). Each signal 12 is individually transmitted by a respective node 14. The nodes 14 offer significant potential for relatively inexpensive, rapid deployment and robust space operations, communications, science, etc. However, the nodes are inherently power-limited and are correspondingly limited in their data rate capabilities over long distances. For this reason, it is a highly promising approach to arrange the nodes 14 in a swarm 16 and to combine the transmitted individual signals 12 to perform cooperatively to relay high-rate communications to an end-receiver.

One of the main objectives of the subject SACC system 10 is to support the Destination-Based Arraying (DBA) approach, i.e., the DBA that would shift much, if not all, of the burden from the swarm nodes 14 to the destination-based (for example, ground-based for satellite application) processing. FIG. 1A depicts, in a simplified format, the unique approach underlying the operation of the present SACC system 10 where the individual signals 12 transmitted from the nodes 14 via an RF Link (RFL) 20, are coherently arrayed at the destination receiver, or the Ground Terminal (GT) 22 at the end-receiver. The destination receiver 22 is configured to "array" the individual signals 12 transmitted from the nodes 14 together to form a combined coherent signal that has more power and achieves a higher effective data rate.

The individual signal 12 transmitted from the corresponding node 14 is buried in noise at a nominal swarm high data rate ($R_S$). In addition, signal 12 also exhibits ongoing differential Doppler profiles that complicates the end goal of phase-coherent combining of the node signals 12. The subject novel destination-based signal processing scheme has been created that supports continuous closed-loop phase tracking for each node signal 12, despite being buried in noise. This approach then enables a coherent combining of the node signals 12 with phase-offsets of less than 10°, thereby forming a high-SNR sum signal that can be subsequently demodulated and recovered. The SACC system 10 achieves this objective, among other unique features of the SACC system 10, via the use of (1) an innovative initial Beacon/Preamble signal structure and format that quickly starts the process of closed-loop tracking of the carrier and captures fine signal timing to align the node signals for the coherent summing; and (2) an innovative signal feedback/correlation scheme that "extracts" each individual node channel signal from being buried in noise to enable closed-loop carrier tracking of the individual node signals, thereby accounting for the ongoing differential Doppler across nodes that would otherwise preclude coherent combining operations. As schematically presented in FIG. 1A, the individual signal 12 transmitted from the node 14 includes a Beacon signal 24 which precludes Mission Data phase 25 in each signal transmission.

Figure 1B:
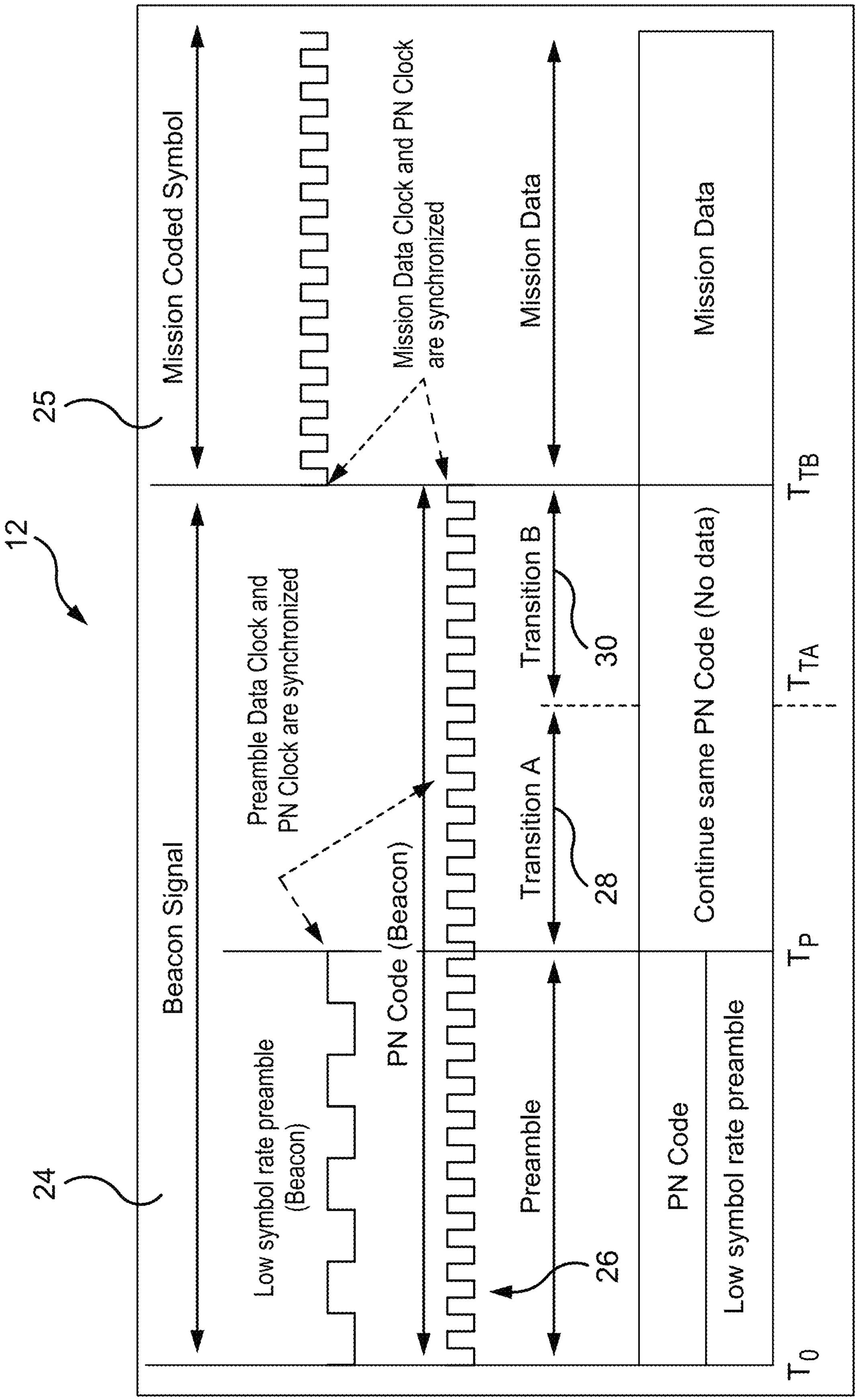
FIG. 1B is representative of the subject SACC Signal Preamble Structure and Functionality.

FIG. 1B is representative of the SACC's initial Beacon/Preamble signal structure and format depicting the Beacon signal 24 that is developed to address the afore-presented objectives. The Beacon signal 24 is transmitted at the start of each node's transmission (specifically, prior to the mission Data phase 25) and is anticipated to be, for example, about 4-6 seconds in duration. The processing performed by the destination receiver (or the GT) 22, of the SACC 10 on the Beacon signal 24 primarily includes an operation of initial (Beacon) signal acquisition, including pseudo-random (PN) code and a carrier acquisition, followed by closed loop tracking operations (for the PN code, phase and symbol) to pull-in the signal and achieve lock.

As shown in FIG. 1B, the beacon signal 24 is composed of three key components, including: a Preamble 26, a Transition A 28, and a Transition B 30.

The preamble data rate, $R_P$, is low enough so that there is sufficient SNR at low data rates, i.e., Eb/No, to support Beacon demodulation. Accordingly, $R_P \sim R_S/N$, where $R_S$ is the swarm composite high-data rate and N is the number of the nodes 14 in the swarm 16. For example, a SACC lunar swarm constellation has been designed in which: $R_S$=300 Mbps, N=30, and $R_P$=10 Mbps, all based on power link budgets using typical node capabilities and parameters.

Sufficient SNR at the Preamble's low data rates is beneficial for Beacon demodulation. During the duration of the Preamble phase 26, the Beacon signal is demodulated, bringing the node signal 12 to baseband and recovering the data (Preamble data) along with PN code acquisition and tracking. The Preamble data has a defined framing structure to provide coarse timing, while the high-rate PN Code tracking provides fine timing. These two elements (Data Framing and PN Code tracking) then yield precise knowledge for the Preamble end-time ($T_P$) allowing for time synchronization across the swarm nodes. All nodes channels 31 are at baseband at the end $T_P$ of the Preamble phase, and are thus mutually coherent and time synchronized. Incoming signal samples arriving after the Preamble end-time $T_P$ are stored in their respective channel delay buffers (as will be detailed in the following paragraphs) to wait for the last signal to arrive and to allow for a subsequent synchronized node signal processing across all GT's node channels 31 to support the node channel's arraying, demodulation and feedback.

It is also worth noting that, since at the end time $T_P$ of the preamble phase 26 all node channels 31 are at baseband, they are mutually coherent and can be coherently combined by adding the I-channels outputs from a carrier tracking loop (detailed in the following paragraphs). The closed loop tracking is continuously performed during Transition A 28 and Transition B 30, and into Mission Data phase 25, as will be detailed in the context of the SACC destination receiver (or GT) structure and operation which is addressed in subsequent paragraphs.

Returning to FIG. 1B, subsequent to the Preamble phase processing has been completed for all channels (at $T_P$), the processing of the signal corresponding to Transition A and Transition B begins. The closed-loop carrier tracking of the PN code and the carrier, which began at the Preamble phase, is maintained throughout Transition A and Transition B. The tracked channel signals are sent to a sum channel 41 (best shown in FIGS. 2-3) for the coherent arraying.

As will be presented in detail in the following paragraphs, during the Transition A phase 28, Beacon Demodulation is used to track a phase of each node channel 31, and during the Transition B phase 30, swarm data recovered from the sum channel 41, i.e., an output of Swarm Demodulator (SD, is used to correlate each individual channel data to extract it out of noise, and the correlation is used to track each node channel 31. The sum channel 41 is used to add the coherent channels and demodulate the swarm sum signal.

Figure 2:
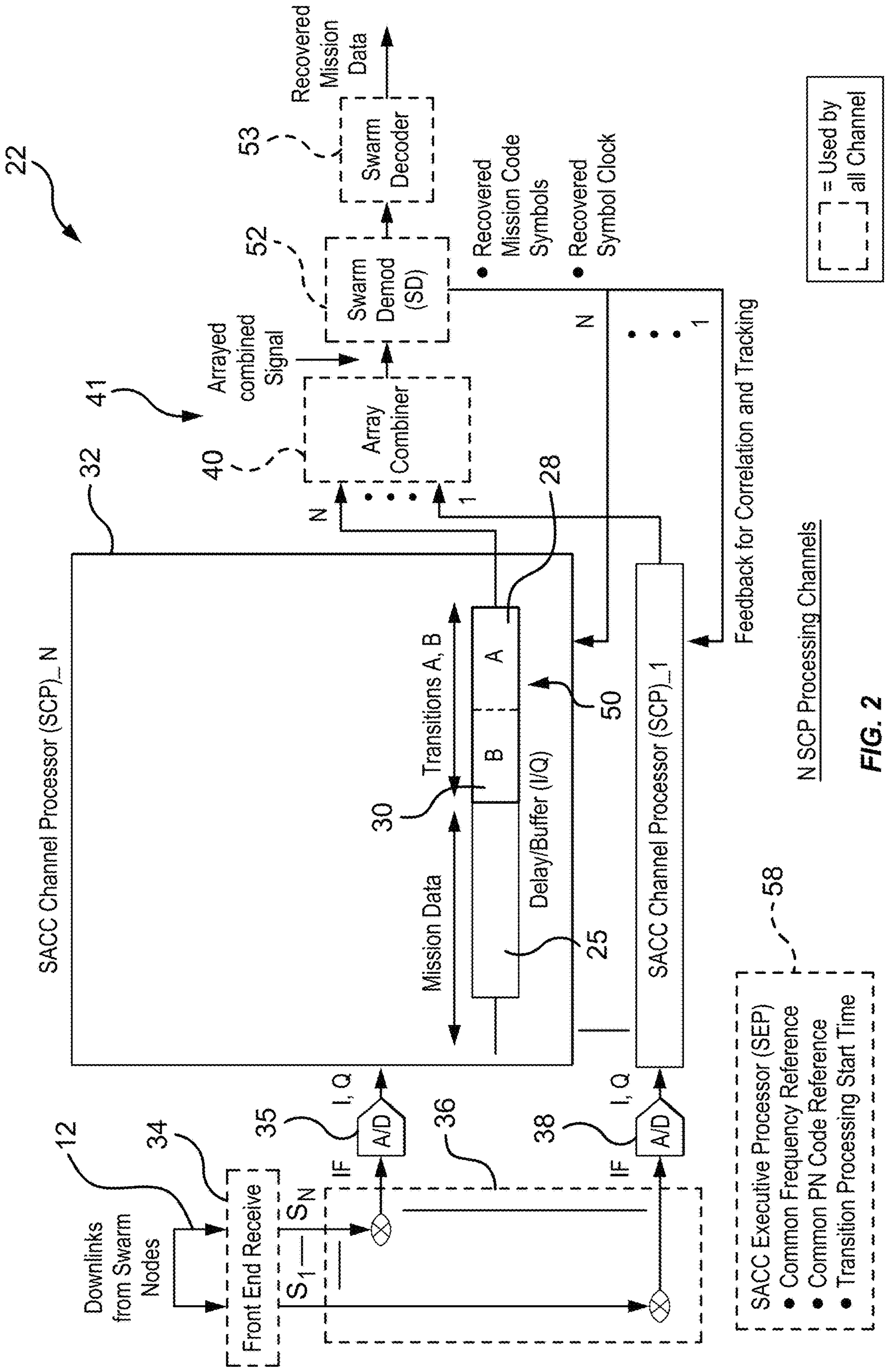
FIG. 2 is representative of a Ground Terminal (GT) embodiment of the subject SACC receiver architecture for satellite applications.

FIG. 2 depicts the architecture of the SACC destination receiver or GT 22. As depicted, the destination receiver or GT 22 includes N SACC Channel Processors (SCPs) 32, where each SCP 32 corresponds to a respective node channel 31. In addition to the number N of the SCPs 32, the SACC destination receiver 22 includes also other destination receiver's elements, such as, for example, an Array Combiner Processor 40 (also referred to herein as an Array/Channel Combiner, a Swarm Demodulator (SD) Processor 52, a Swarm Decoder Processor 53, a SACC Executive Processor (SEP) 58, a Front-End Receiver 34, and a Frequency Demax (FDM) Processor 36) that are shared by all SCPs 32. The Front-End receiver 34, which receives the downlinks from the swarm nodes 14, includes the Frequency Demux Processor 36 which is configured for a dedicated node signals processing by their respective SCPs. These node signals are first digitized by A/D converters 38, so that all SCP processing thereafter is digital, accommodating, for example, a straightforward FPGA implementation if so desired.

Each SACC channel SCP 32 processes the Preamble phase 26 to derive the end time $T_P$ of the Preamble phase, to bring the channel signal 12 to baseband at the end $T_P$ of the Preamble, and to align signals for the sum channel processing after the last signal arrives.

Each SCP 32 includes a dedicated delay buffer 50 for storing signal samples arriving subsequent to the Preamble end time $T_P$ for coordinated processing after the last channel signal arrives.

Figure 3:
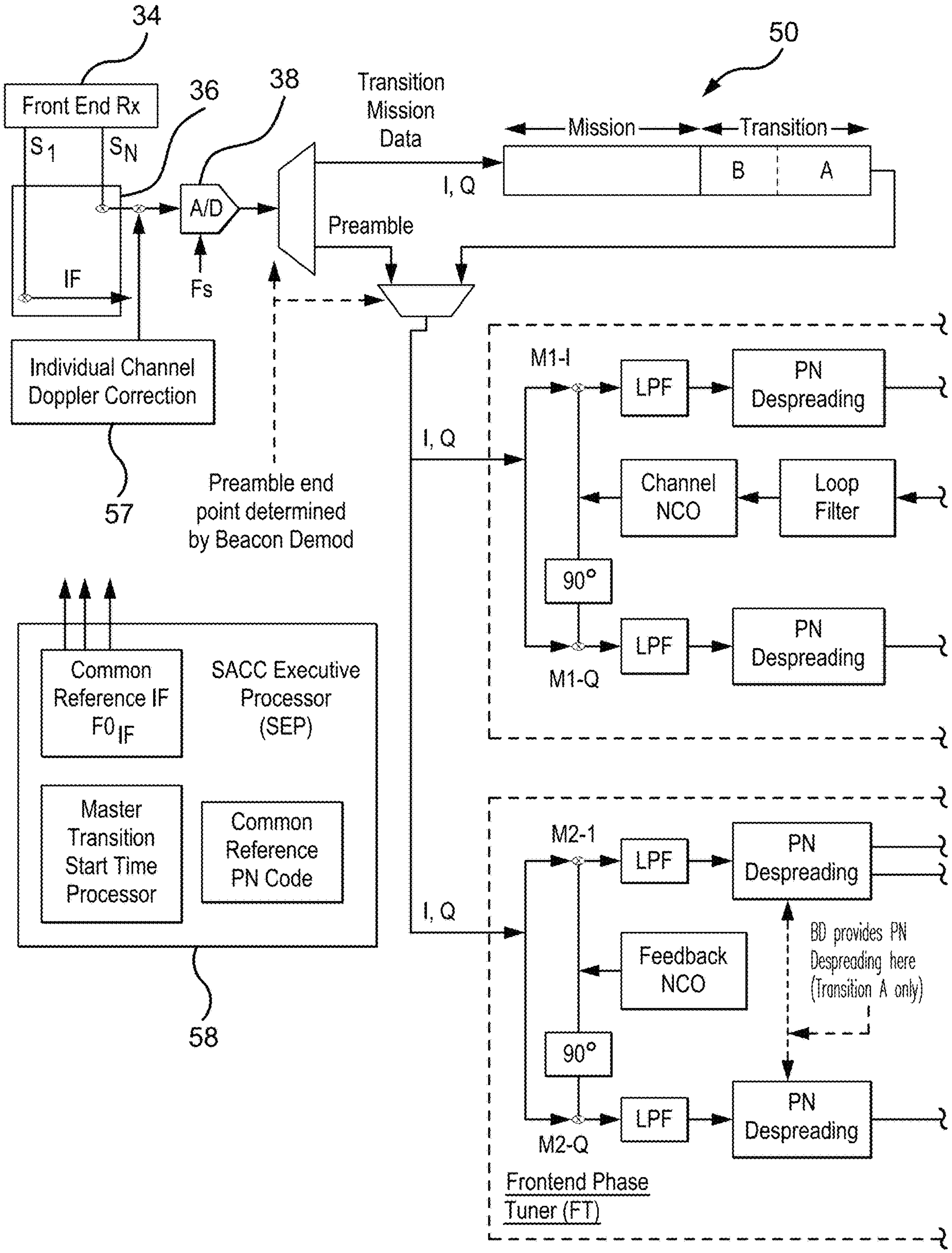
FIG. 3 is representative of the subject SACC SCP Design.
Figure 3:
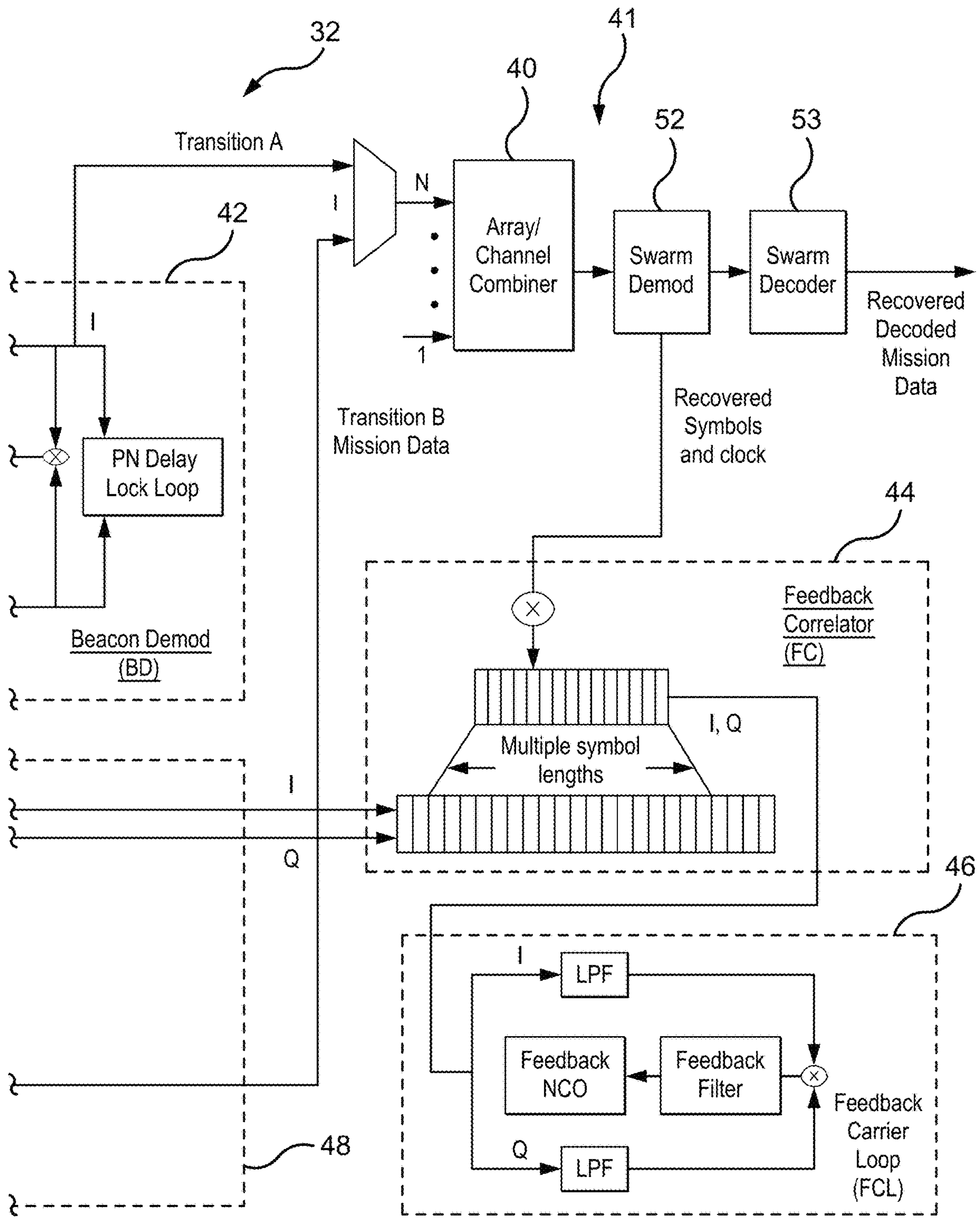

The sum channel 41, as represented in FIGS. 2-3, includes the Array Combiner Processor 40 where the signals from the delay buffers 50 of all channel's SCP 32 are transmitted, followed by the Swarm Demod Processor 52, and the Swarm Decoder Processor 53. The sum channel 41 is used to add the coherent channels and demodulate the swarm sum signal. The SCPs 32 time-synchronize and phase-align all node signals 12 so that their signal outputs are all mutually coherent and synchronized when they are presented to the Array Combiner 40. This coherent summing means that the sum signal amplitude is =N×A, thus providing a commensurate $N^2$ signal power gain $[\sim(N\times A)^2]$ and the required quality SNR signal for successful swarm demodulation/decoding at the swarm high data rate $R_S$. The composite SNR~N $\{A^2/\sigma^2\}$).

The arrayed combined signal output by the Array Combiner 40 is coupled to the input of the Swarm Demodulator (SD) 52. The SD 52 processes the arrayed combined signal to recover Mission Code Symbols and Symbol Clock which are feedback to the corresponding SCP 32 and are used to correlate each individual channel data for being extracted from noise, so that this correlation is used to track each channel. Subsequently, the Swarm Decoder 53 processes the recovered Mission Code Symbols output from the SD 52 and produces Recovered Mission Data which is output by the destination receiver or GT 22.

Figure 4:
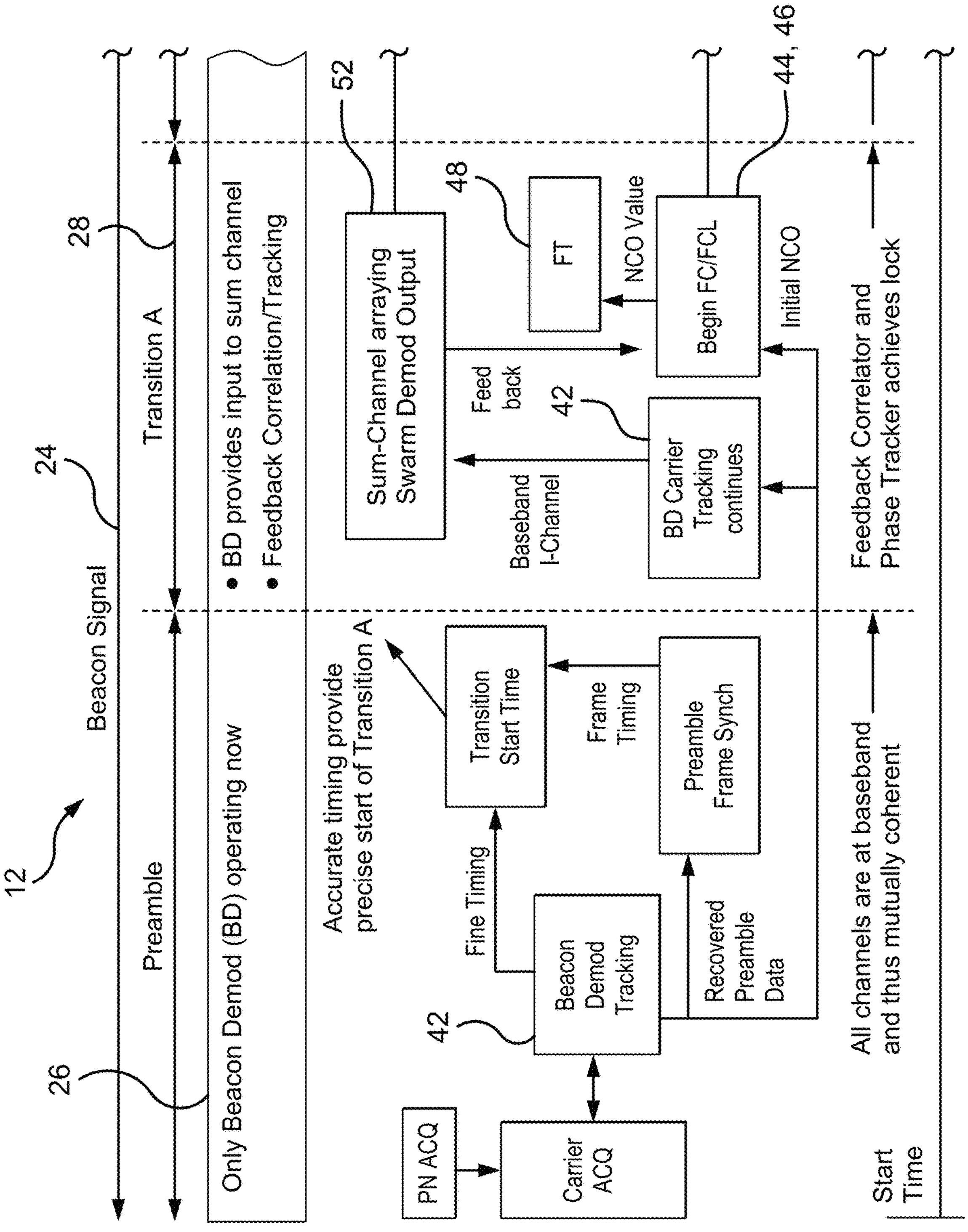
FIG. 4 is representative of the present SACC Node and Sum Signal Processing Sequence.
Figure 4:
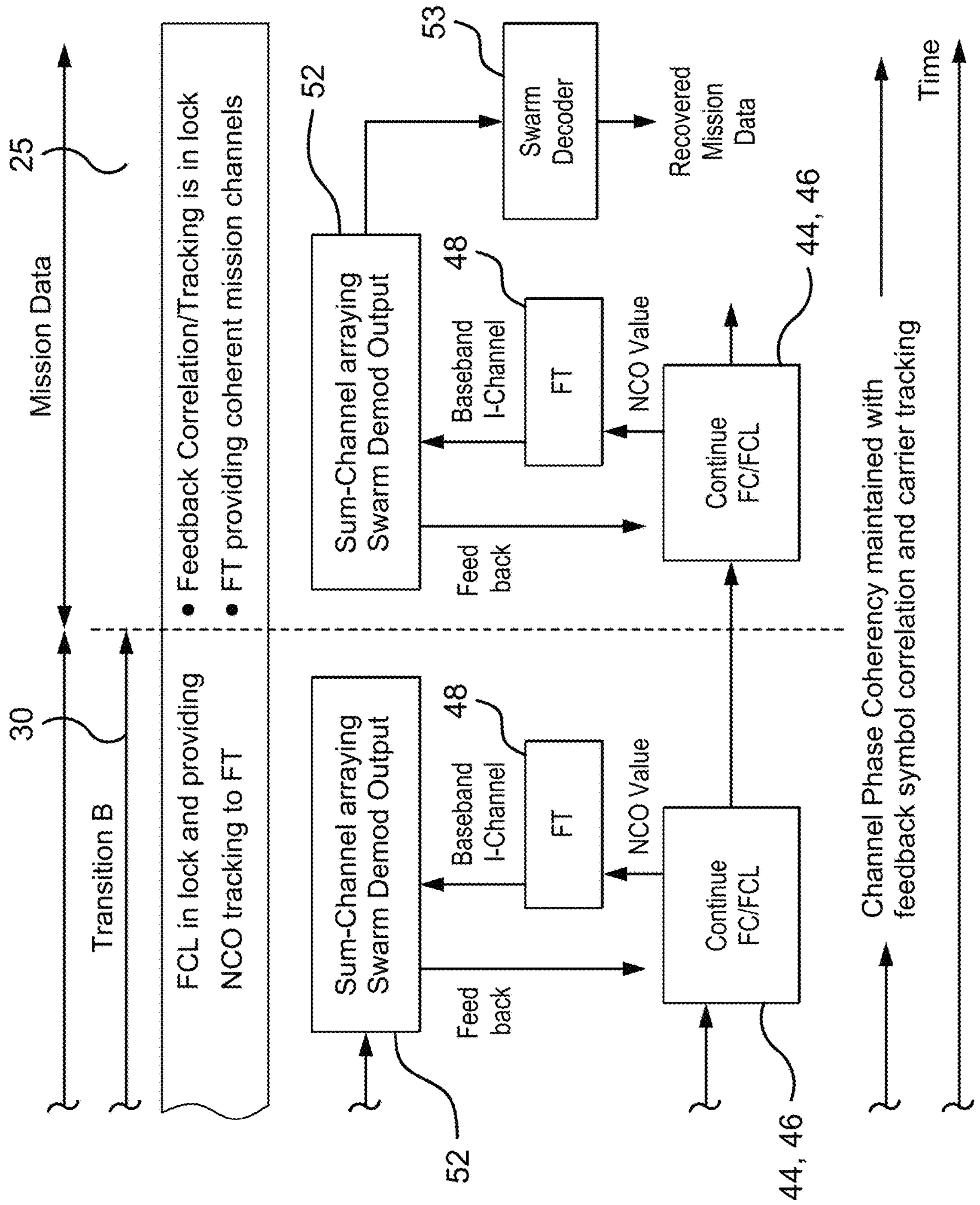

FIG. 3 depicts the next level of detail for each SCP 32 which includes, among other units, the following processing blocks: Beacon Demodulator (BD) 42, Feedback Correlator (FC) 44, Feedback Carrier Loop (FCL) 46, and Frontend Phase Tuner (FT) 48, which are detailed in further paragraphs. FIG. 4 depicts the timeline in the context of the processing blocks depicted in FIG. 3.

Referring to FIGS. 2-4, each SCP 32 has the dedicated Delay/Buffer (D/B) 50 into which all node signal samples (arriving after the Preamble phase and which correspond to the Transition A, Transition B, and Mission Data phases of each transmission) are stored after their individual Preamble processing ends. For each SCP 32, the stored samples continue to be buffered and stored in their respective Delay Buffer 50 until the last node channel signal's Preamble processing has been completed.

The delay-buffering allows for all node channels to subsequently output their buffered signal samples in 'unison' to the Array/Channel Combiner 40 during the Transition A and B, and Mission Data phases, where all signals need to be processed and added synchronously to form the coherent sum signal. The Preamble processing is relegated to only what is in each node signal and is not stored in the delay-buffer 50 for subsequent use in coordination with other channels to produce the sum channel.

The Beacon Demodulator (BD) 42 included in the SCP 32 is configured to (a) process the node signal and (b) detect signal presence via PN Code acquisition. The BD 42 demodulates the Preamble to initiate the all-critical closed-loop phase tracking which will ultimately be seamlessly handed over to other SCP elements as the signal transitions through the Preamble, Transitions A, B and Mission data phase.

The Feedback Correlator (FC) 44/Feedback Carrier Loop (FCL) 46/Frontend Tuner (FT) 48 combination is an important part of the subject SACC system 10. It is essential that there is ongoing and uninterrupted phase tracking of each received node signal. During the Preamble phase processing, the Beacon Demodulator 42 accomplishes the ongoing and uninterrupted phase tracking of each received node signal which is supported by the low data rates, and sufficient SNR is available as a result.

Subsequent to the Preamble phase, when the channel data rate increases to being at the higher swarm data rate $R_S$, the node signal is buried in noise. The only viable mechanism to process a noise-dominated signal is to obtain some knowledge of the underlying signal structure which is not intuitive. In this context, it is recognized that the recovered symbols output by the Swarm Demodulator 52 are, in fact, the same data that is buried in each of the noise-dominated channel signals but with a slight delay. Accordingly, by correlating the recovered Swarm demodulated symbols with a delayed version of the noisy node channel samples and doing so over N symbol durations of accumulation, a sufficient SNR may be attained in the correlation sum signal to drive the closed-loop carrier tracking of each node channel.

The FT 48 is used in concert with the Feedback Carrier Loop (FCL) 46 to correspond to the Front-End 34 of the SCP 32 that mixes the incoming channel signals to create the I (in-phase component) and Q (quadrature component) signals for delay and feedback correlation prior to tracking. More specifically, this mixer uses the NCO (Numerically Controlled Oscillator) value determined by the feedback tracking operation.

As depicted in FIGS. 1B and 3-4, the SACC node and Sum Signal processing sequence are represented by the Beacon Signal processing followed by the Mission Data processing. The Beacon phase 24 processing of the individual signal 12 transmitted by a node 14 includes the Preamble Phase 26 where only Beacon Demodulator (BD) 42 operates, followed by the Transition A Phase 28 where the BD 42 provides an input to the Sum Channel 41 for subsequent feedback correlation and tracking, and finally followed by the Transition B phase 30 where the FCL 46 is in lock and provides the NCO tracking to the FT 48. Following the Beacon signal processing, the Mission Data phase 25 is processed where the Feedback Correlation/Tracking is in lock, and the FT 48 provides coherent Mission channels.

Specifically, during the Preamble phase 26, the SACC destination receiver or Ground Terminal (GT) 22 performs the initial signal acquisition, i.e., PN code acquisition (PN ACQ) and Carrier acquisition (Carrier ACQ). During the Preamble phase 26, the Beacon signal 24 is demodulated that follows by closed loop tracking operations (Beacon Demod Tracking) to recover the Preamble Data along with the PN acquisition and tracking (PN, Phase and Symbol) to pull-in the signal and achieve lock. The recovered data has a specific framing structure (Preamble Frame Synch) which provides a coarse timing (Frame Timing), while the high-rate PN code tracking gives Fine Timing. The Fine Timing and Frame Timing define the end time $T_P$ of the Preamble phase 26, and brings and node signal to baseband, as well as defines the precise Start Time for the Transition A 28.

At the end of the Preamble, all node channels 31 are at baseband, and thus are mutually coherent. The precise knowledge of the Preamble's end time $T_P$ allows for time synchronization across the swarm nodes. Following the $T_P$ time, the incoming signal samples are stored in their respective delay buffers 50 to wait for the last signal to arrive, and to subsequently allow for the synchronized nodes signals' subsequent processing across all swarm nodes channels to support the Sum Channel arraying, demodulation, and feedback operations performed by the SACC destination receiver or GT 22.

Following the Preamble phase 26, the Transition A Phase 28 begins (when the Preamble processing has been completed for all channels). The Preamble Data recovered in the Preamble processing phase are used in the Transaction A phase for BD carrier tracking operation and to initiate FC 44/FCL 46 operation to output the NCO value (based on the initial NCO corresponding to the recovered Preamble Data) to the Frontend Phase Tuner (FT) 48. Throughout the Transition A phase 28, the BD 42 continues to track channel phase, the closed-loop carrier tracking (Feedback Correlation/Tracking) is maintained, the Feedback Correlator (FC) 44 and the Phase Tracker achieve lock-in, and the BD 42 provides the tracked out coherent signals to the Sum Channel 41 for coherent arraying in the Array/Channel Combiner 40/Swarm Demod 52.

Following the Transition A phase 28, the Transition B phase 30 begins at which the SACC GT 22 uses the recovered sum channel swarm data to correlate each individual channel data to extract them out of noise and uses the correlation to track each channel. In Transition B, the FCL 46 is locked-in, FC 44/FCL 46 operation continues to provide the NCO value to the FT 48, and the channel Phase coherency is maintained with the feedback symbol correlation and carrier tracking.

Following the Transition B phase, the Mission Data 25 processing is performed where the Feedback Correlation/Tracking is in Lock, the Sum Channel adds the coherent channels and demodulates swarm sum signal, and the SACC destination receiver or GT continues to use recovered Symbols and Clock data output by the Swarm Demod (SD) 52 to correlate each individual channel data to extract it out of noise and to use this correlation to track each channel. The swarm Decoder 53 uses the Swarm Demod 52 output to recover the Mission Data.

Individual Channel Doppler Correction

FIG. 3 schematically represents the Individual Channel Doppler Correction Sub-System 57 which operates to compensate for the differential/time-varying Doppler frequencies and random phases introduced at the receiver end 34 of the SACDC system 10. The subject SACC system 10 uses an approach similar to that used by NASA's TDRSS ground receivers which require the user to provide the epoch of its platform ephemeris to within a required maximum time uncertainty (Te). Another requirement is that the acceleration is to be less than a specified maximum value (Ra). With this information and using Ephemeris Propagation algorithms, the user Doppler can be predicted within a small residual Doppler uncertainty (Fdr) given by the following equation:

$$Fdr=[(Ra\times Te)\times Frf]/c$$

where c is the speed of light, and Frf is the RF carrier frequency (Frf)

For example, in the NASA TDRSS case, for Ra=15 m/sec2, Te=+/−9 secs, Frf=2.2875 GHz, the Residual Doppler Uncertainty Fdr=+/−1.03 KHz.

Buffering for Node Arrival Differential-Delay

Because of the different nodes distances to the SACC destination receiver or GT 22, their corresponding signals' arrival times are different. Albeit small (for example, on the order of 100 usecs), SACC coherent signal combining needs to account for the difference in signals arrival times performed by a delay buffering sub-system 59 which operates to delay each node signal accordingly prior to the Array Combiner 40, as depicted in FIGS. 5-9.

Figure 5:
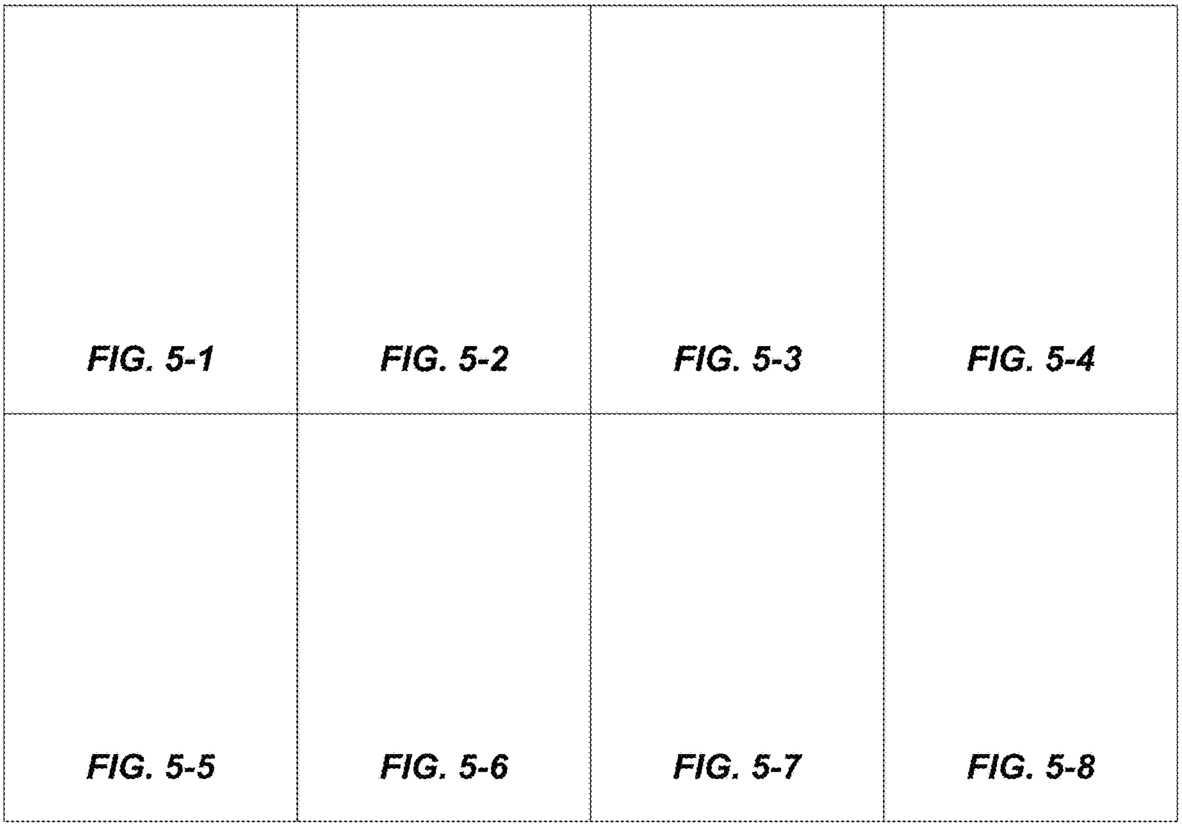
FIG. 5 is a scaled map of eight partial views that illustrates one of the embodiments of an S_IR configurations with Upfront Buffering to Account for Differential Node Arrival Times.
Figures 1, 5:
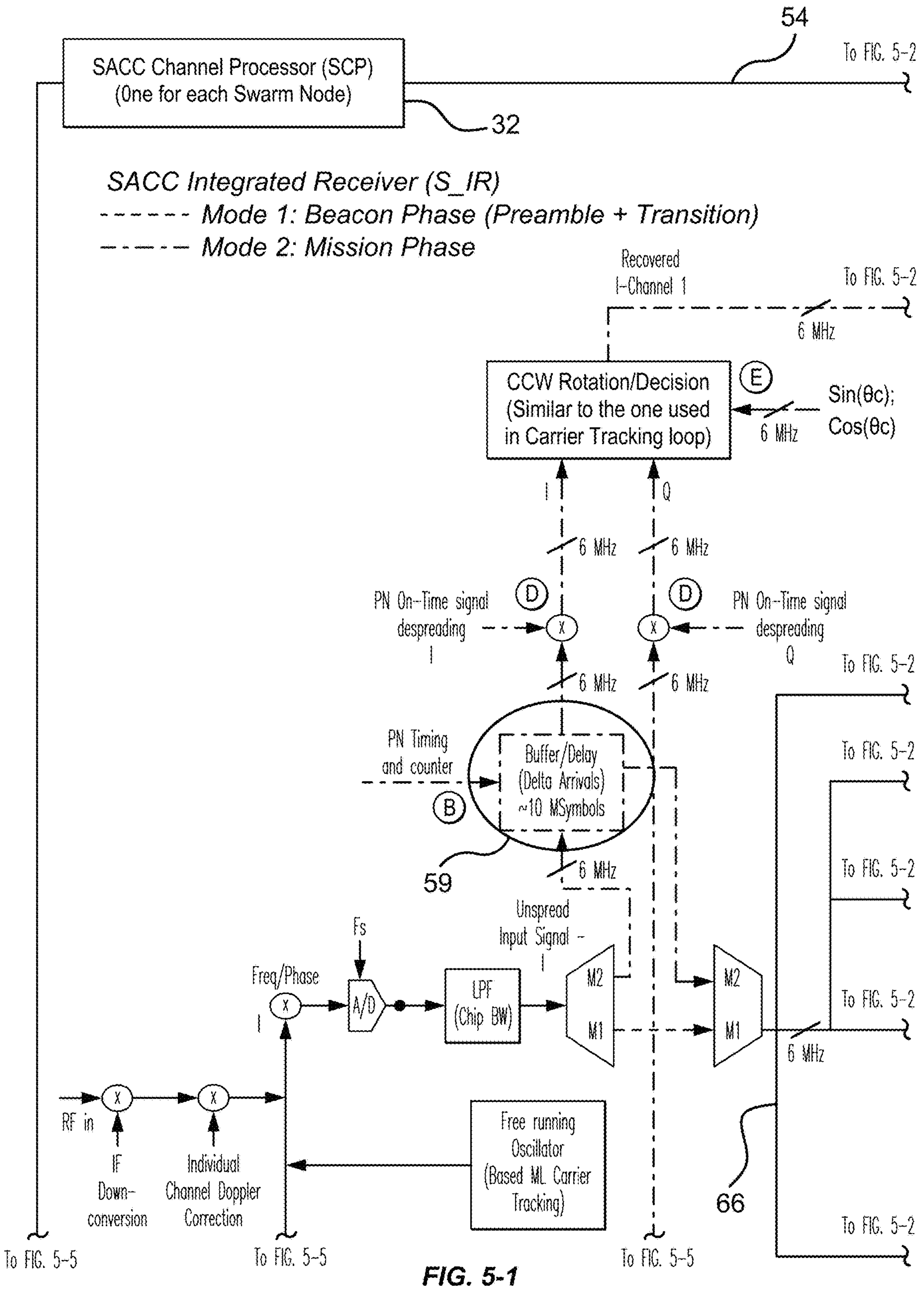
Figures 2, 5:
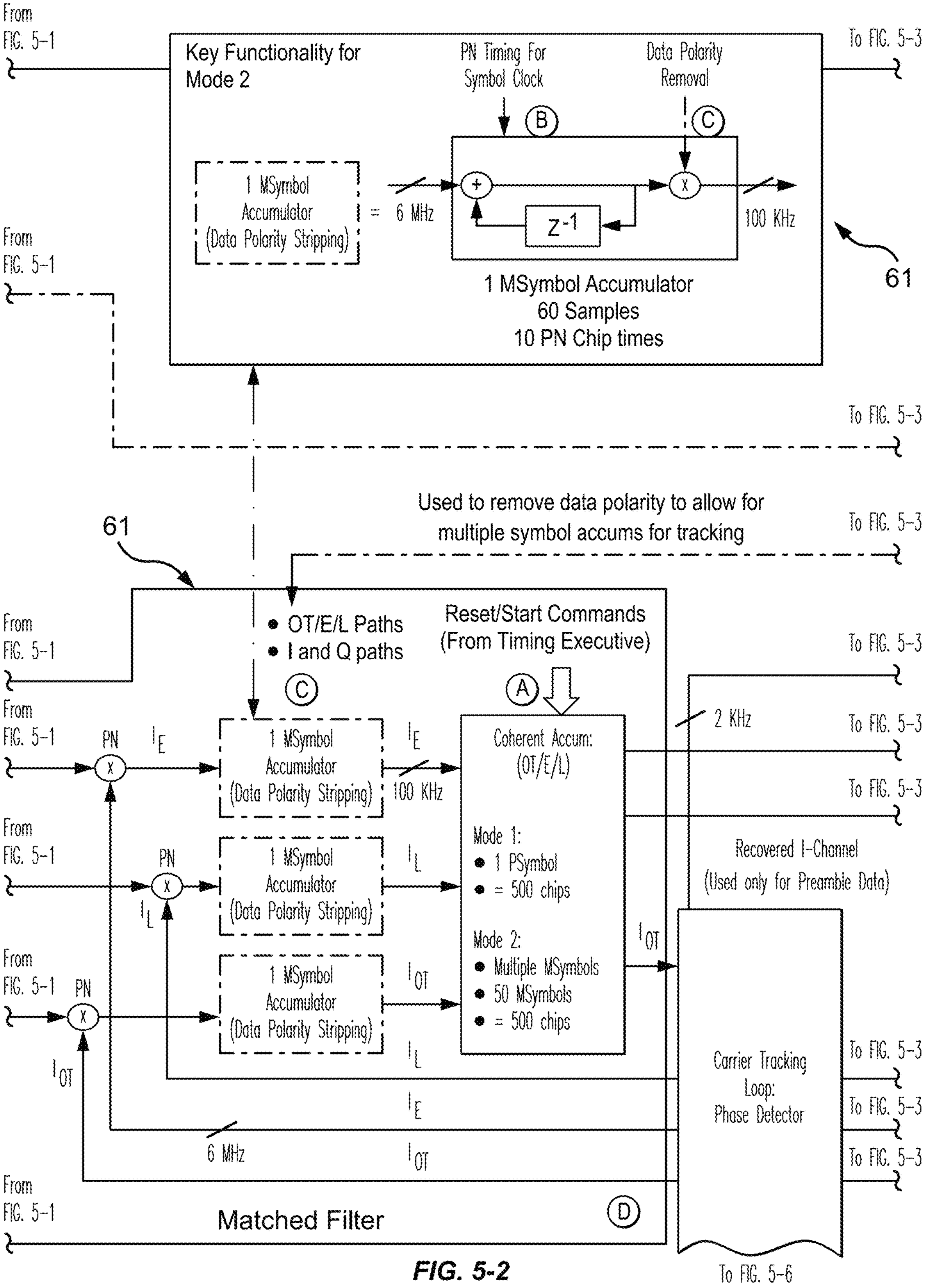
Figures 3, 5:
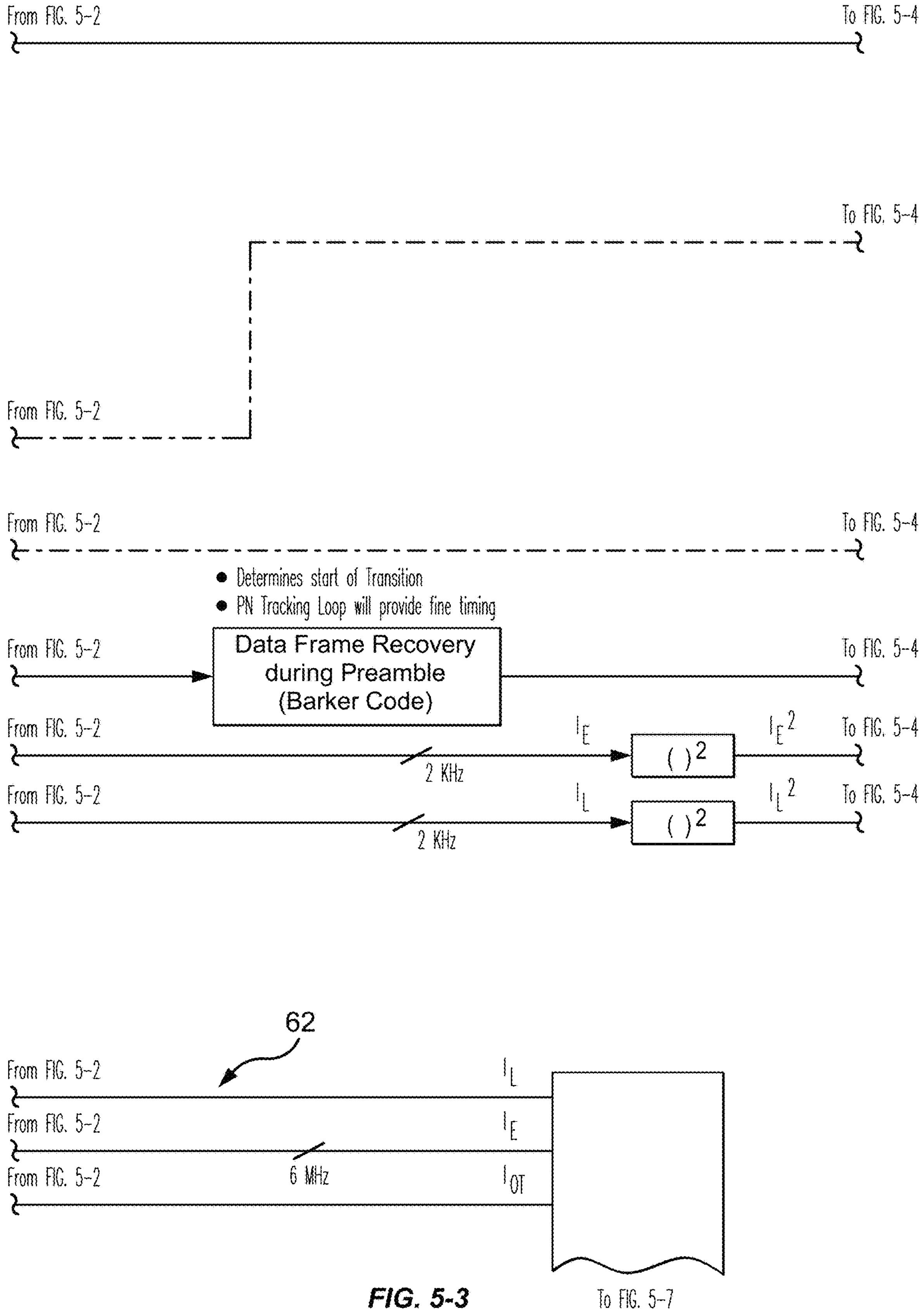
Figures 4, 5:
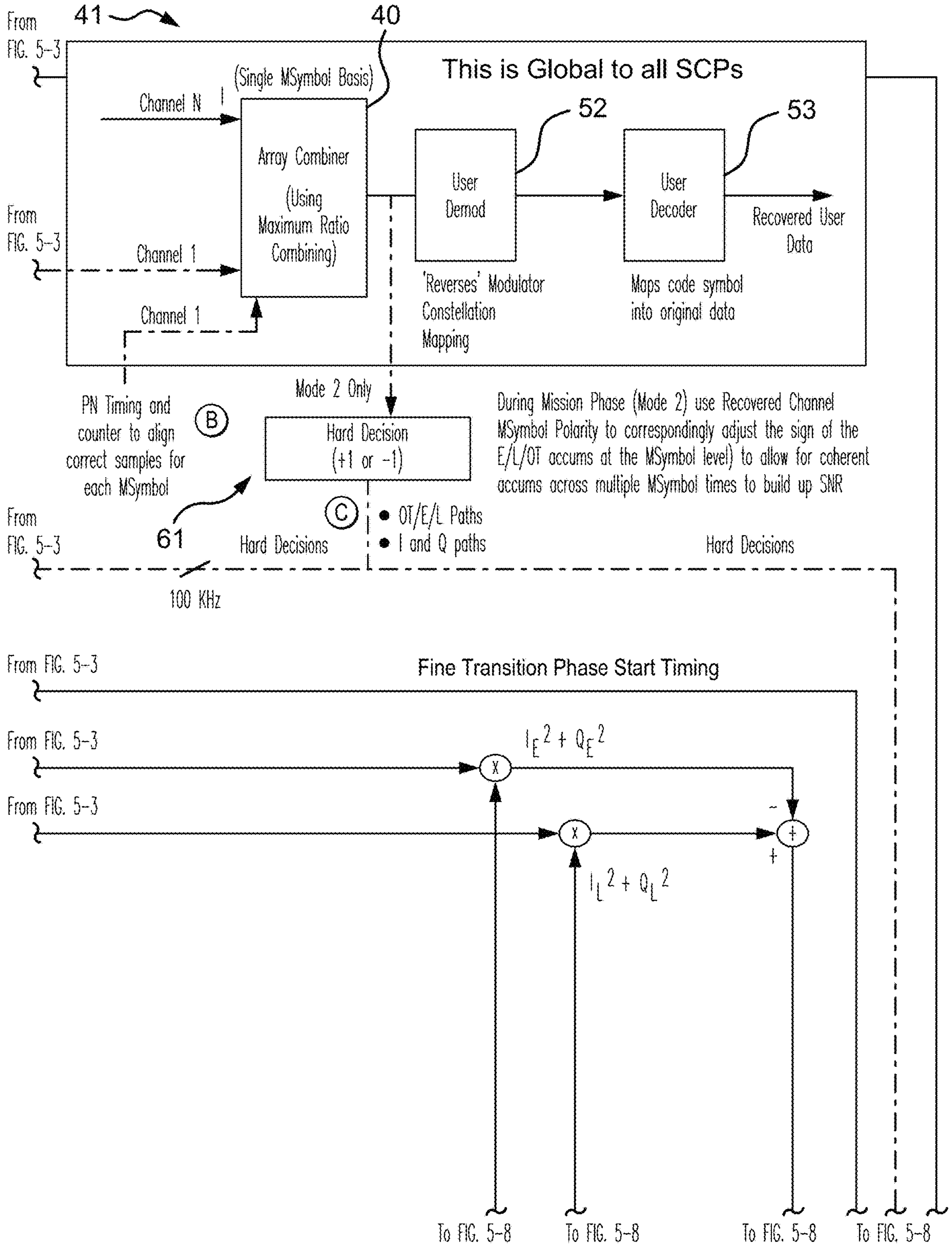
Figure 5:
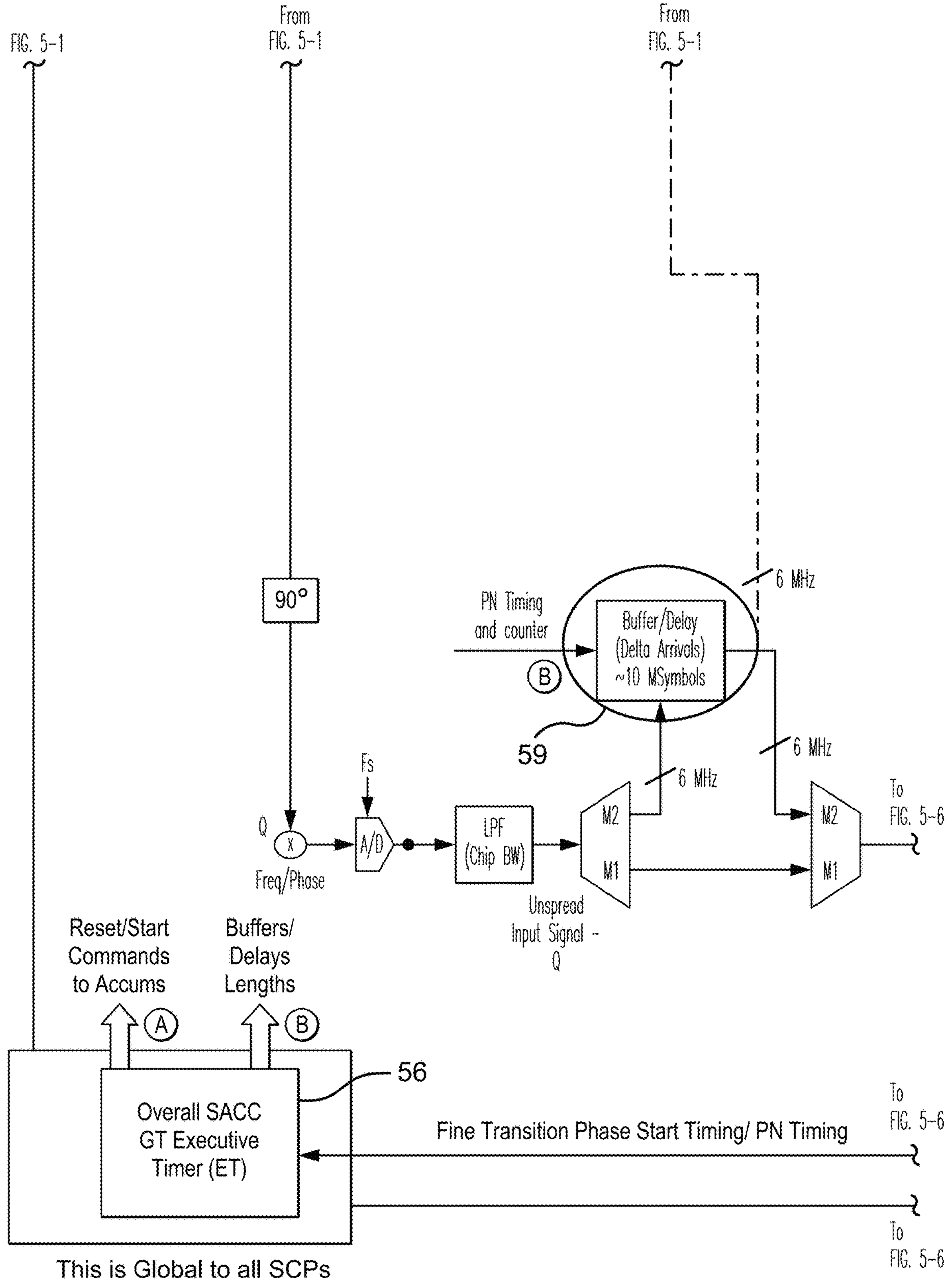

Referring now to FIG. 5, the SACC destination receiver or GT 22 includes a SACC Integrated Receiver (S_IR) 54 operatively coupled to (or embedded in) a corresponding SACC Channel Processor (SCP) 32. The SACC Integrated Receiver 54 operates in two modes, including Mode 1 corresponding to the Beacon Phase (Preamble and Transition) processing, and Mode 2 corresponding to the Mission Phase processing. FIG. 5 depicts the delay buffering sub-system 59 embedded in the SACC S_IR 54.

Figures 5, 6:
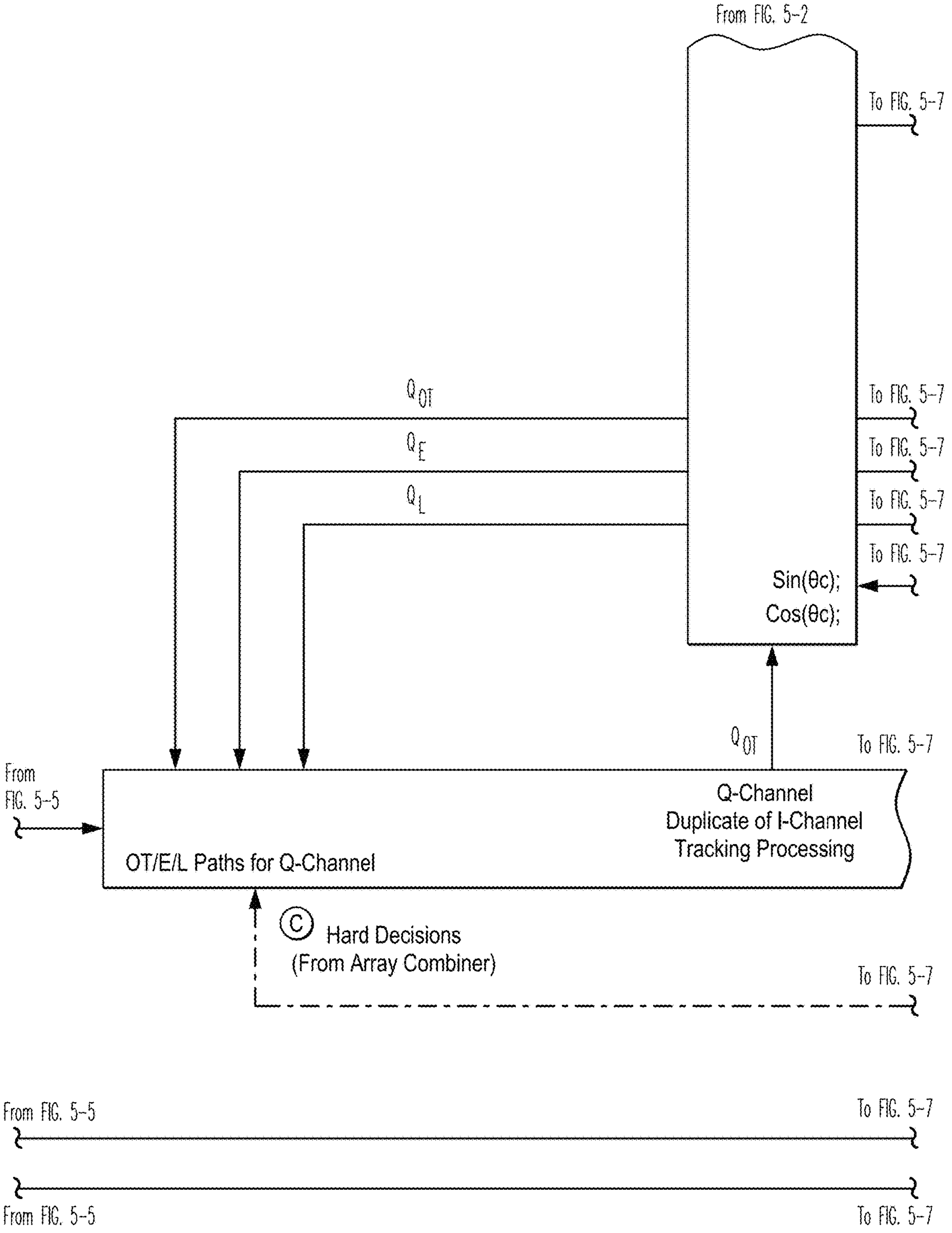

FIG. 6 addresses the buffering required to account for different arrival times of the first (earliest) signal S3 and the last (latest) signal S2 in the context of the SACC signal phases to draw attention to the fact that the start time of their Mission signal phases are different. In Mode 2, node signals are Arrayed-Combined so that they need to be time-aligned prior to the Array/Channel Combiner 40.

As shown in FIGS. 5-6, in Mode 1, an SACC Executive Processor (SEP) 58 (best shown in FIGS. 2-3) which executes in all SCPs 32, each corresponding to a respective node channel 31, uses the common PN Code Reference to track the status of all channels and can determine what nodes' signals are provided (arrive) to the Array Combiner 40 for the sum channel processing. The Max delay between the S3 and S2 arrivals may be, for example, 100 usec~10 MSymbols (Mission coded symbols).

As presented in previous paragraphs, the Fine timing of the Preamble end-time $T_P$ is achieved at the end of the Preamble Phase for every node/SCP. The Fine time $T_P$ is used by the SACC destination receiver or GT Executive Processor 58 to synchronize all the destination receiver Nodes SPCs. The Fine timing $T_P$ is provided to the Overall SACC destination receiver (or GT) Executive Timer (ET) 56 for the Mission Phase buffering in Mode 2. Thus, the S_IR Executive Timer 56 in the SACC Integrated Receiver 54 "knows" the exact Mission start time for each node signal by having the Preamble end-time $T_P$ of each signal along with the common fixed Transition phase duration (all node channels have a fixed Transition duration). The SACC SEP 58 can therefore notify each node Signal Channel Processor (SCP) 32 as to the amount of buffering it needs to perform prior to sending its processed signal into the Array Combiner 40.

As shown in FIG. 6, the Transition phase has a fixed duration for all node channels. The difference between the ends of the transition phase times of the latest signal S2 and the earliest signal S3 constitute the longest buffering needed therebetween. The ending of the Transition phase of the latest signal S2 determine the time Tm_S2. The coherent Sum Channel processing starts at the start of the Mission Phase of the last signal Tm_S2. This requires a Master Clock and the Executive Timer 56 to coordinate this time across all the channel processors (SCPs) 32.

At the end of Mode 1, i.e., at Tm_S2, the updates of the tracking loop (including the BD 42, FC 44, FCL 46, FT 48) are temporarily halted, the delay time is provided by the overall SACC destination receiver or GT Executive Timer 56, and the tracking subsequently continues in accordance with the most recent NCO values. The incoming signals are buffered/delayed to synchronize with the last signal S2. Subsequent to this delay, mission data is tracked using the feedback correlation with nodes channels.

Figures 5, 6, 7:
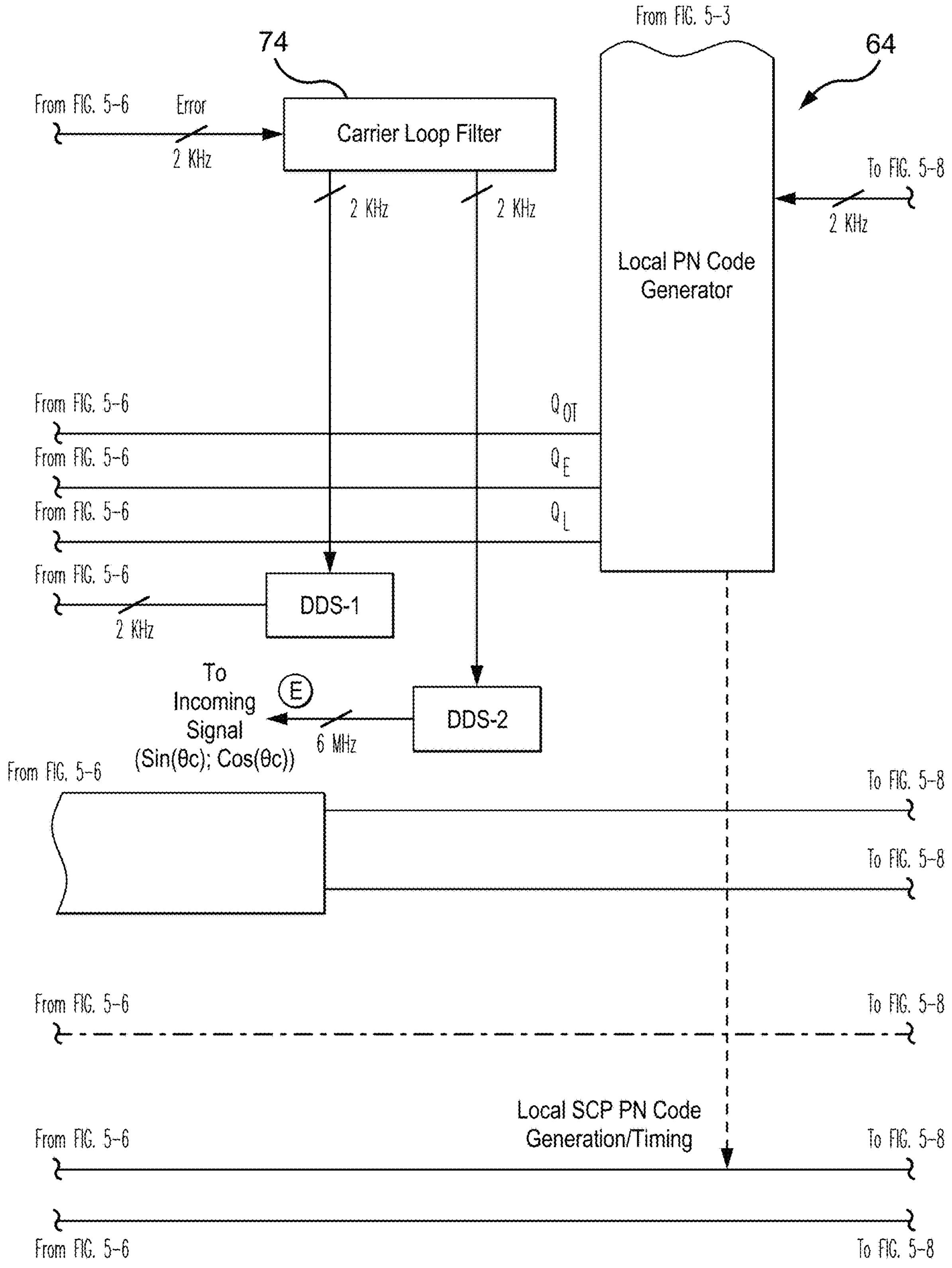

In FIG. 7, the lower portion depicts the tracking loop update time profile through the SACC phases. It is important that the loop update time does not change in the Mission Phase even though the Mission data rate is much higher. As will be presented in the following paragraphs, the feedback data-polarity stripping that SACC performs in Mode 2 allows for a longer SNR accumulation in each loop update interval. The node channel Es/No is too low to track on an individual MSymbol basis so that the polarity stripping allows for the accumulation of multiple MSymbols together to build-up SNR.

Figures 5, 6, 7, 8:
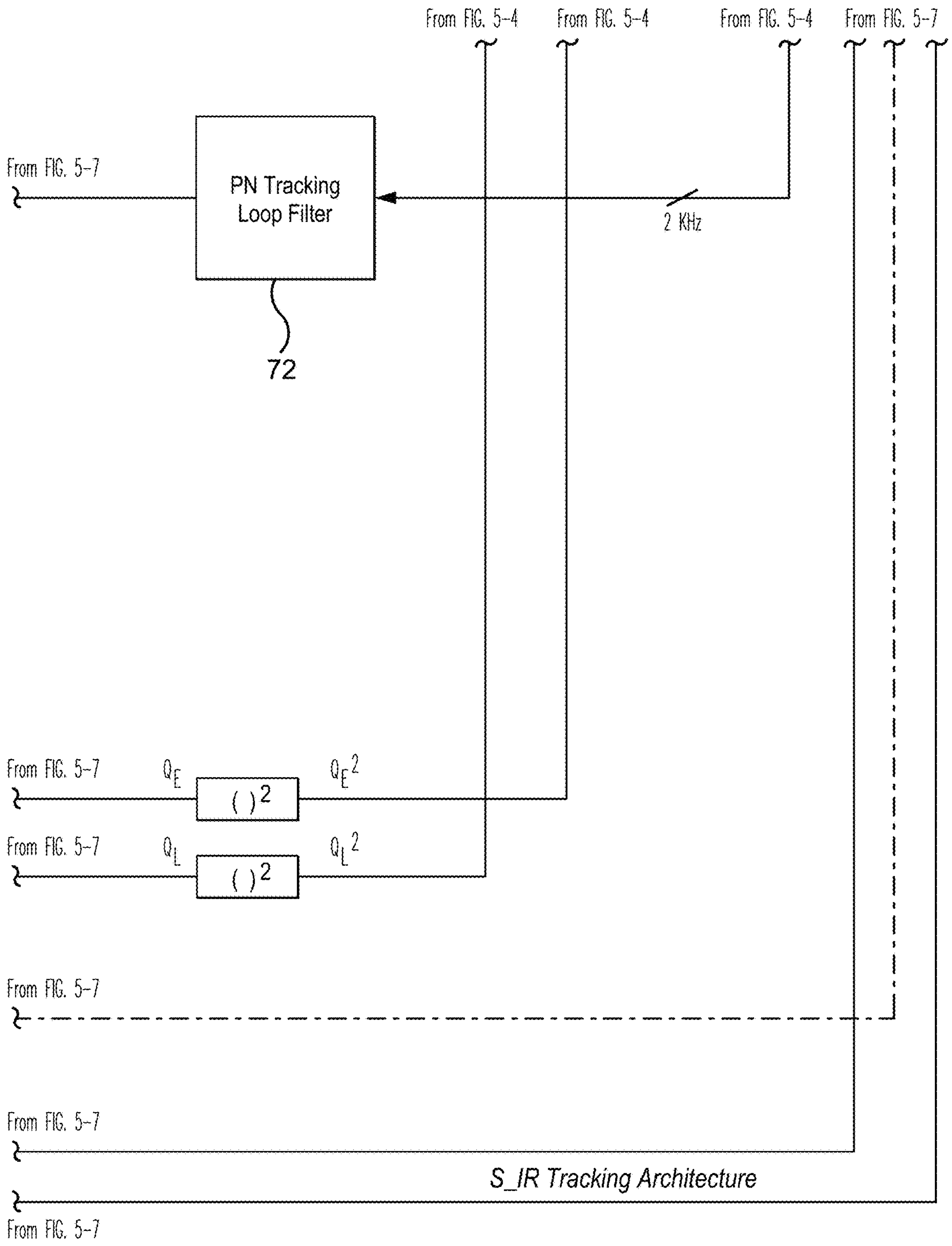
Figure 6:
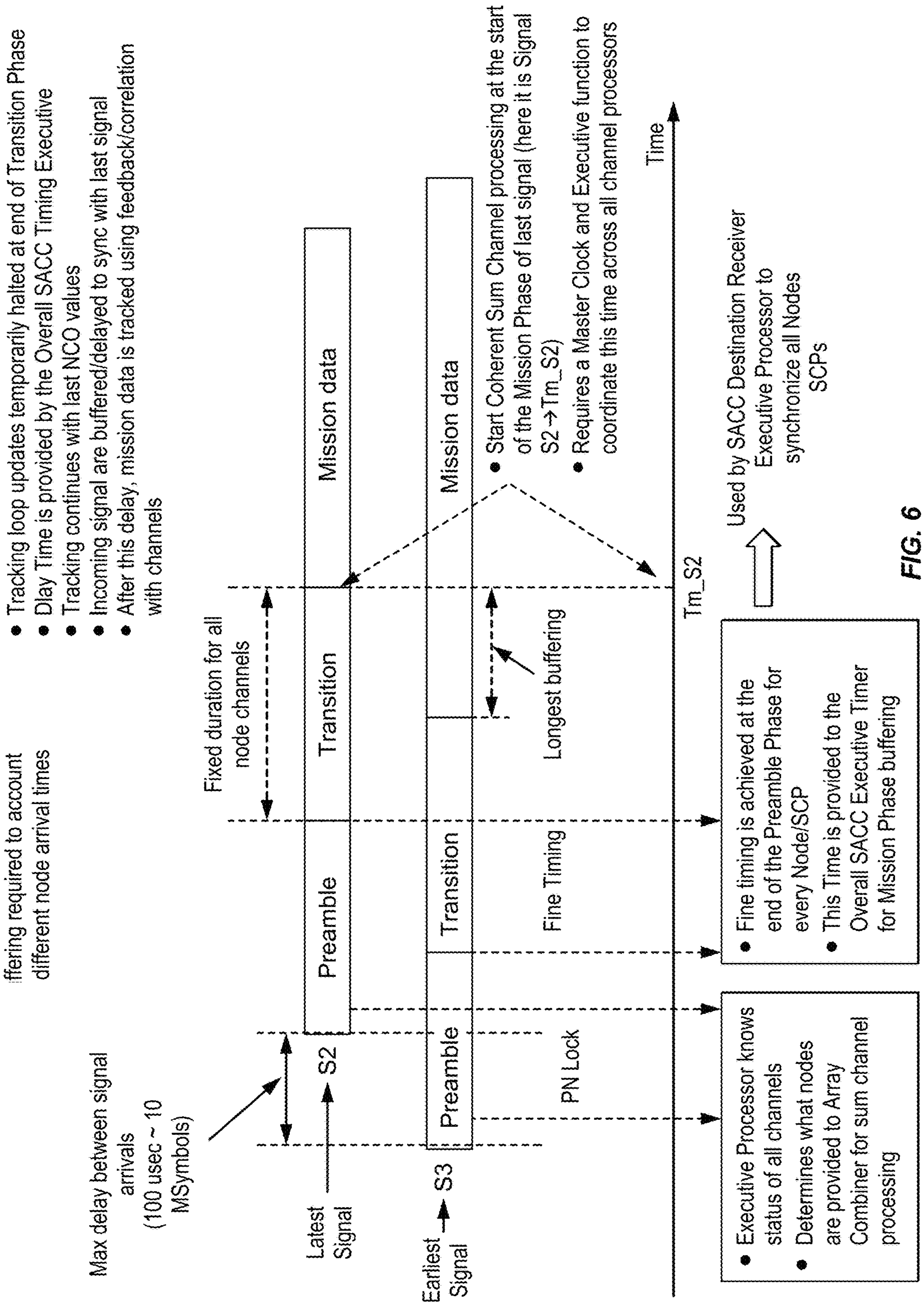
Figure 7:
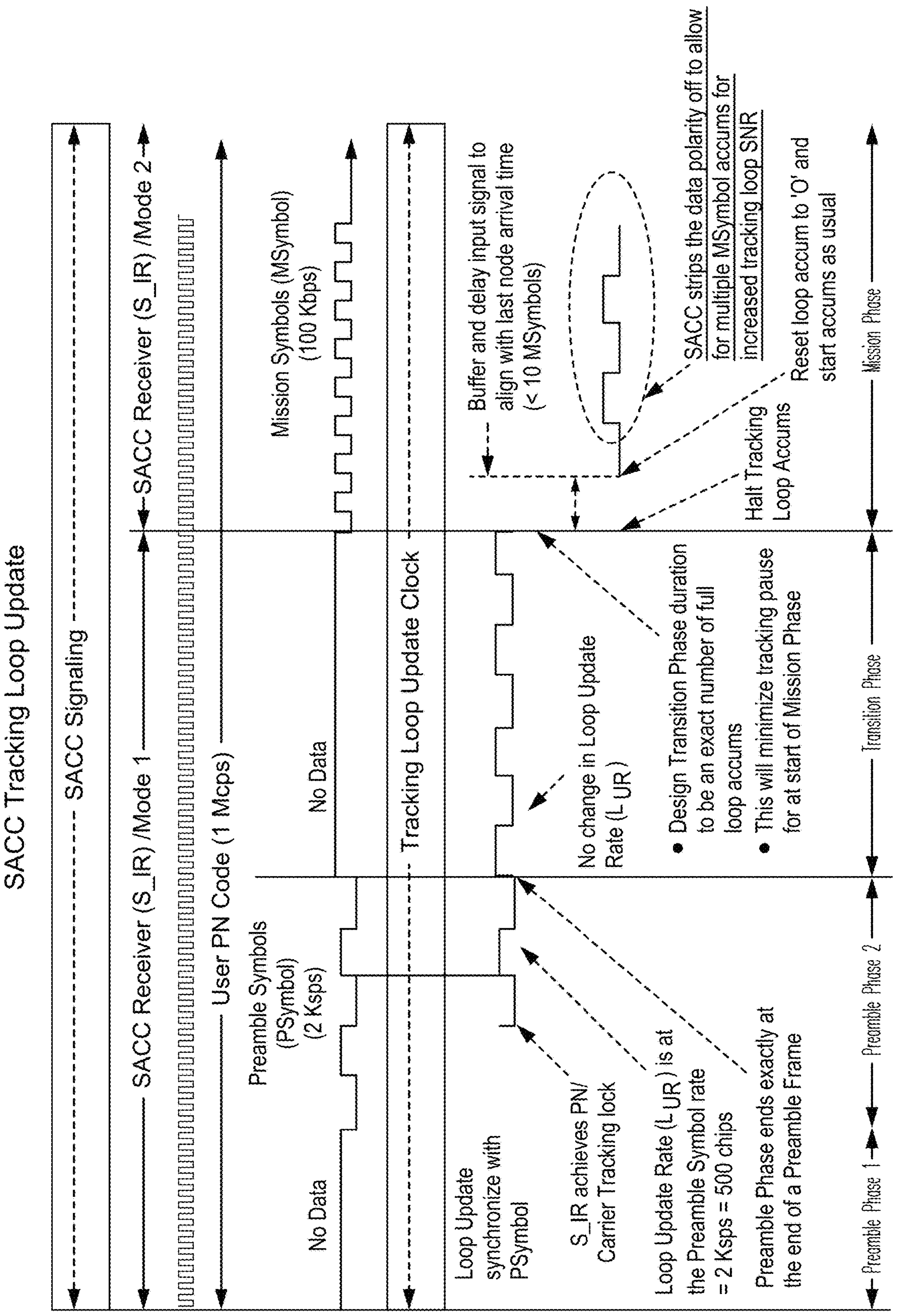
Figure 8:
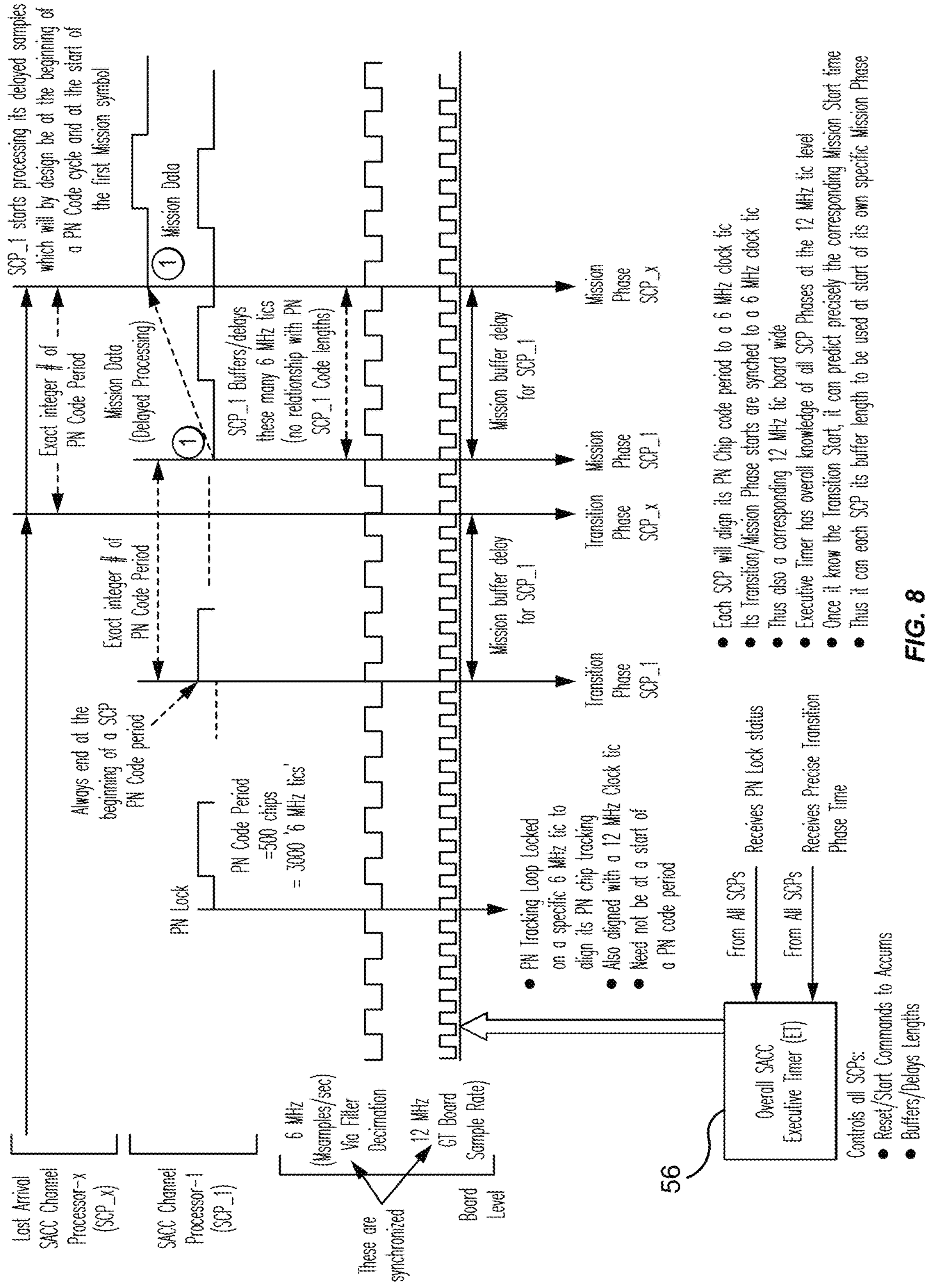

FIG. 8 details the clocking strategy where the Overall SACC destination receiver or GT Executive Timer 56 orchestrates processing among the nodes' SCPs 32. The Overall SACC destination receiver or GT ET 56 receives PN Lock status and Precise Transition Phase Time from all SCPs 32, and, accordingly, controls all SPCs 32 through Resetting/Starting commands to accumulate the signals samples, and establishing the Buffers/Delays lengths. The fundamental time basis (i.e., destination receiver or Board sample rate), for example, is the 12 MHz clock associated with the 6× sampling of the PN Chips. Various signal phase timing intervals have been constructed to facilitate the clocking strategy in the present SACC 10.

The PN Tracking Loop is locked on a specific 12 MHz destination receiver Board sample clock and 6 MHz rate to align its PN chip tracking. Each SCP 32 aligns its PN Chip code to a 6 MHz clock tic, so that each SCP's Transition/Mission Phase starts are synchronized to the 6 MHz clock tic, thus also the corresponding 12 MHz destination receiver Board wide. The ET 56 has the overall knowledge of all SCPs' phases at the 12 MHz tic level. Once the ET 56 knows that the transition Starts, it can predict precisely the corresponding Mission Start Time, and thus, the ET 56 can cause its Delay Buffer 50 to be used at the start of its own specific Mission Phase.

Data Polarity Stripping

FIGS. 5 and 9A-9C depict a generic functional block diagram of the S_IR tracking loop architecture 60 which includes the Carrier Tracking Loop (Phase Detector) 62 and the PN tracking Loop 64 (best shown in FIG. 5). Typically, the symbol time, for the SACC, is fine during the preamble phase when the symbol rate is low, and there is a satisfactory SNR at the node level. In the Mission Phase, however, when the signal is buried in noise, the feedback correlation is used to build up the SNR. The SNR (C/No) is to be as high as possible to improve the tracking process. Signal Matched Filter 66 is one of the key components in setting the signal SNR of the S_IR tracking loop 60.

Figure 9A:
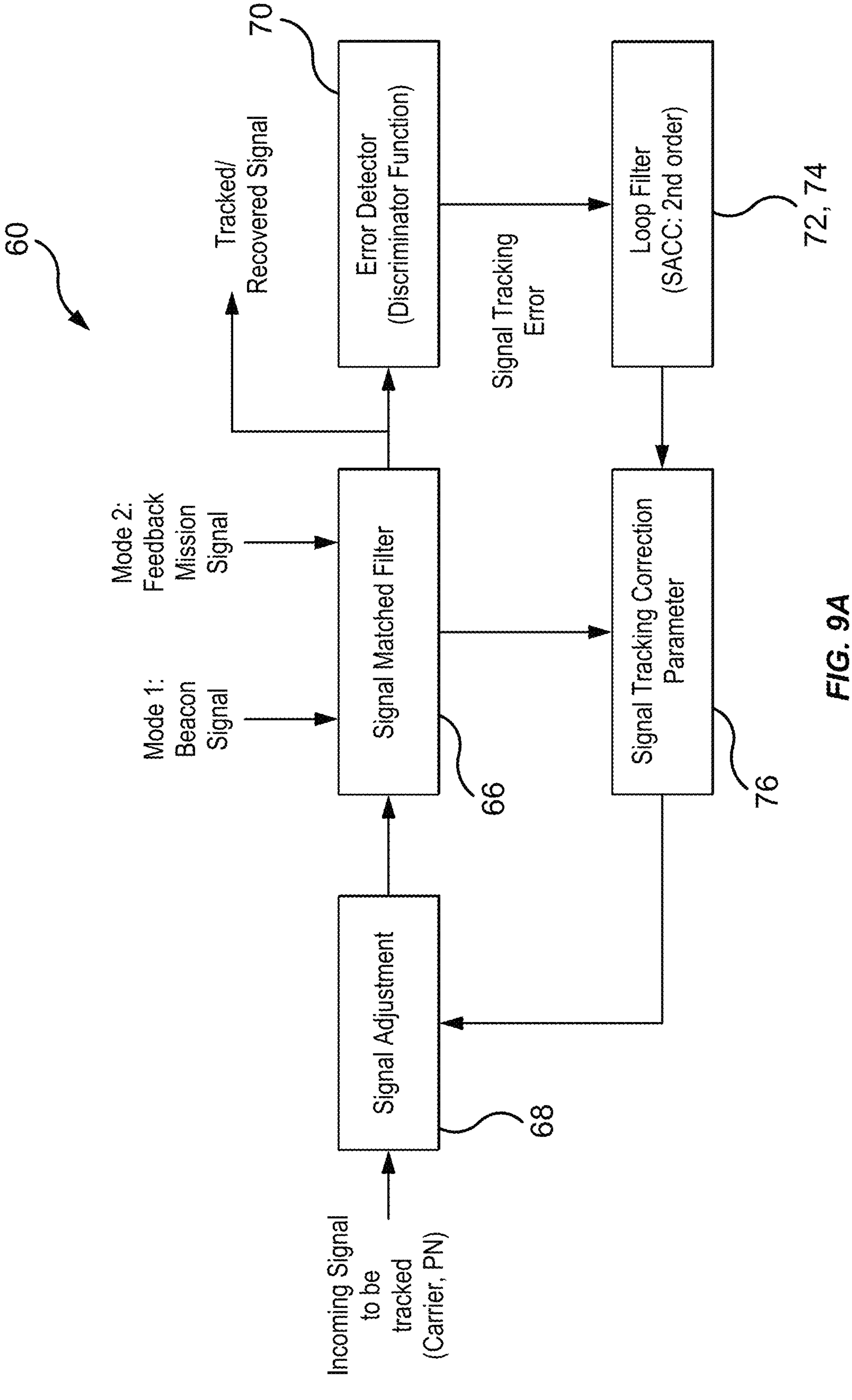
FIG. 9A is representative of the subject Generic Functional Block Diagram of the S_IR Tracking Loops.
Figure 9B:
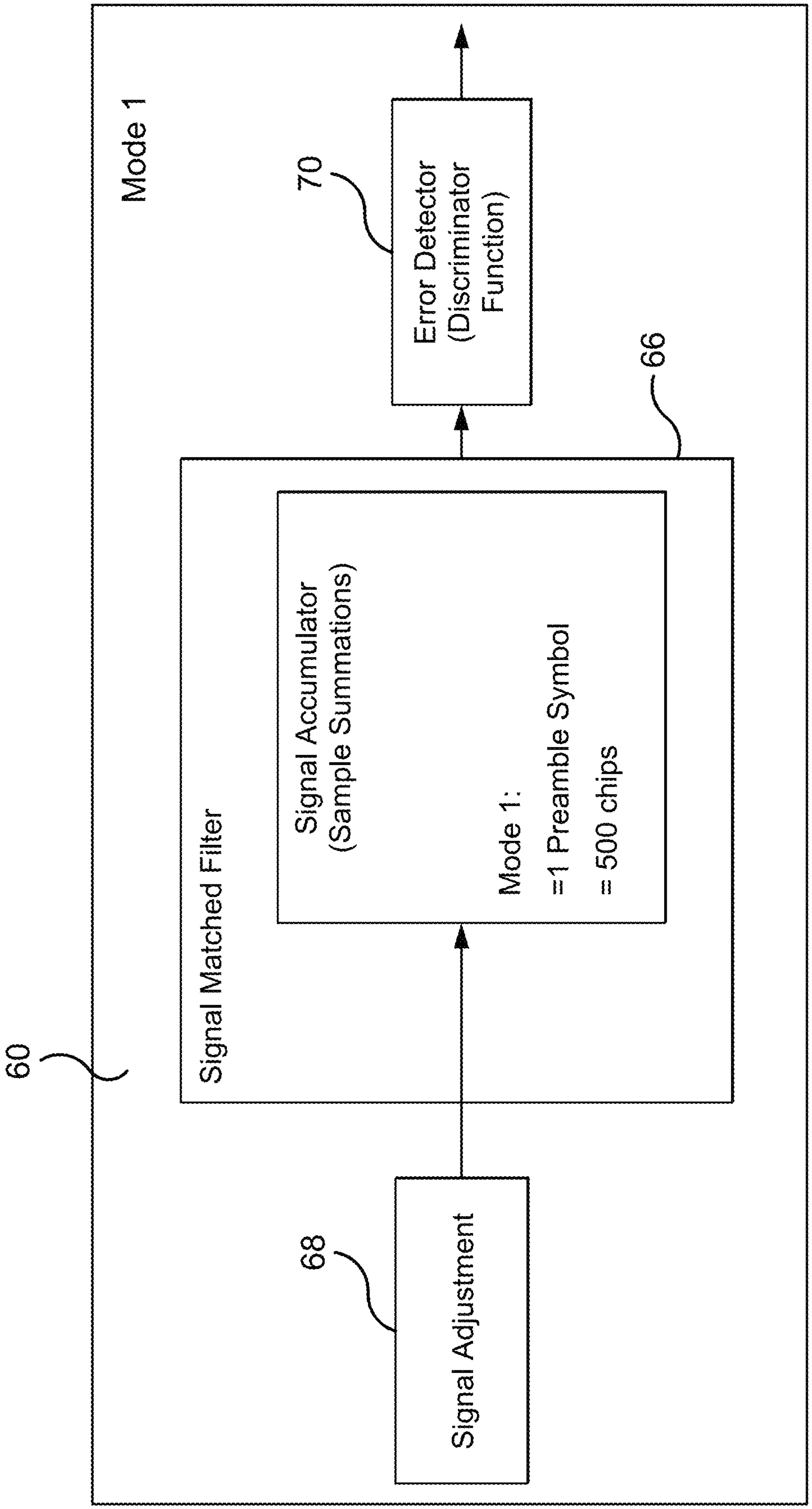
FIGS. 9B-9C detail the operation of the Signal Matched Filter of FIGS. 5 and 9A for Mode 1 processing (FIG. 9B), and for Mode 2 processing (FIG. 9C)
Figure 9C:
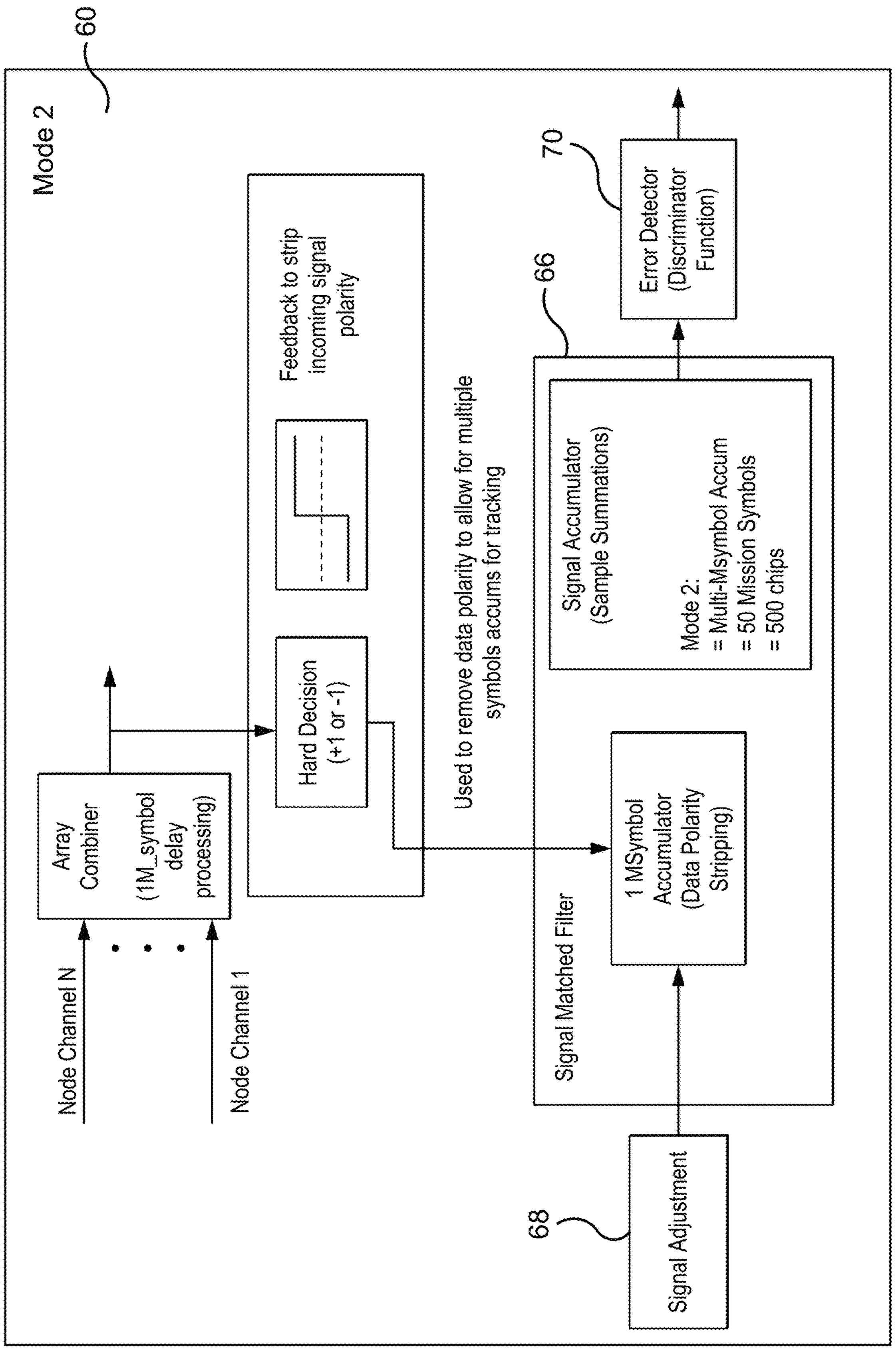

As depicted in FIGS. 9A-9C, the incoming signal to be tracked (both the Carrier and PN code) is received at the input of the Signal Adjustment Unit 68 which operates to adjust the signal if the signal tracking error has been detected. The output of the Signal Adjustment Unit 68 is coupled to the input of the Signal Matched Filter 66 (best shown in FIGS. 5 and 9A-9C) which operates to accumulate samples of the incoming signals in order to build up the SNR (C/No) as high as possible in order to improve the tracking operation. The Signal Matched Filter 66 receives the Beacon Signals in Mode 1, and a Feedback Mission signals in Mode 2.

In Mode 1, as depicted in FIG. 9B, the accumulation of the signal samples in the Signal Matched Filter 66 is timed to be synchronous with the Preamble Symbols, so the summation of symbol samples is performed to match the +/−1's of the preamble symbols. The Preamble symbols are at a low enough symbol rate, where each individual Preamble symbol has a relatively high SNR (~7.5 dB), and thus each symbol can successfully drive the tracking loop operations.

In Mode 2, as depicted in FIG. 9C, the SNR of the Mission symbols in each SACC processing channel (SCP) is buried in noise, so the Mission symbols cannot be used alone to drive the tracking loops. Accordingly, a polarity of the arrayed sum signal is used to determine the polarity (via "hard decision" processing) of each Mission symbol, so its polarity can be stripped off and subsequently used in accumulation of multiple Mission symbols (without incurring signal polarity cancellation) to increase the effective SNR into the tracking loops to the 7.5 dB level afforded in Mode 1.

The Signal Matched Filter 66 outputs a Tracked/Recovered Signal. The output of the Signal Matched Filter 66 is coupled to the input of the Error Detector 70 which, when a discrepancy between the incoming signal and the Beacon signal (in Mode 1) or between the incoming signal and the Feedback Mission Signal (in Mode 2) is detected, provides the Signal tracking Error signal to the Carrier Loop Filter 72 and/or the PN tracking Loop Filter 74 (best shown on FIG. 5) which provides the Signal Tracking Correction Parameter 76 to the Signal Adjustment Unit 68 to adjust the incoming signal.

Figure 10:
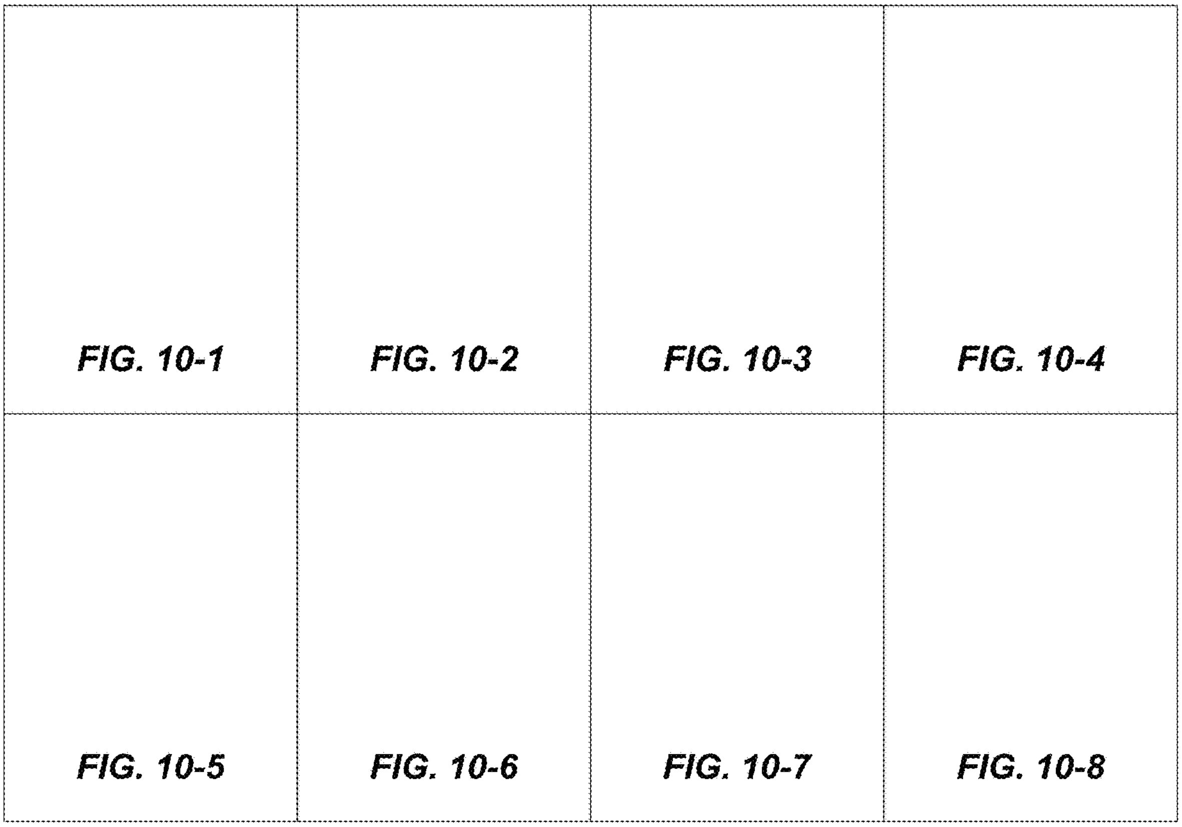
FIG. 10 is a scaled map of eight partial views that depicts the subject SACC S_IR Areas of Focus on Data Polarity Ops.
Figures 1, 10:
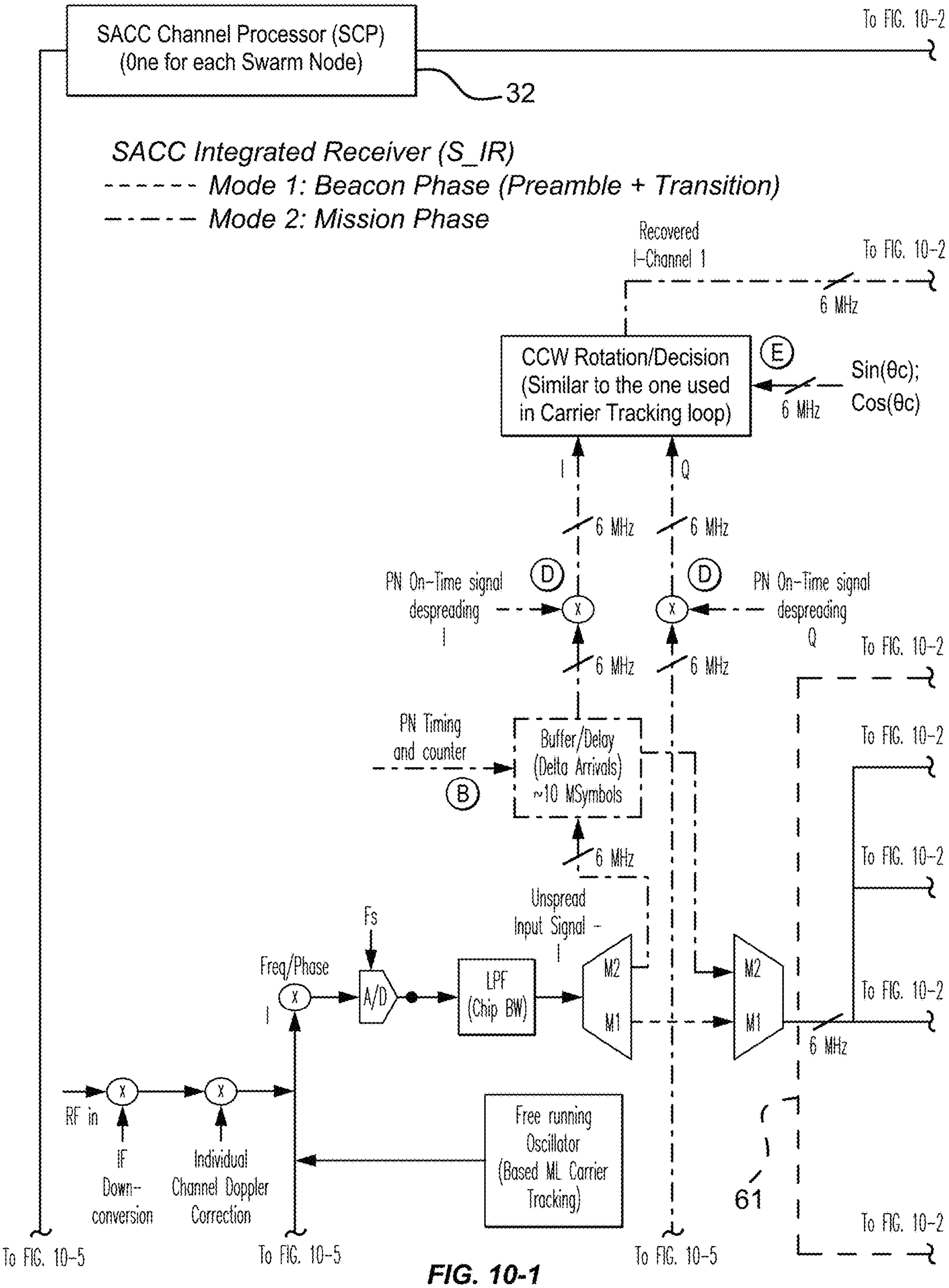
Figures 2, 10:
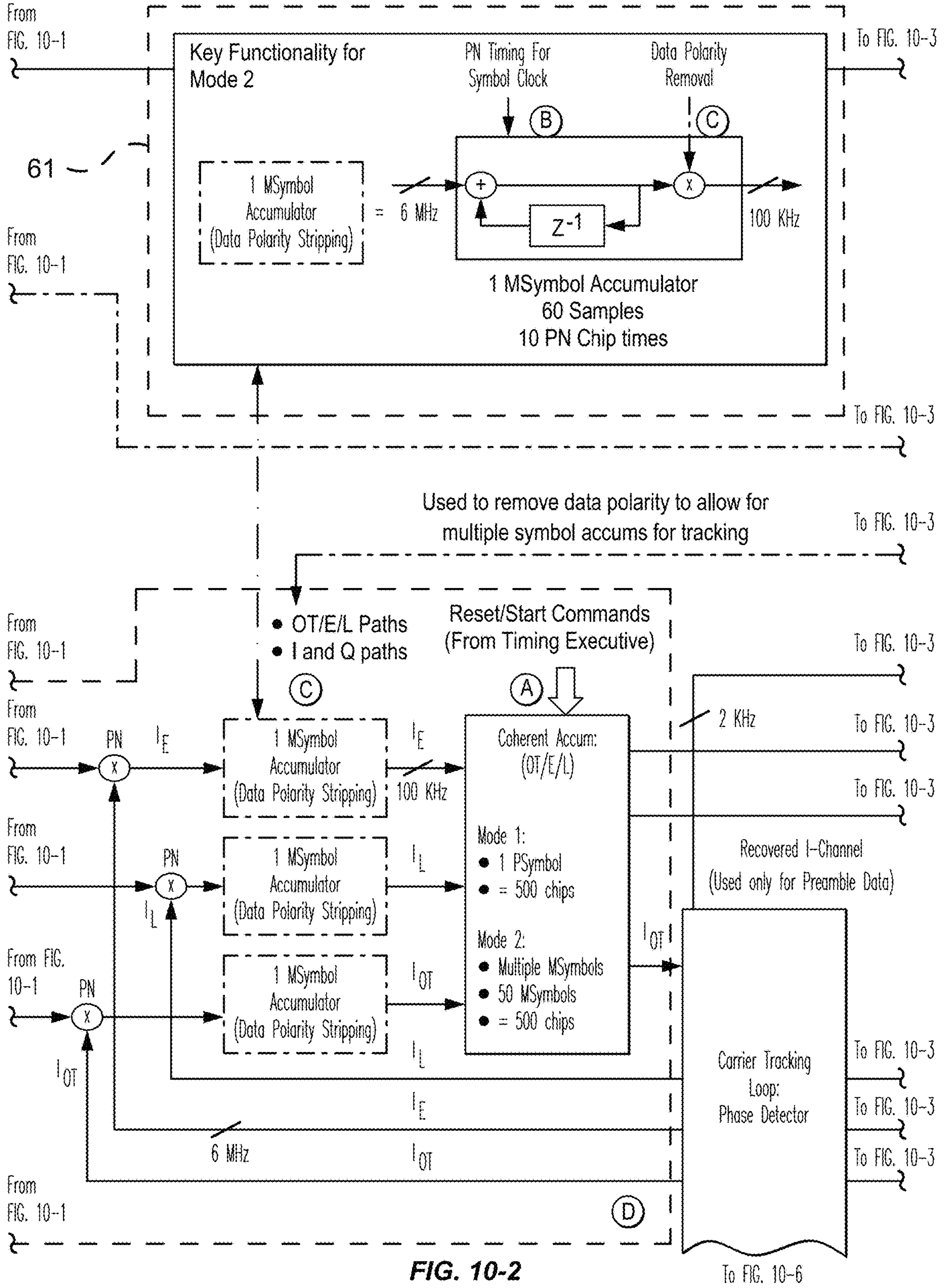
Figures 3, 10:
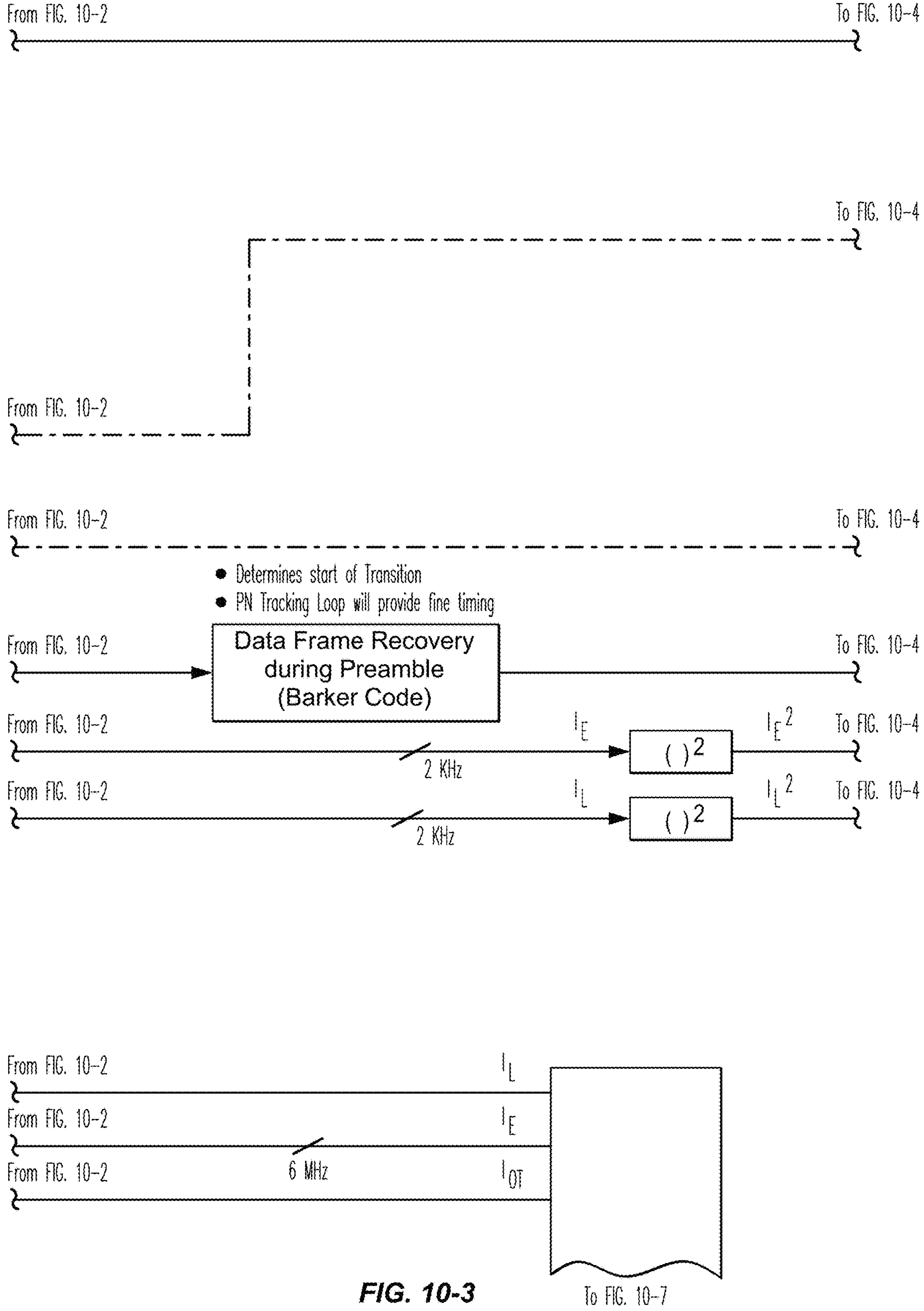
Figures 4, 10:
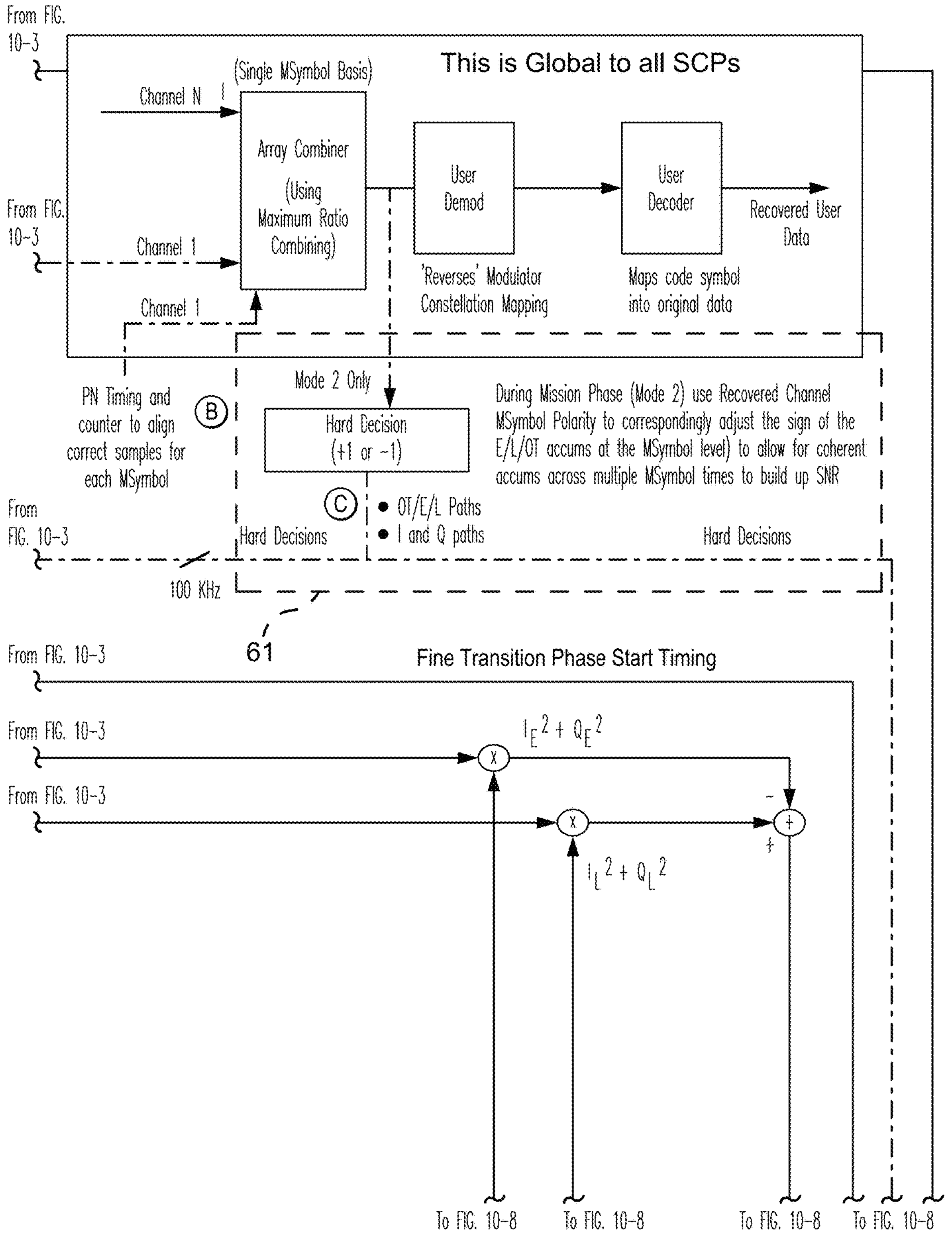
Figures 5, 10:
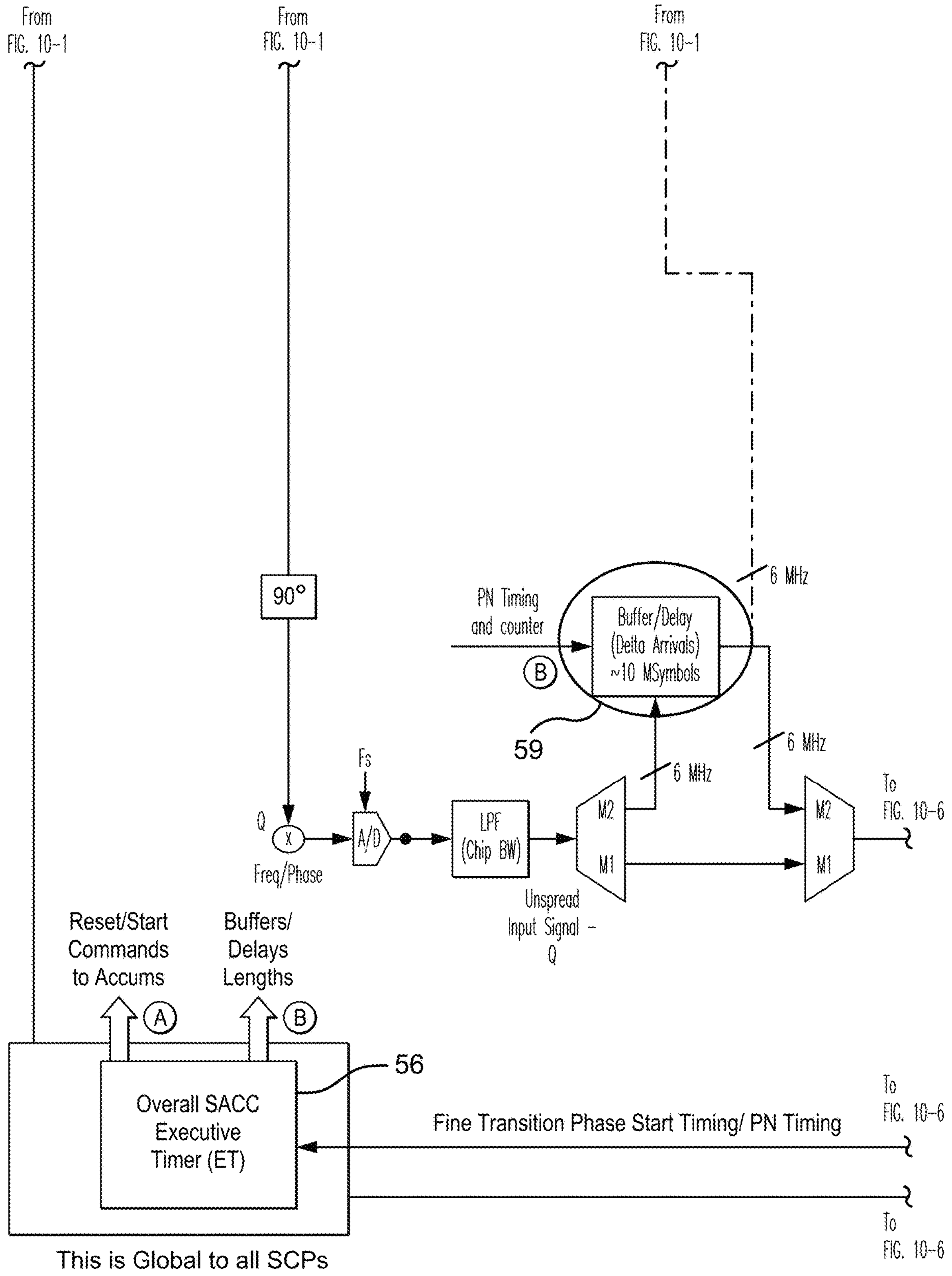
Figures 6, 10:
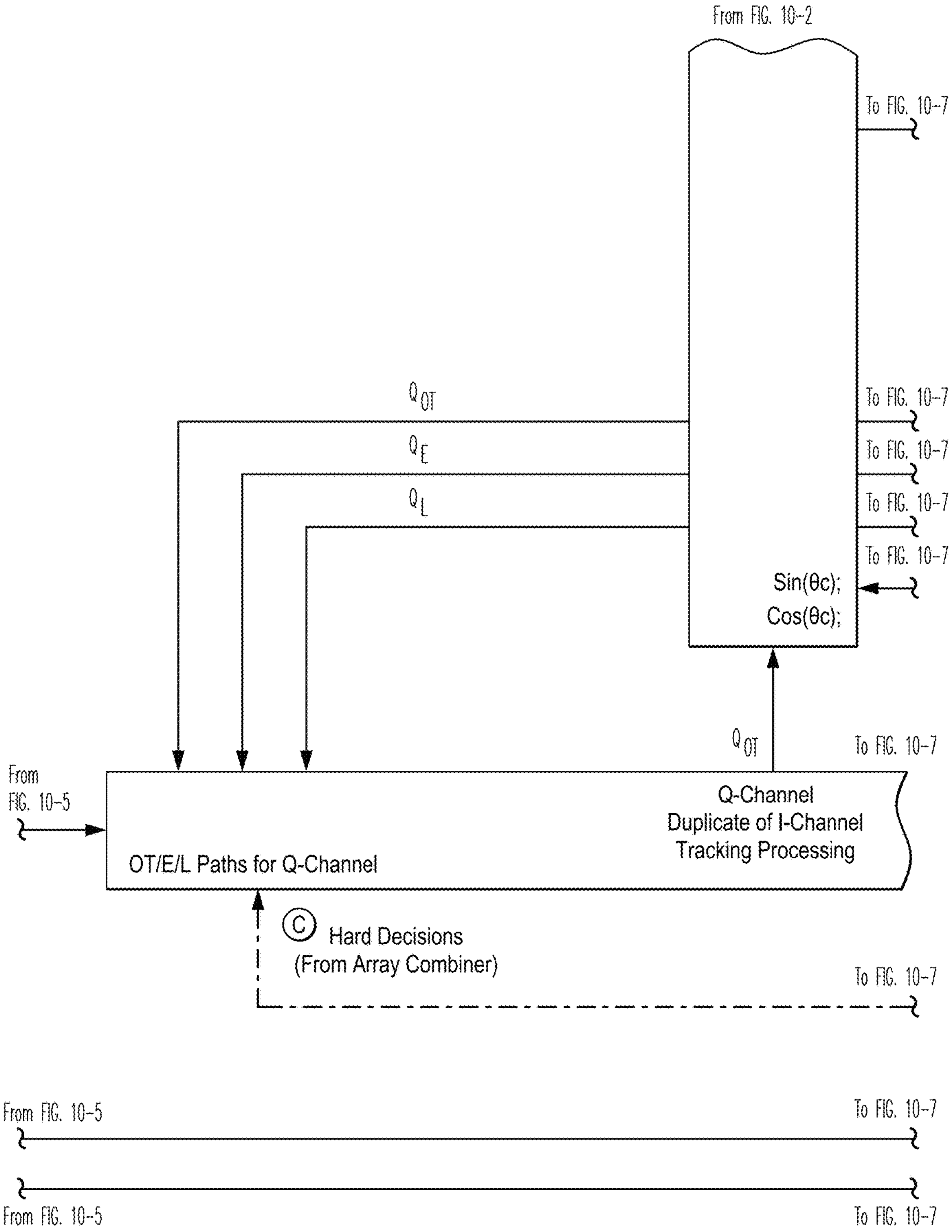
Figures 7, 10:
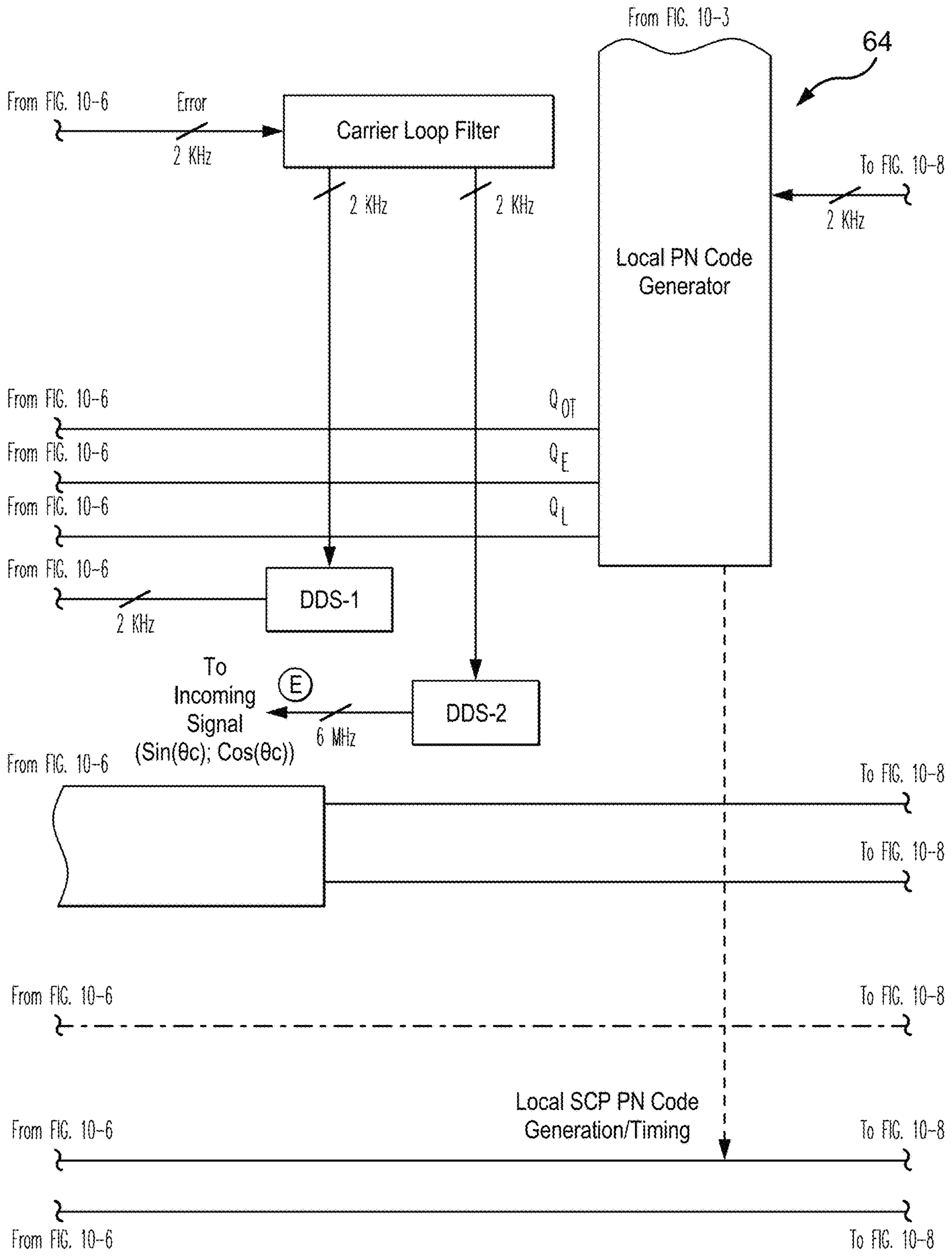
Figures 8, 10:
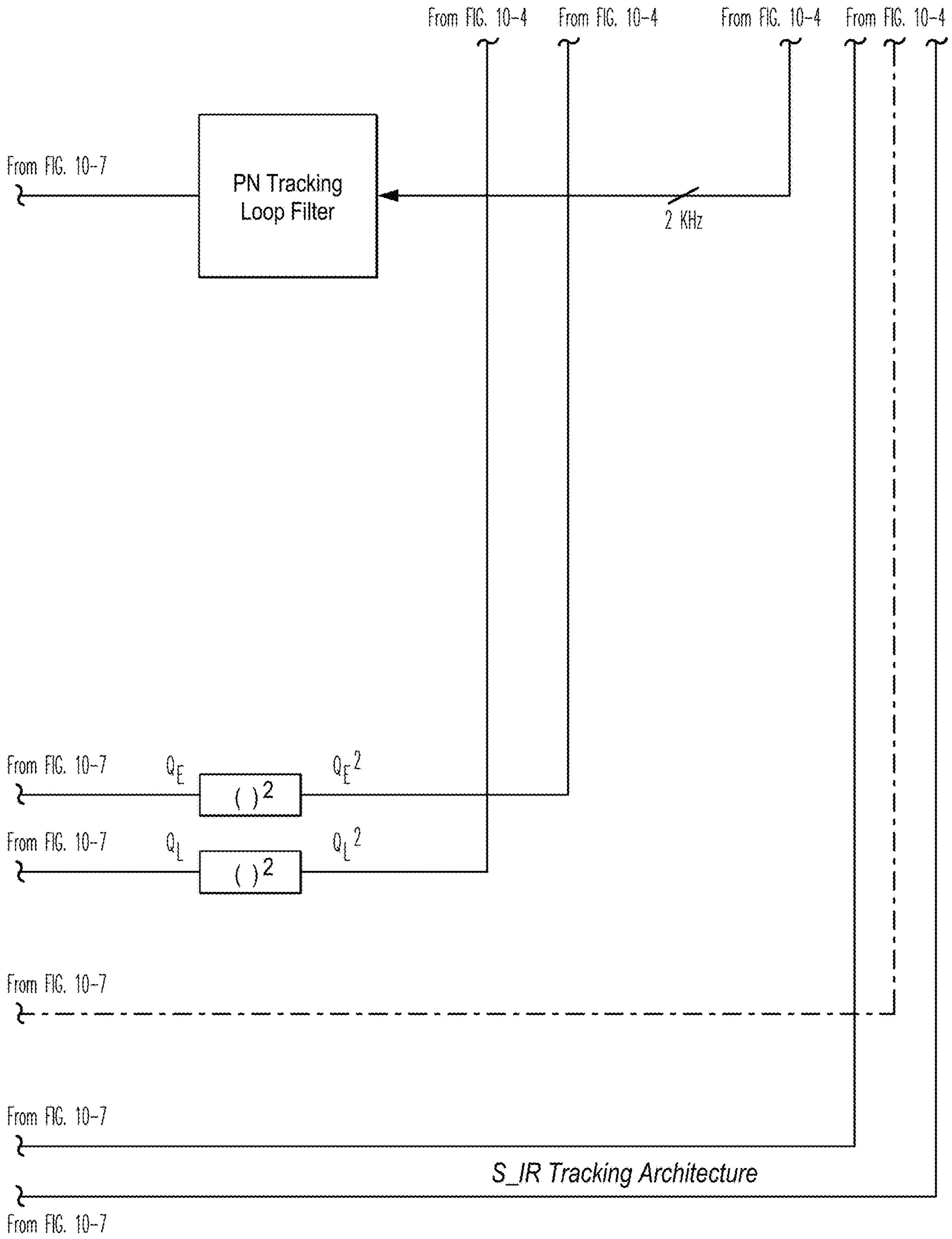

During the Mission phase (Mode 2), the Mission symbol rate is much higher than the Preamble symbol (PSymbol)

rate during the Preamble Phase, and each node signal is buried in noise, so the usage of a single Mission symbol (MSymbol) for a loop update does not apply. This is where another key innovation of the SACC system 10, i.e., the Data Polarity Stripping Sub-System 61, operates, as shown in FIGS. 5 and 10. Since all nodes have the same symbol data, the recovered combined signal output from the Array Combiner 40 is used to make a "hard decision" on the polarity of the Mission data. If the Mission symbol rate (for example, 100 Ksps) is 50× the Preamble symbol rate (for example, 2 Ksps), then 50 polarity-stripped Mission symbols are added to each other to obtain the SNR equivalent to one Preamble symbol (Psymbol) provided to the tracking loops that supports successful tracking during the Beacon phase (Mode 1).

It is realized that there is an extra one loop update delay in this processing which in a nominal case is 500 usec (=1/[2 KHz]). Per previous analysis, the maximum delay buffering due to differential node arrival times is 100 usec. So, the effective time delay is 500 usec. The tracking loops use a 2nd order loop filter 72,74, so the Doppler is being tracked with phase error arising from the Doppler Rate term, which has been shown to be <0.296 Hz/sec. In 500 usec, the frequency change that is not tracked=0.00015 Hz (=500 usec*0.296 Hz/sec). The resulting phase error is 0.05 deg which is negligible since the phase arraying requires tracking for each node phase to within 10-20 deg.

Maximum Ratio Combining (MRC)/Covariance Matrix for Array Combining

Figure 11:
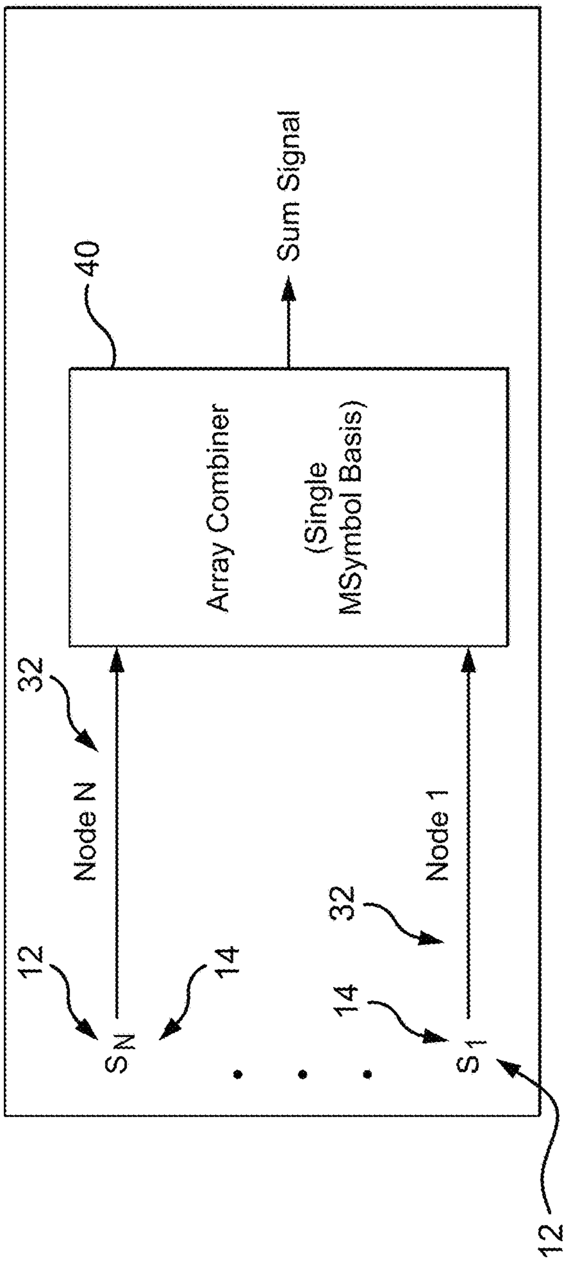
FIG. 11 is a schematic representation of the subject SACC Array combiner.

An optimum approach to summing the node signals coming into the Array Combiner 40 from all of the S_IR node SCPs 32 is depicted, in a simplified format, in FIG. 11 and is detailed in previous paragraphs. Due to the fact that the nodes SNRs can be different, the most efficient way to 'sum' these node signals is by using the "inversely" proportion to their SNR values. In particular, this problem arises in scenarios such as TDRSS MA (Tracking and Data Relay Satellite System with Multiple Access return sub-system) Beamforming and in rake antenna processing that receives multiple multipath fading signals.

Figure 12:
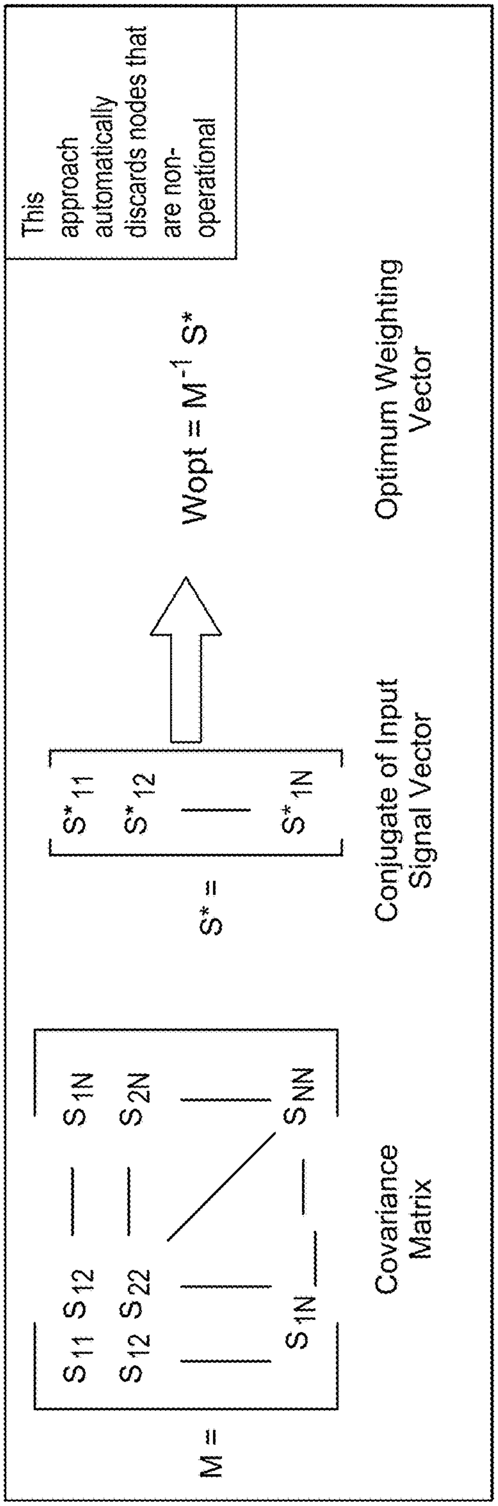
FIG. 12 is representative of the Optimum Signal Combining Using the Covariance Matrix Approach.

In the TDRSS MA case, a covariance matrix is computed to provide the optimum weights to be applied to the phased array antenna element signals for signal combining (as presented in FIG. 12). As noted, nonoperational node signals are automatically removed from the sum channel calculation.

The other approach may be used which commonly is applied in Rake receivers is referred to as Maximum Ratio Combining (MRC). This is the baseline approach used by the S_IR due to its simpler hardware implementation, which may be found in https://wirelesspi.com/maximum-ratio-combining-mrc/.

Figure 13:
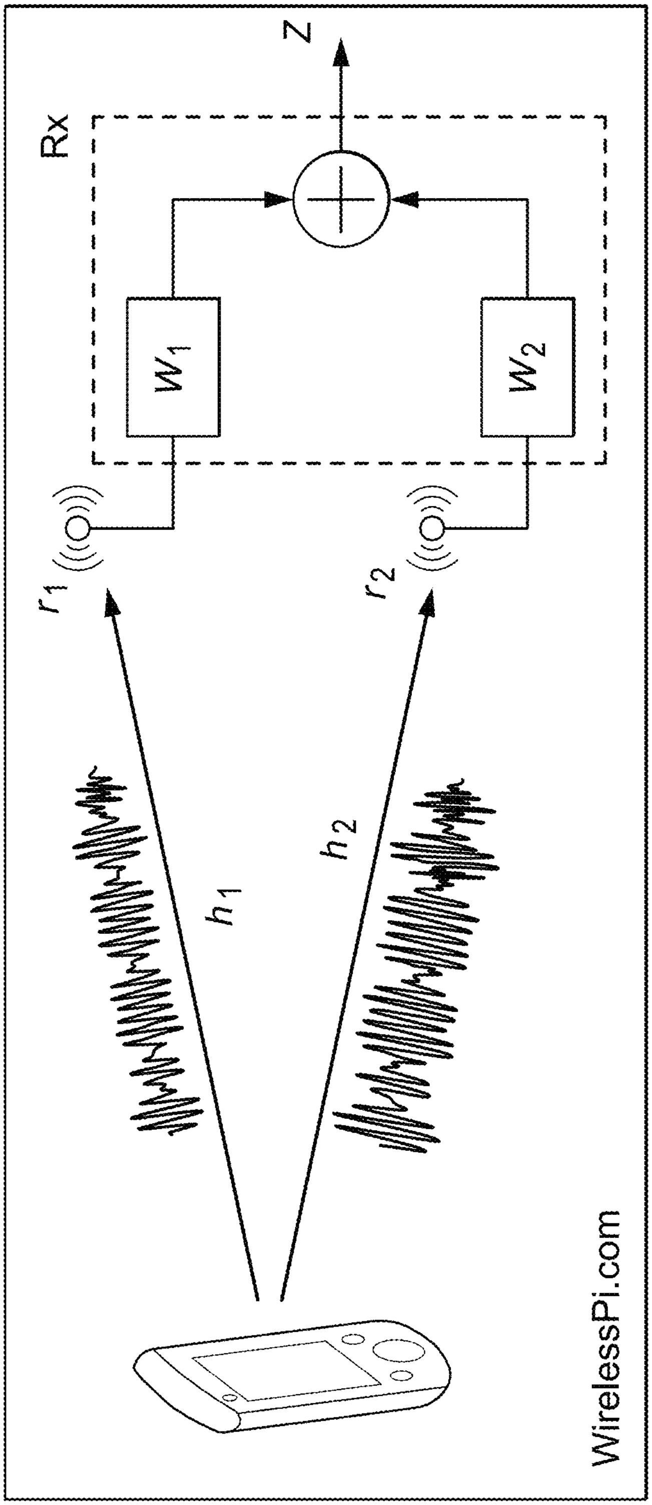
FIG. 13 illustrate the concept of the MRC Combing Problem.

The foundation of this approach is based on the context of fading channels and multiple antennas receiving the same transmitted signals which is the classic phased array beamforming problem depicted in FIG. 13.

In FIG. 13, as an example of two nodes of a plurality of transmitting nodes in a swarm, r1 is the signal received by a first antenna, while r2 is the signal received by a second antenna (in the SACC context the first and second antennas are correlated with a first and second nodes, respectively), h1 is the flat fading channel gain between the transmitting (Tx) antenna and the first receive antenna, and h2 is the flat fading channel gain between the transmitting (Tx) antenna and the second receive antenna.

Consequently, the expressions for the signals at the Rx is given by:

$$r1 = h1 \cdot s + \text{noise}$$
$$r2 = h2 \cdot s + \text{noise}$$

Here, the channel gains h1 and h2 are usually modeled as complex Gaussian random variables.

In "selection combining", the power arriving at each receiving antenna is scanned, and the one with the highest SNR is chosen. However, selecting the antenna with the best SNR implies that energy at the other antennas is neglected. Instead, the subject design has been modified to maximize the SNR by scavenging the energy from all Rx antenna streams. Picking additional spatial samples from the air is not enough. It is needed to know how to efficiently utilize them.

The first approach is to sum the signals from all these antennas. Since the channel gains h1 and h2 are complex Gaussian random variables, it implies that their magnitudes are Rayleigh distributed and phases are uniformly distributed between 0 and 2π. Therefore, adding several complex numbers with random phases tends to average out the summation which is not satisfactory.

Figure 14:
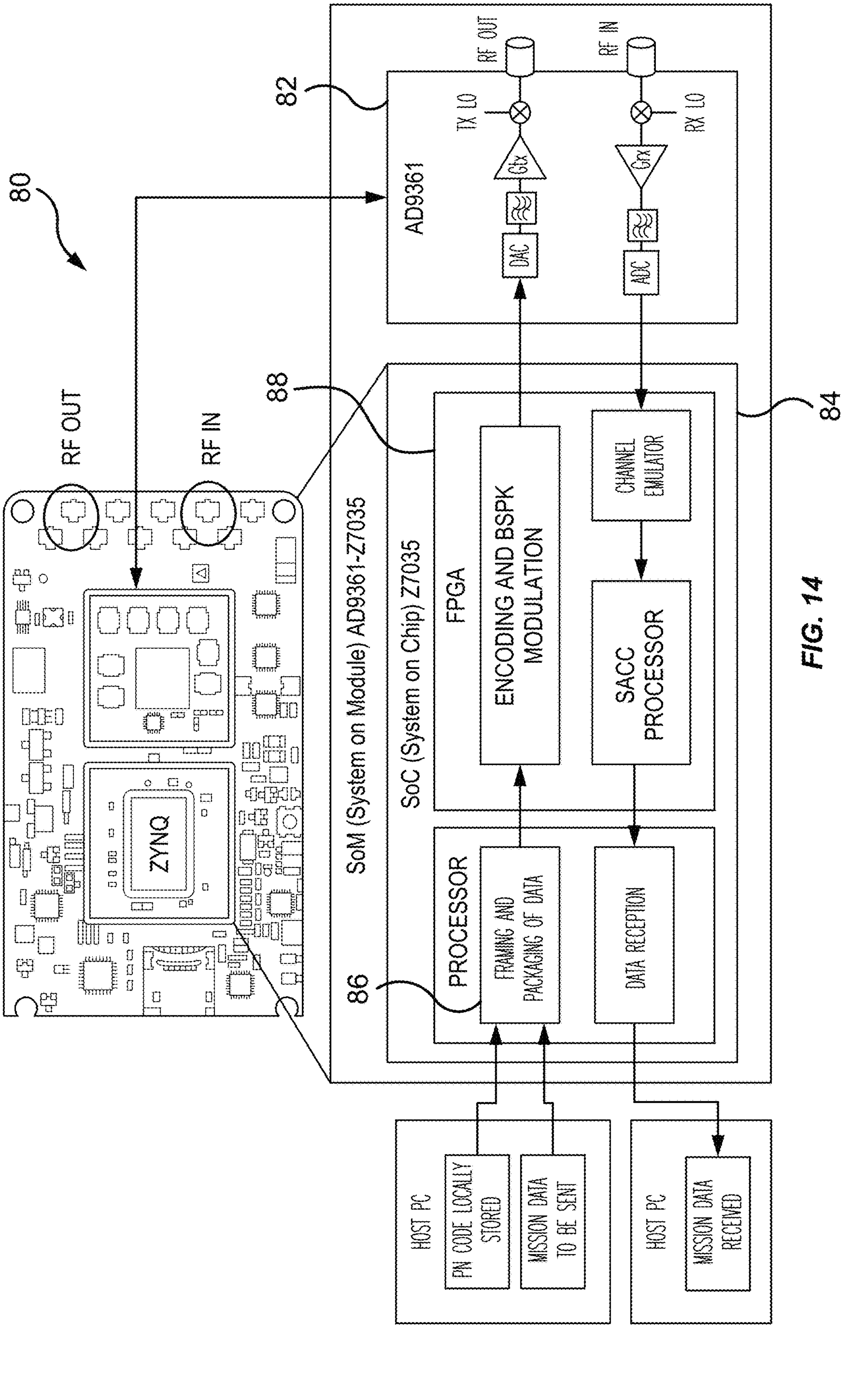
FIG. 14 depicts the subject System on Module (SoM) HW Selected for the SACC Development.

A Maximum Ratio Combining (MRC) receiver 80 is depicted in FIG. 14, that forms the decision through a linear combination of r1 and r2 after weighting them with complex scalars w1 and w2, respectively. The output signal z is given by:

$$\begin{aligned} z &= w1 \cdot r1 + w2 \cdot r2 + \text{noise} \\ &= w1 \cdot h1 \cdot s + w2 \cdot h2 \cdot s + \text{noise} \\ &= \{w1 \cdot h1 + w2 \cdot h2\} \cdot s + \text{noise}. \end{aligned}$$

The general expression for N antennas (or nodes 14 in the SACC context) can be written as:

$$z = s \sum wi \cdot hj + \text{noise (where the sum is over } N).$$

Here, the effect of scaling by wj on the noise samples is ignored for simplicity. Also, while the parameters wj in classical beamforming were selected according to the signal direction of arrival or departure, a different criterion is chosen in virtual beamforming due to the absence of a single such direction owing to multipath nature of the wireless channel.

Each channel gain hj is a complex number with magnitude |hj| and phase ∡hj. Magnitudes and phases of wj can be represented in a similar manner. Then, we can write their complex product (in which magnitudes are multiplied while phases are added) below. In complex notation, this is written as:

$$wj \cdot hj = |wj| \cdot |hj| \cdot e^{j[(\measuredangle wj + \measuredangle hj)]}$$

In terms of real signals, $$|wj \cdot hj| = |wj| \cdot |hj|$$

$$\measuredangle(wj \cdot hj) = \measuredangle wj + \measuredangle hj$$

To see how the optimal wj are chosen, the SNR of each node channel is calculated to capture hi of each channel. It is understood that the branches with better SNR provide a more reliable contribution towards making the modulation symbol decision. Therefore, the branches with higher SNRs should be given more weight as compared to the ones with less signal energy. In the algorithm, this can be accomplished by choosing |wj| the same as |hj|.

$$|wj| = |hj|$$

When the magnitudes of wj are chosen according to the above expression, the output becomes $z = s\Sigma|hj|^2 + \text{noise}$.

It is shown that the energy from all the Rx branches has been being summed in the above expression (without any detrimental effects that come from out-of-phase summations)—this is generalized beamforming. As a consequence, this is the optimal approach for signal processing decisions, and hence MRC performance is preferred over every other Rx diversity scheme.

SACC Modeling and Board Overview

The hardware selected to implement the SACC architecture may be, for example, the System on Module (SOM) AD9361-Z7035. This architecture is also known as RF-SoC. As depicted in FIG. 14, the System-on-Module 80 includes two main building blocks, including:

An RF analog front-end transceiver (AD9361) 82, and

A System on Chip (SoC Z7035) 84.

The AD9361 82 is the RF analog front-end responsible for A/D and D/A signal conversion, low pass filtering, RF gain control, and RF up/down-conversion. The different parameters are configurable based on the application requirements. The key parameters driving the limits on the SACC system are a maximum sample rate of 61.44 Msps and a range of TX/RX RF frequencies from 70 MHz to 6.0 GHz.

The Z7035 is a System on Chip 84 which combines a microprocessor 86 and an FPGA 88. Most of the SACC functionalities are implemented for running in the FPGA 88. The microprocessor 86 may run only simple functions which do not need real-time computation.

The SACC system 10 has been developed with a Model-based approach. The different SACC functionalities in the transmitter and the receiver may be implemented in a Simulink model, based on the SACC system engineering requirements, with HDL-compatible Simulink blocks. With this approach, the FPGA resources can be effectively assessed for utilization. Moreover, the building blocks under development in the model can be easily tested in the hardware.

Figure 15:
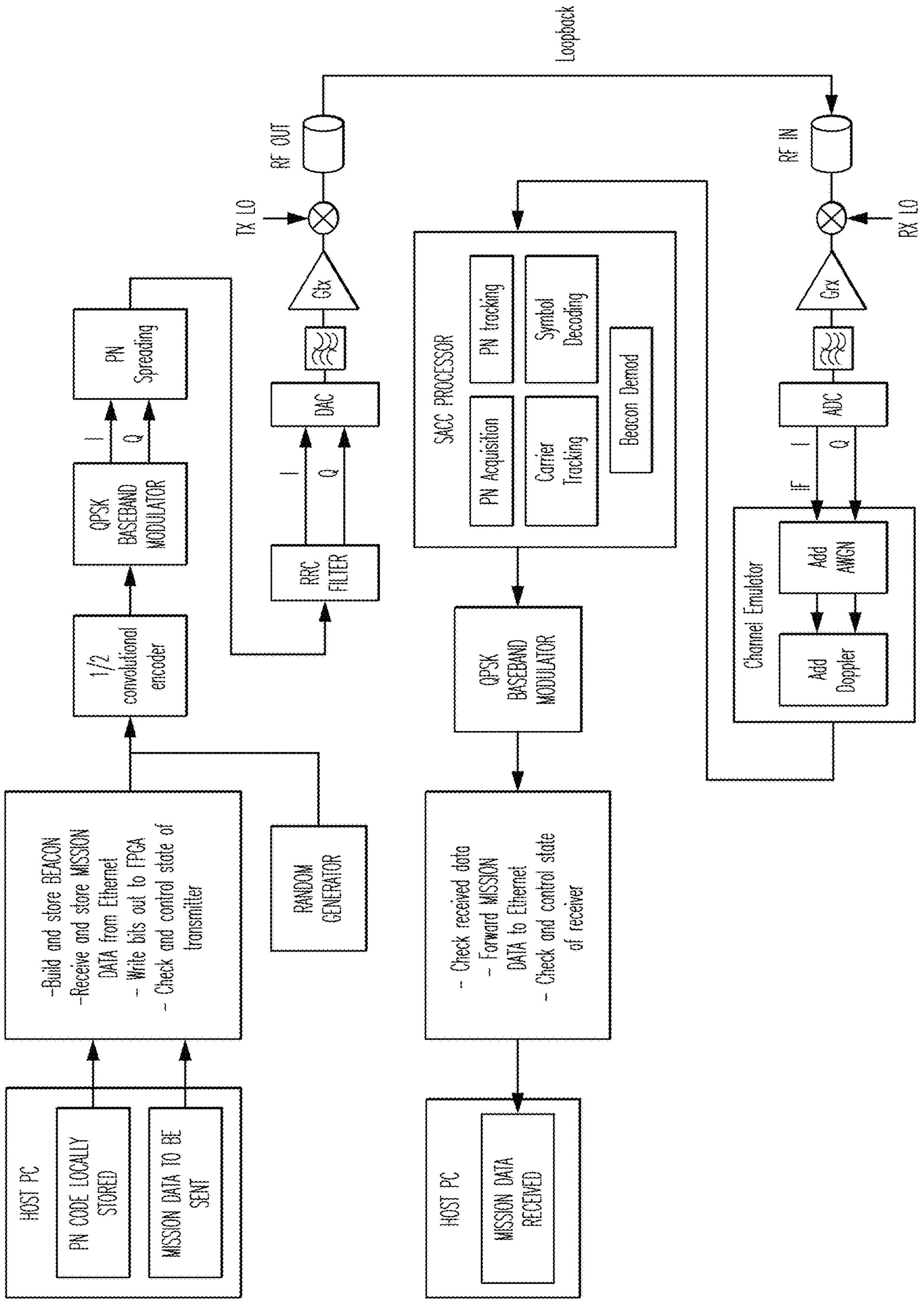
FIG. 15 is representative of one of the implementations of the Basic SACC TX and RX Chain.

Implementation of the PN spreading, PN acquisition and PN tracking functions, as well as debugging and integration in hardware, are presented in FIG. 15, where the whole SACC basic TX chain and RX chain are depicted.

In order to maintain flexibility in the model, all functionalities have been parametrized. System design parameters have been initialized in a dedicated MATLAB function which the user can modify upon simulation needs, such as PN code length, window length, correlation thresholds and timeouts, among others. Such a file is depicted in FIG. 16.

Model Sample Rates

Figure 17:
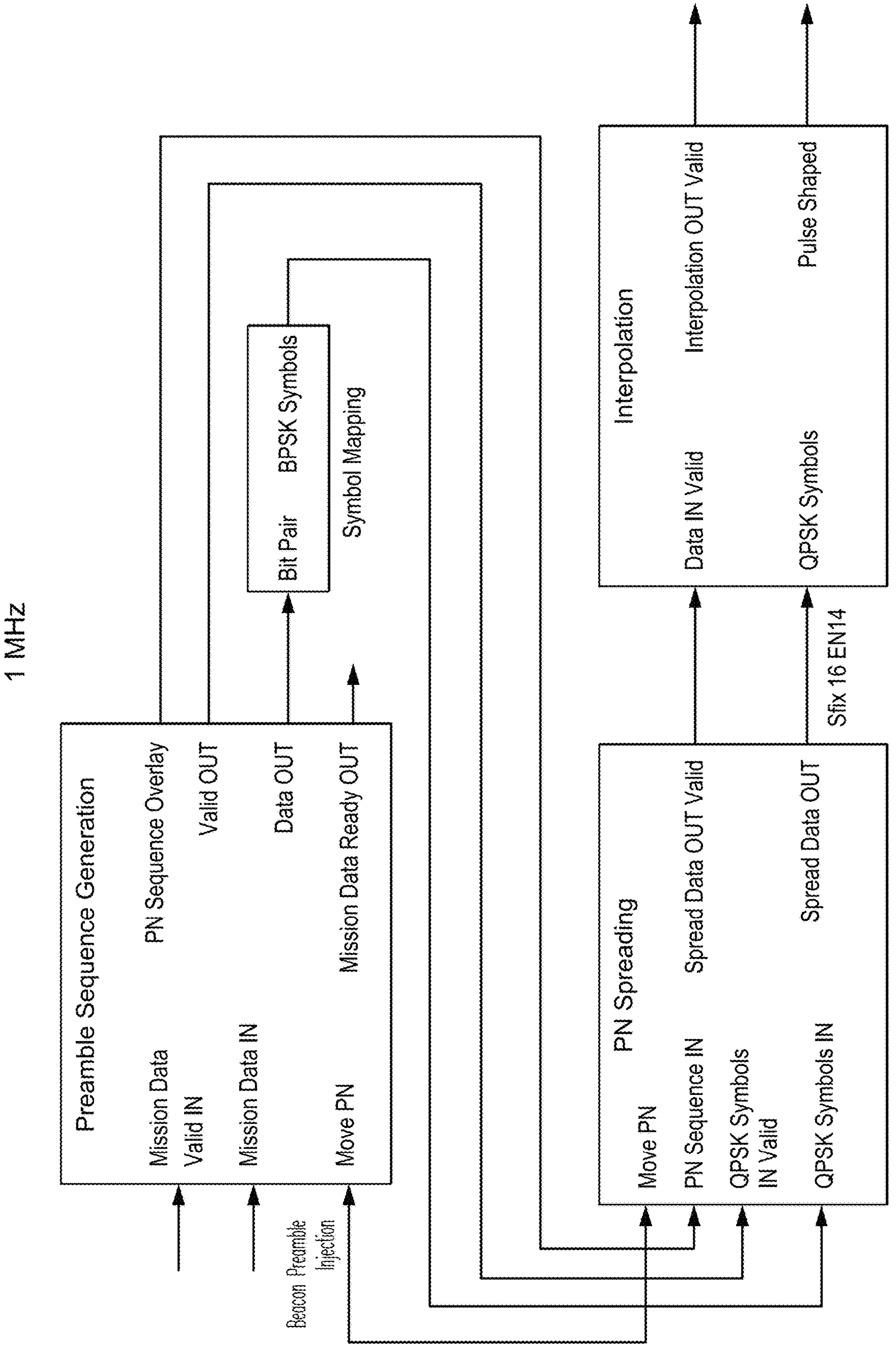
FIG. 17 depicts an exemplary Sampling Frequency used in the TX Chain.

Adjusting the sample rates in the overall model stages in both the TX and the RX chains shown in FIG. 15, is a crucial preliminary step before starting implementation of SACC system functionalities. The sampling rates have been adjusted by using parametrized up-sampling, down-sampling and RRC blocks, according to the SACC application requirements. The frequency absolute value of the sampling rates can be adapted during the implementation in order to ease simulation runs, but the sampling rate ratio between the main building blocks is to be maintained. FIG. 17 illustrates an example of a sample rate of 1 MHz used in the TX.

PN Spreading

Figure 18:
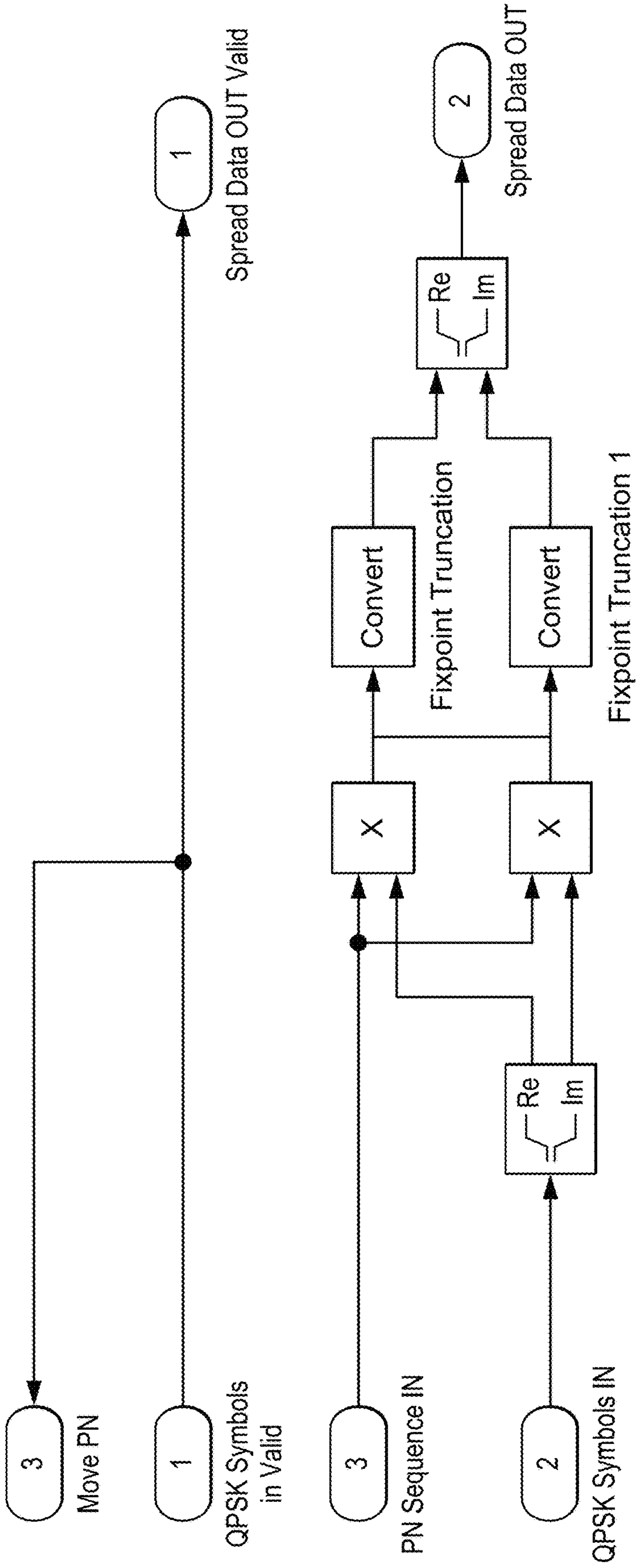
FIG. 18 shows the PN Spreading Implemented in the Transmission Chain.

A PN spreading functionality has been implemented with HDL-compatible Simulink building blocks. The PN spreading is performed by multiplying the signal to be transmitted with a serialized version of the local PN code at the PN chip rate, as depicted in FIG. 18.

PN Acquisition

Figure 19:
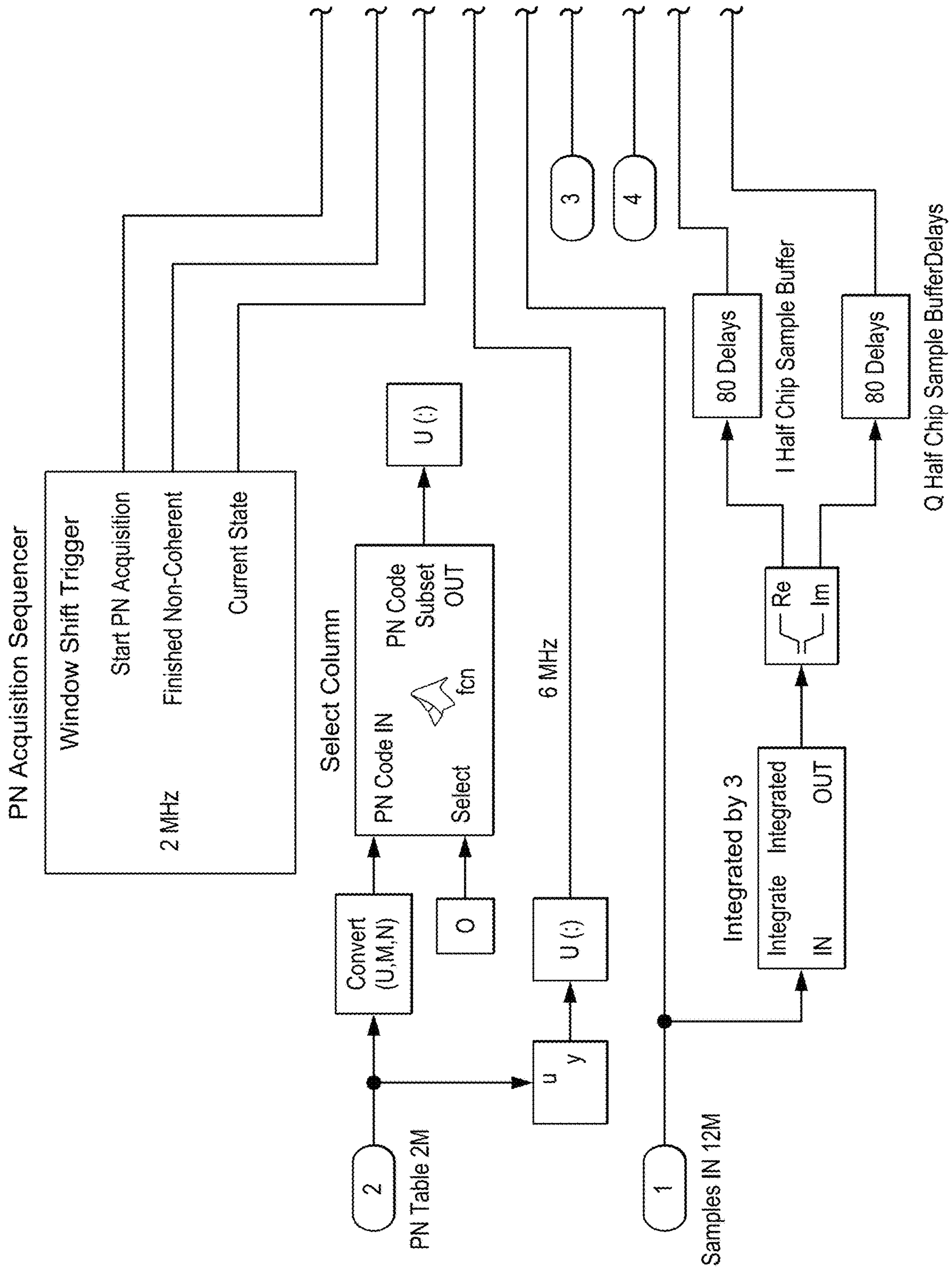
FIG. 19 depicts the PN Acquisition Main Block in Simulink and Interface with Incoming Samples.
Figure 19:
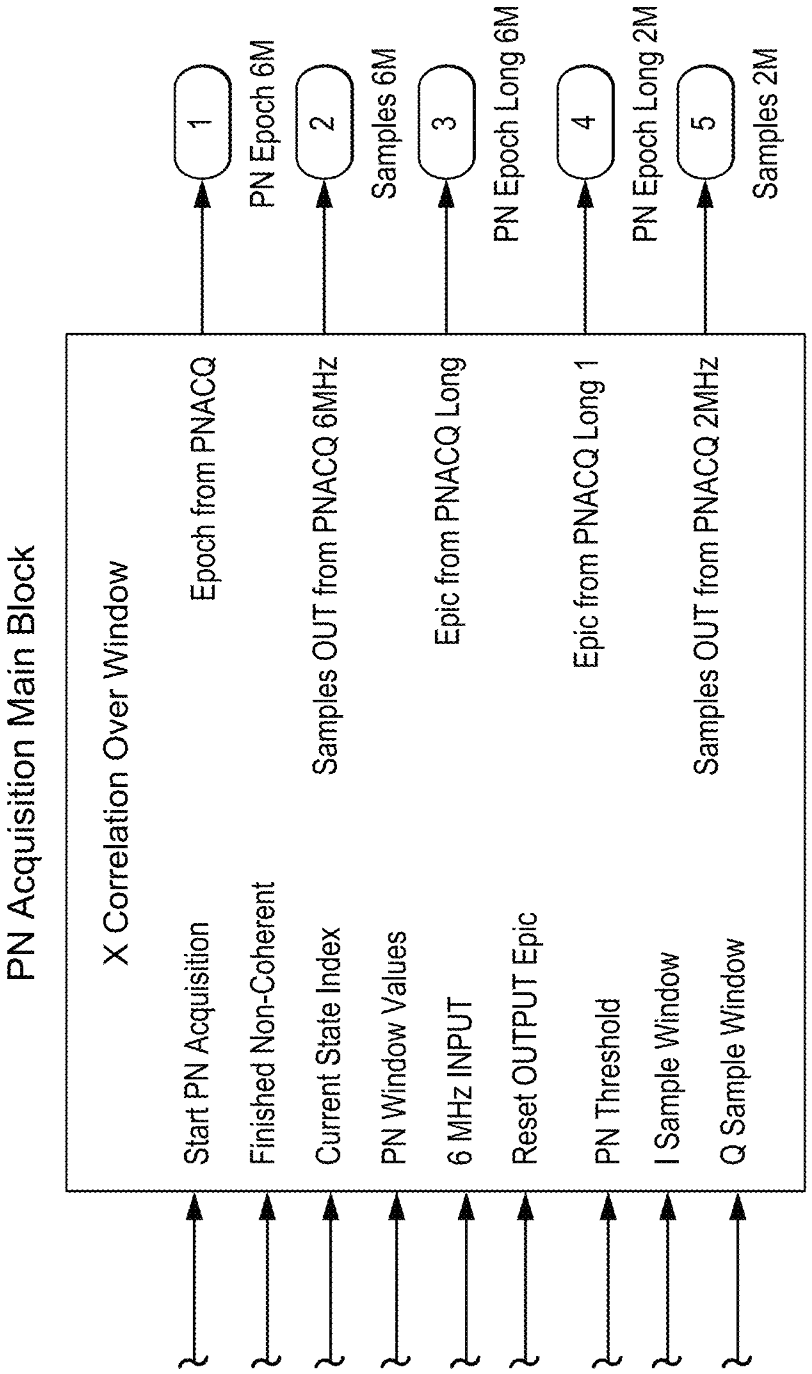
Figure 20:
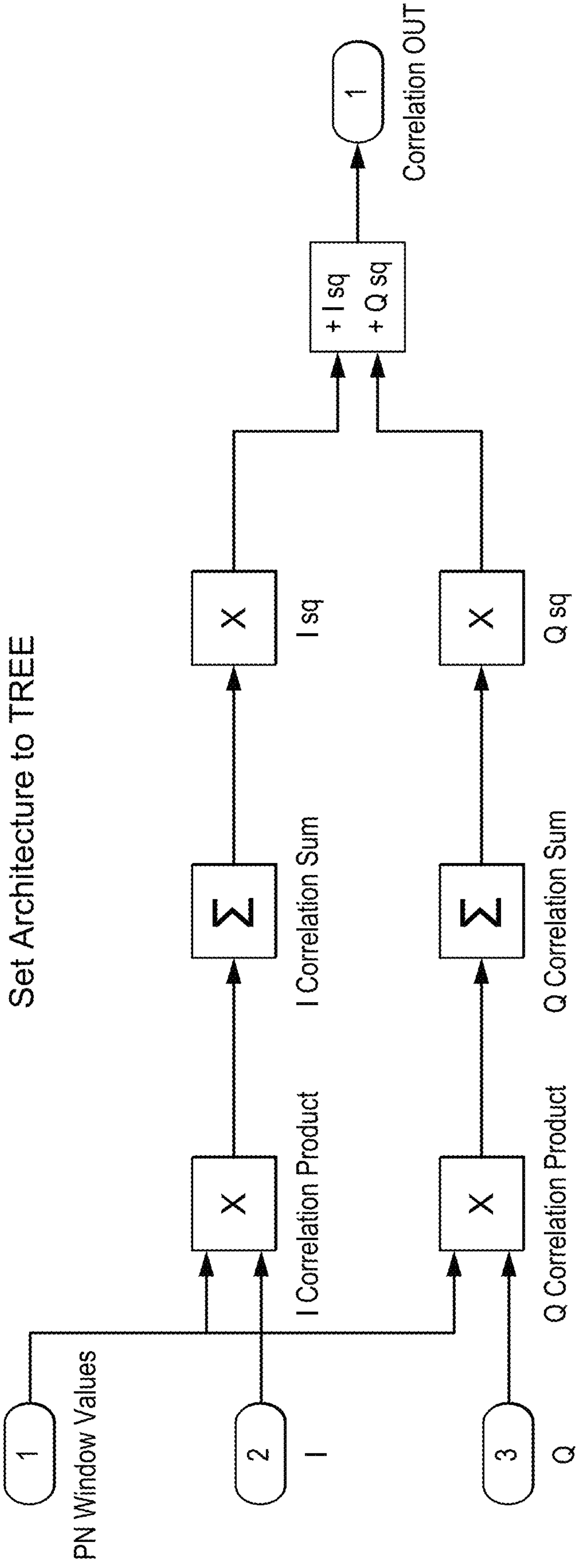
FIG. 20 is representative of the Low-Level Detail Implementation of PN Acquisition.

The current PN acquisition is implemented in a PN code window approach. The received signal is down sampled to a half a PN chip rate. The signal is continuously correlated with a local portion of the PN code, which is loaded in the correlation window. The correlations results are non-coherently added in order to build a higher SNR. A Largest of Detection (LOD) criteria is implemented to detect the highest correlation peak. The output of this block is an input signal aligned with the local PN code with a half PN chip accuracy. This output is provided to the PN tracking where finer accuracy will be achieved. Some snapshots of the exemplary PN Acquisition block and sub-blocks are shown in FIGS. 19 and 20, respectively.

Figure 21:
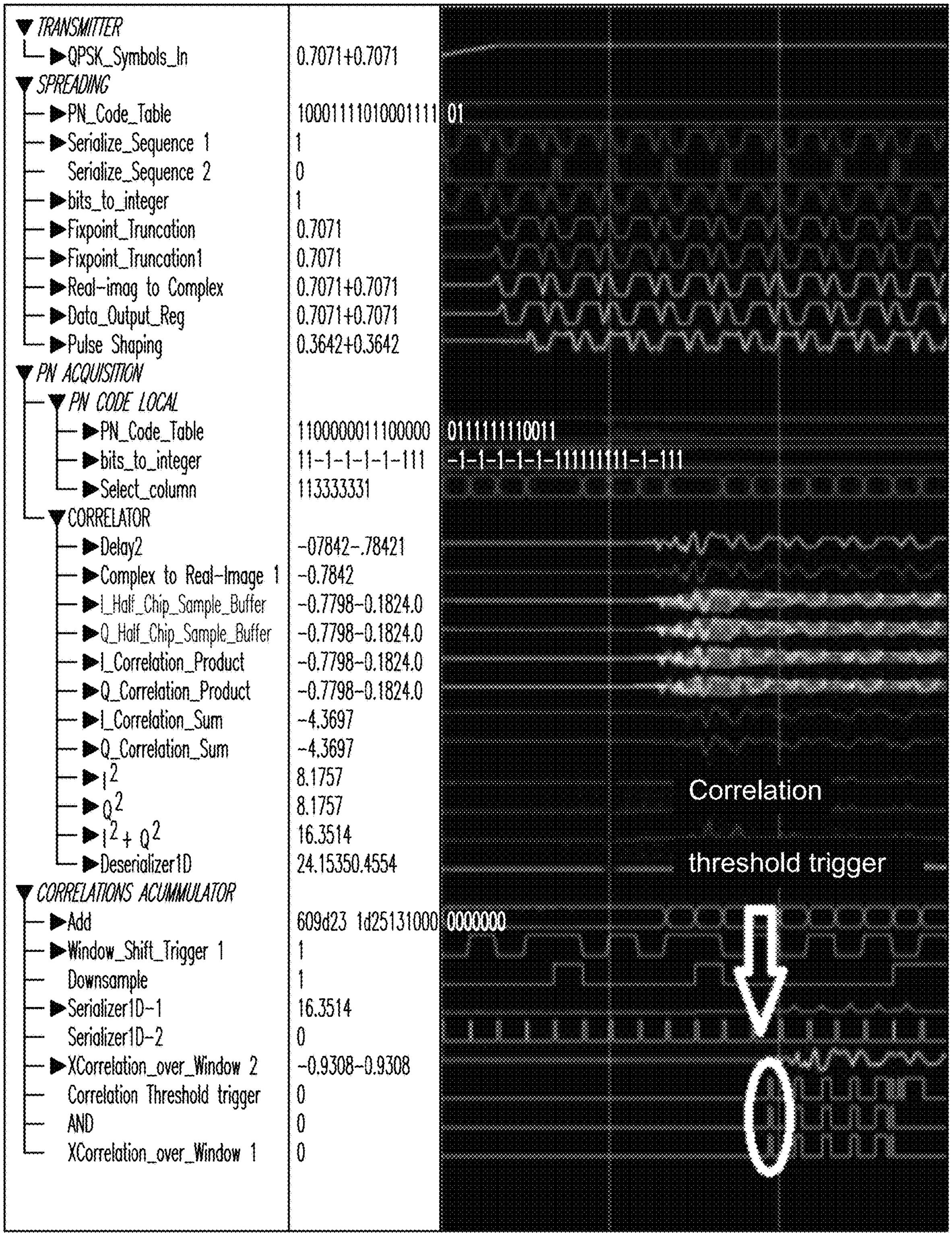
FIG. 21 shows the PN Acquisition Results with Correlation Threshold Crossing.

The integration of the PN acquisition and PN Tracking, as well as the debugging activities, are performed with the Logic Analyzer tool available in Simulink, as shown in FIG. 21.

Carrier Acquisition

Figure 22:
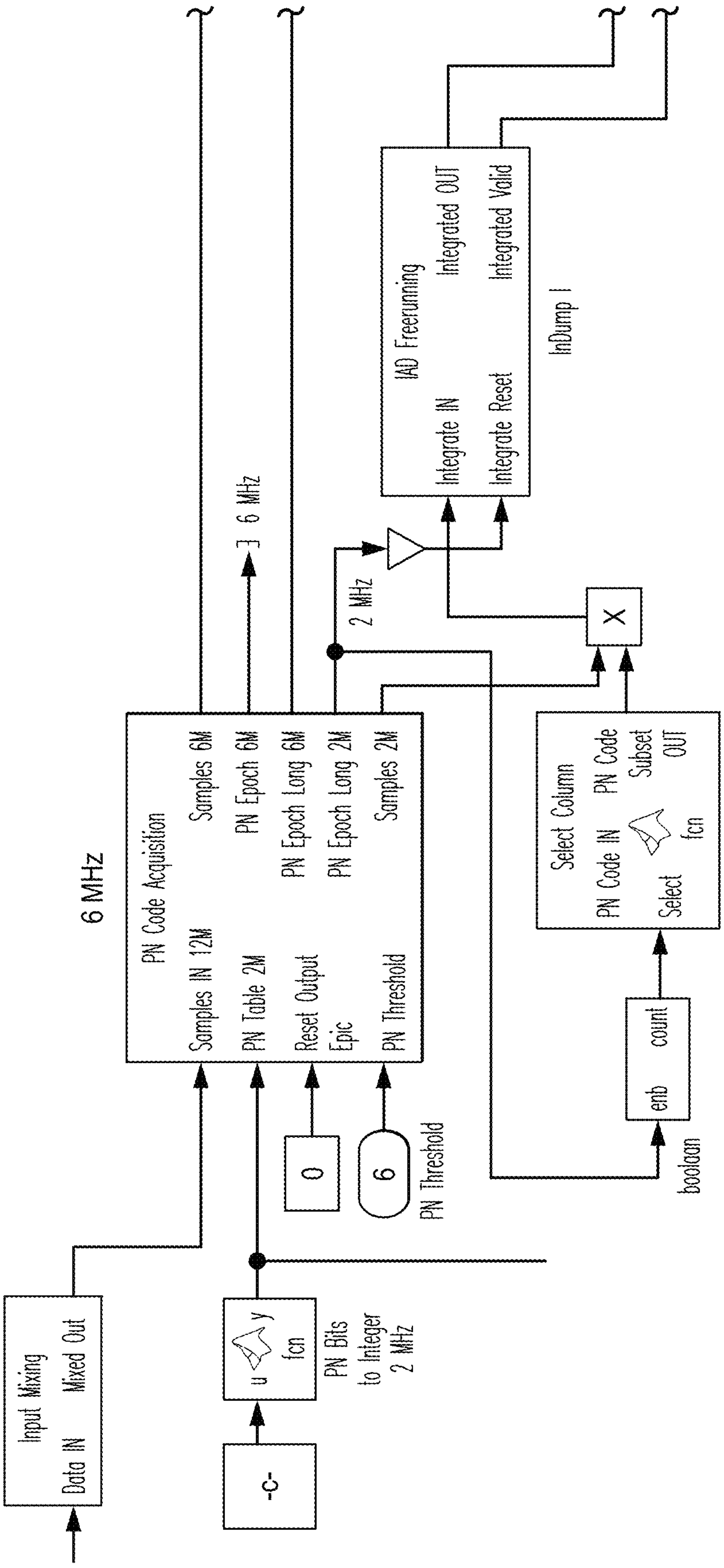
FIG. 22 depicts the subject Carrier Acquisition implementation.
Figure 22:
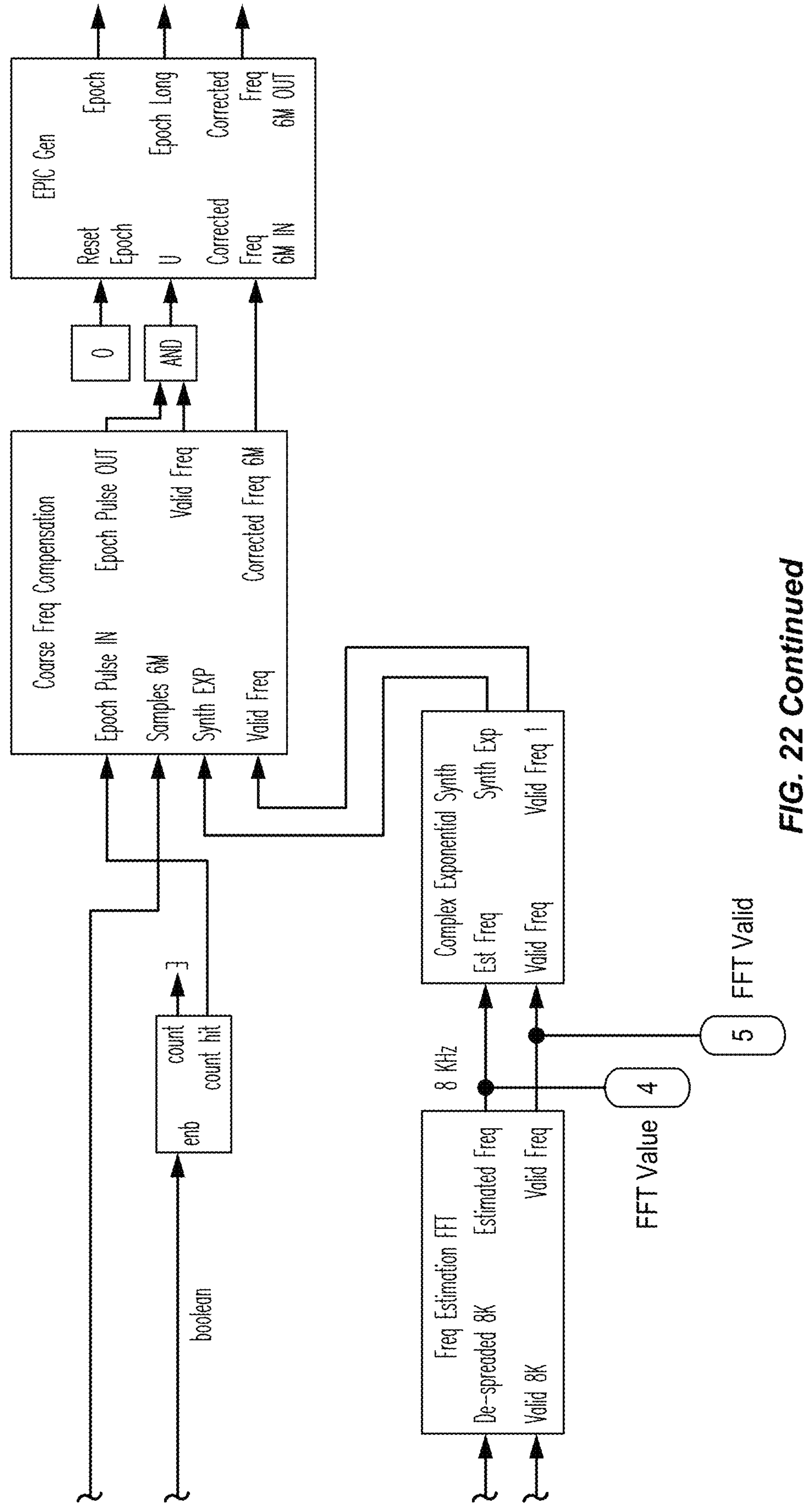

Carrier Acquisition is depicted in FIG. 22. Once the PN Acquisition has identified the right alignment with the PN code within half a chip accuracy, the Carrier Acquisition takes place in order to perform a coarse frequency offset estimation and correct it accordingly. To achieve that, the signal is first de-spread with a signal aligned with half a chip accuracy. Subsequently, after de-spreading, the resulting signal should have only a remaining frequency offset present. An FFT is used to estimate this frequency by identifying the largest value among all the FFT bins. The resolution of the frequency estimated is directly proportional to the number of bins of the FFT. In this example, a sampling rate of 8 KHz and a total of 128 bins are used, leading to a 62.5 Hz of bin resolution. A frequency offset of 1 KHz is digitally inserted into the receiver. The FFT is able to estimate a frequency of 1062 Hz. Once this frequency is estimated, a complex exponential is synthesized with such frequency value and correct the input signal, leading to a signal with only a residual 62 Hz that will be corrected during the Carrier Tracking.

Figure 23:
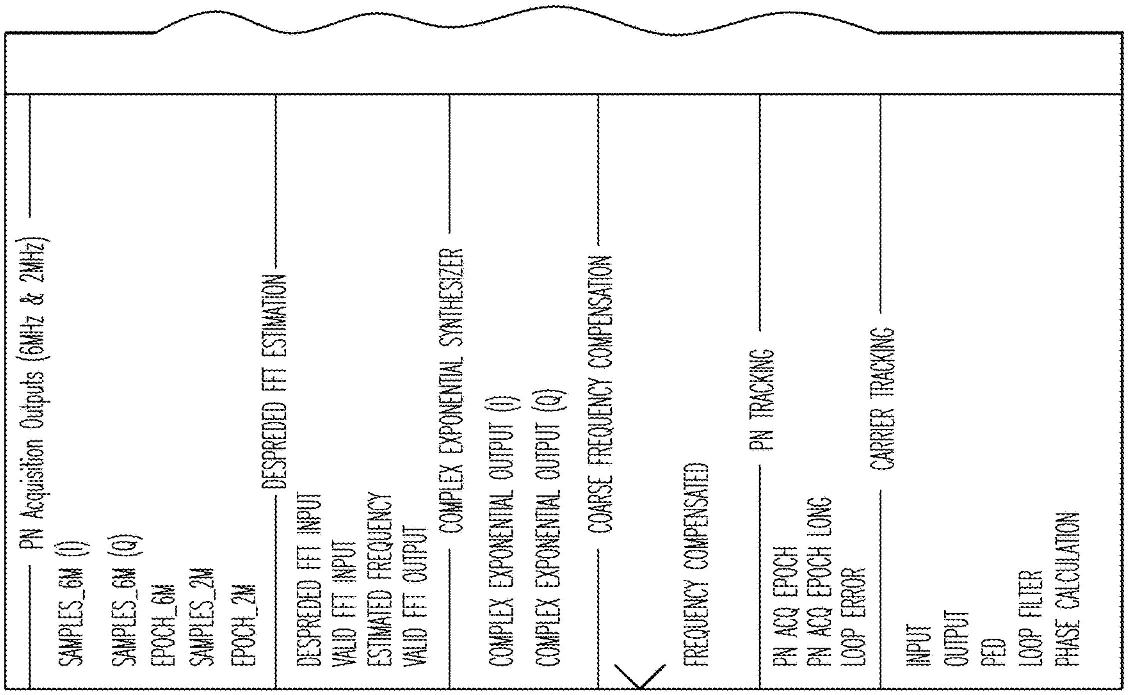
FIG. 23 illustrates the Carrier Acquisition Completed (Using FFT Acq)
Figure 23:
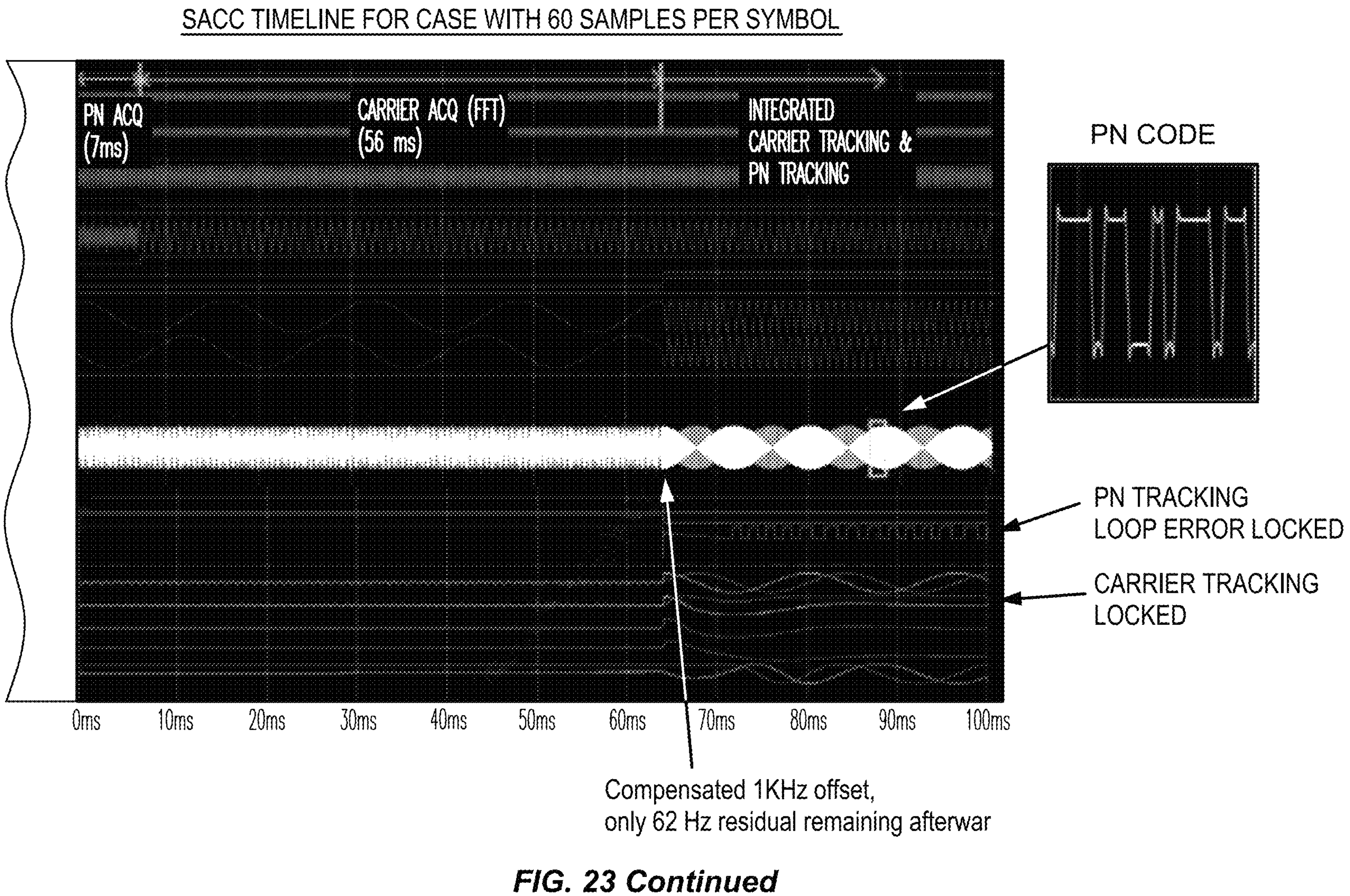

The Carrier Acquisition results are shown in FIG. 23, after PN Acquisition has been completed. As may be observed, the Carrier Acquisition process takes a significant amount of time due to the fact that the FFT is performed at a quite slow sampling rate (for example, 8 KHz). Once the FFT has been finalized, the 1 KHz correction can be observed, leading only to a residual 62 Hz offset.

SACC Preamble Integrated Receiver (Mode 1 of the S_IR)

Figure 24:
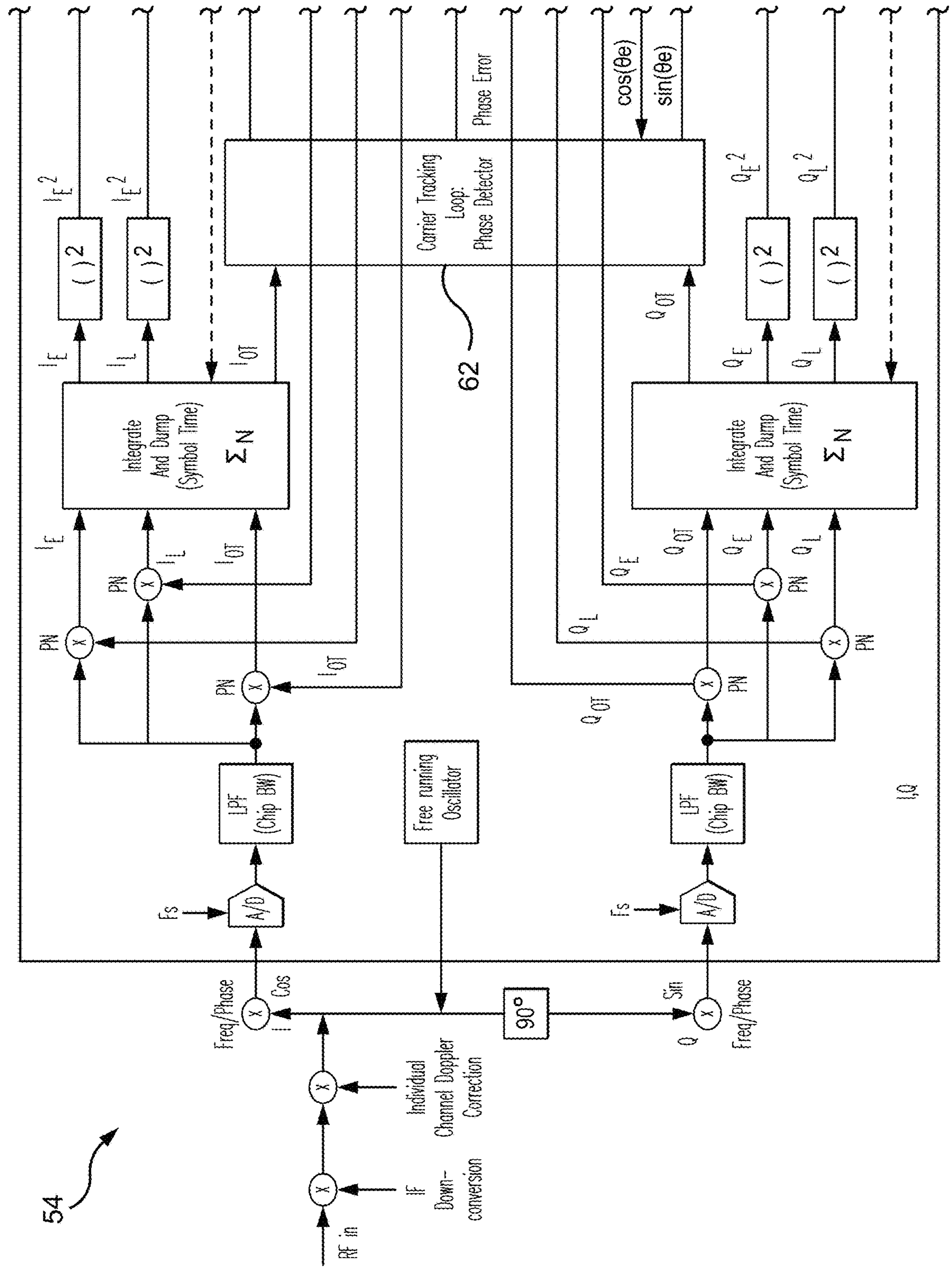
FIG. 24 depicts the subject SACC Preamble Integrated Receiver Design (S_IR/Mode 1)
Figure 24:
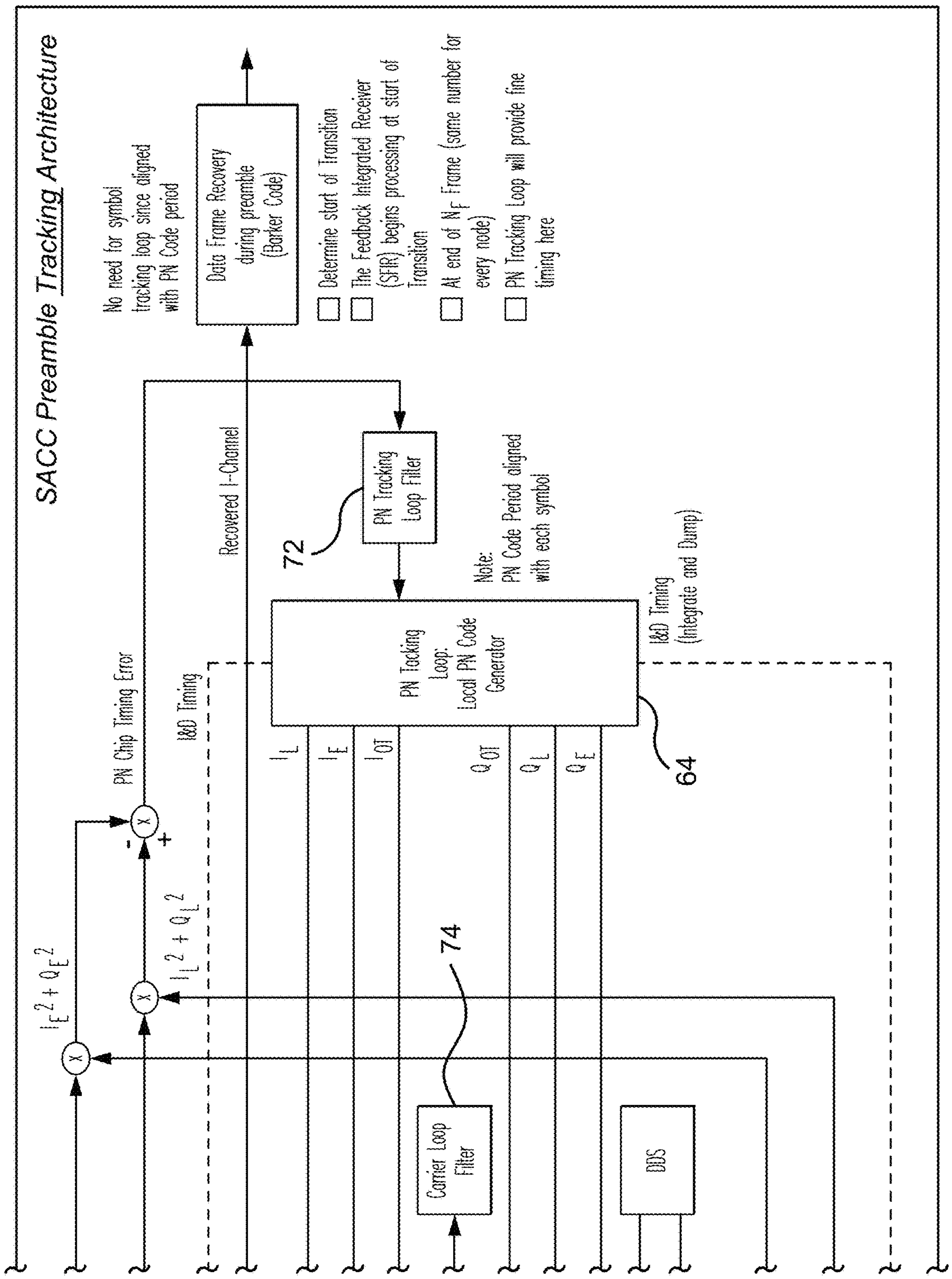

FIGS. 24, as well as 5 and 9, illustrate a detailed block diagram for the SACC preamble integrated receiver 54 showing both the non-coherent PN tracking loop 64/72, and the carrier tracking loop 62/74, designs, respectively. This subsection addresses the SACC preamble integrated receiver 54 and its main functions for tracking the incoming signal. The non-coherent PN tracking design is tailored to operate at baseband to track and extract the recovered data from the incoming signal using a local PN sequence. The result of the PN tracking continuously offers the carrier tracking a de-spread signal that is required to eliminate any undesired carrier offset that can be caused by dynamic Doppler.

After the PN acquisition is accomplished, the non-coherent PN tracking starts to track the PN sequence by comparing the ½ chip early and late samples to correlate with the incoming signal with the local PN code. This is achieved by the product of the incoming samples with the early and late values for the local PN samples for both In-phase (I) and Quadrature (Q) components of the incoming QPSK samples. The output of the Loop Filter is used to update the local PN code accordingly. Based on a loop error value that is mapped according to a discriminator function that decides if the local PN is leading or lagging the incoming signal. In addition, it also indicates the amount of shift forward or backward required to match the incoming with the local PN sequence.

The process of the SACC preamble integrated receiver, including the HDL-optimized Simulink modeling of the non-coherent PN tracking, and the carrier tracking Simulink modeling, is detailed in the following paragraphs.

Non-Coherent PN Tracking

Figure 25:
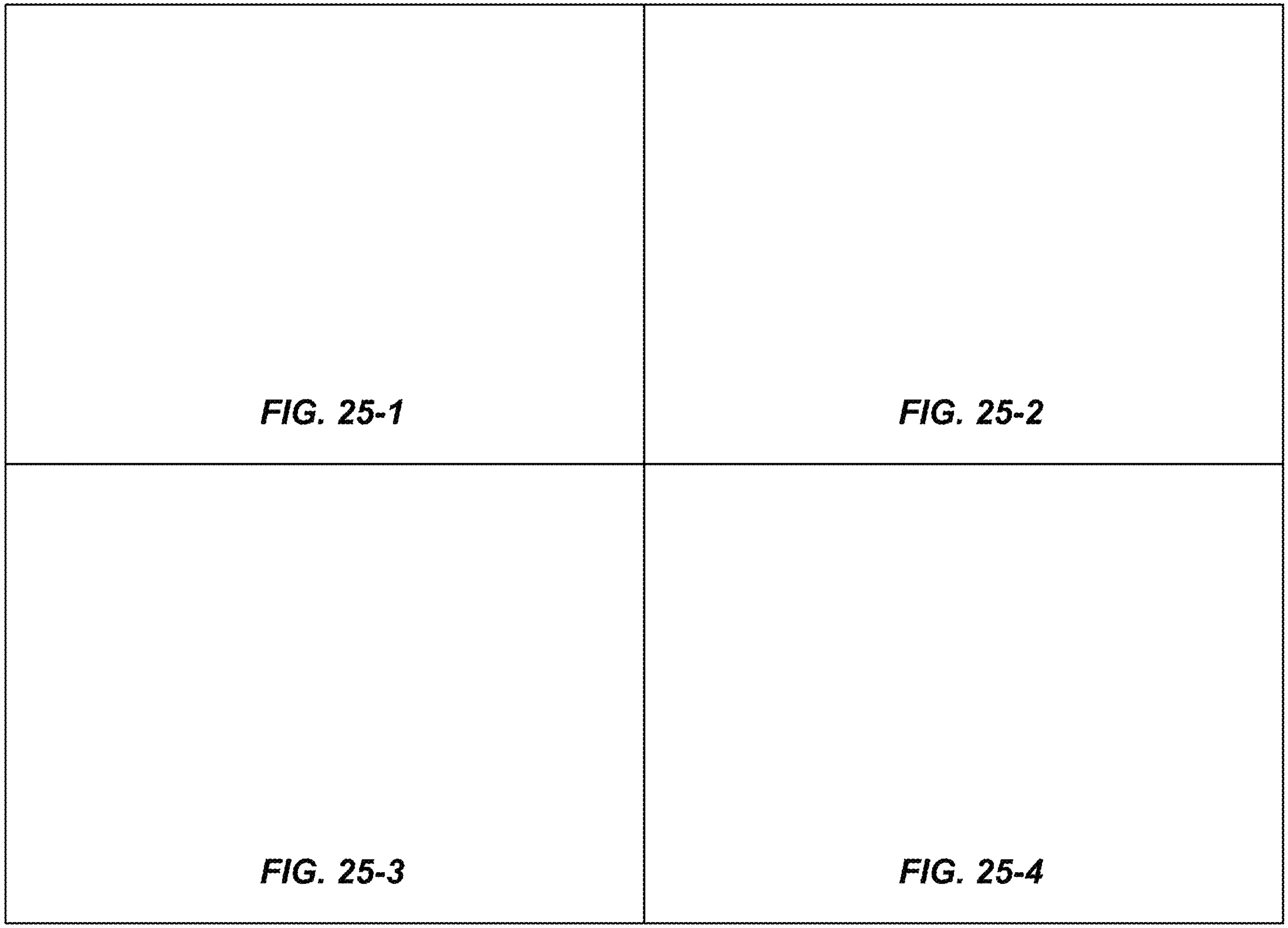
FIG. 25 is a scaled map of four partial views that is a diagram of the SACC Preamble Integrated Receiver Design Modeling.
Figures 1, 25:
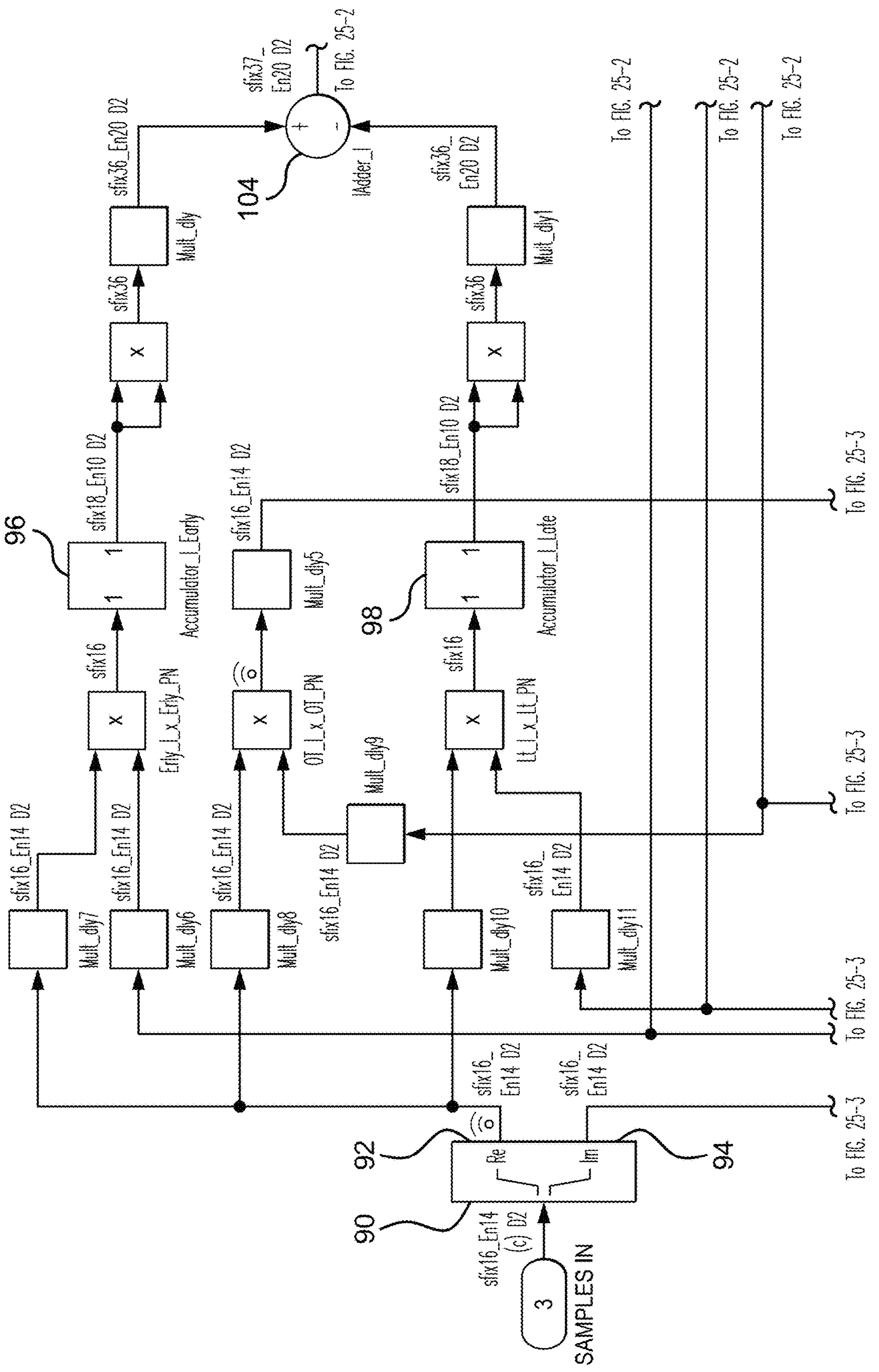
Figures 2, 25:
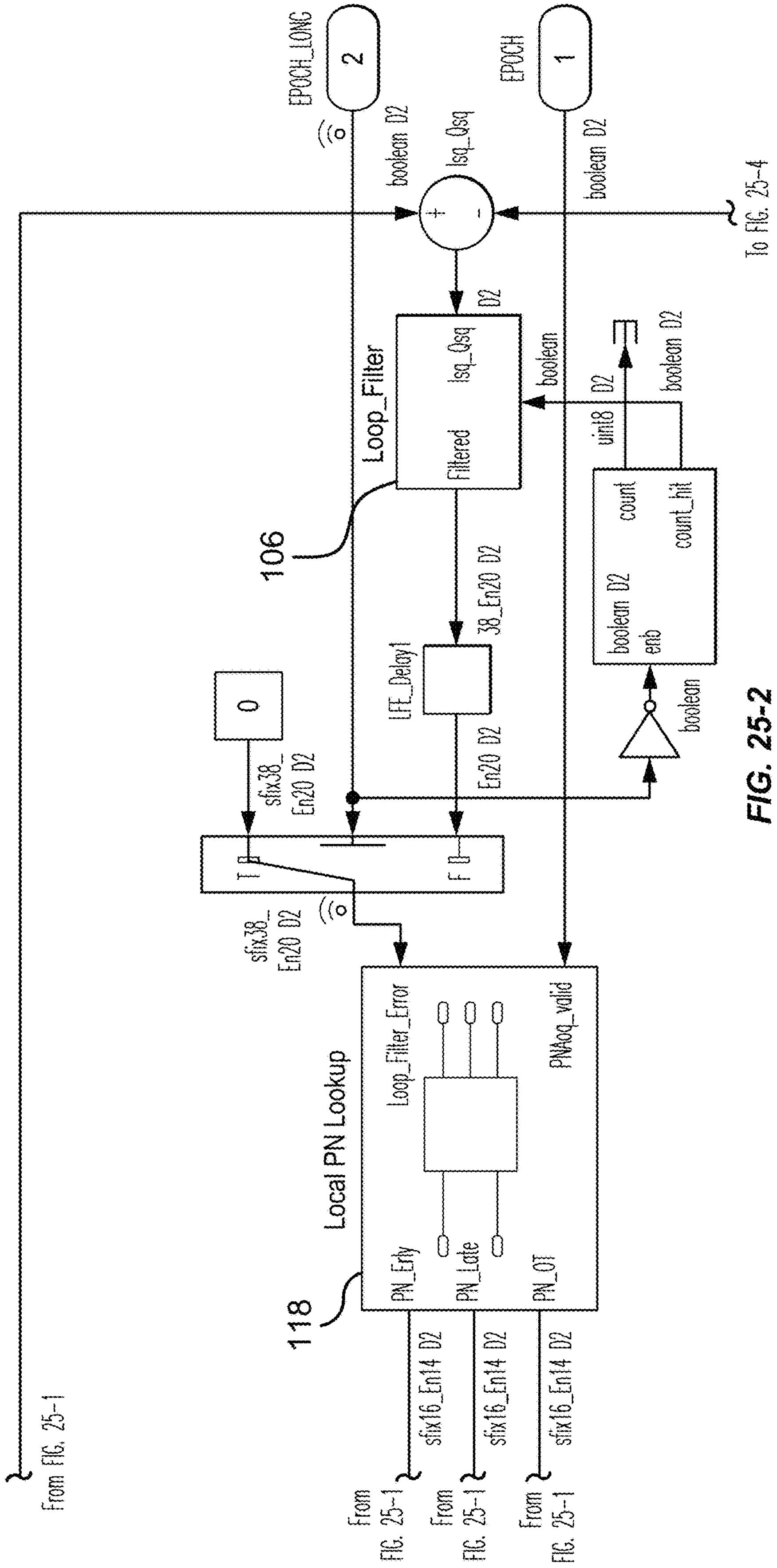
Figures 3, 25:
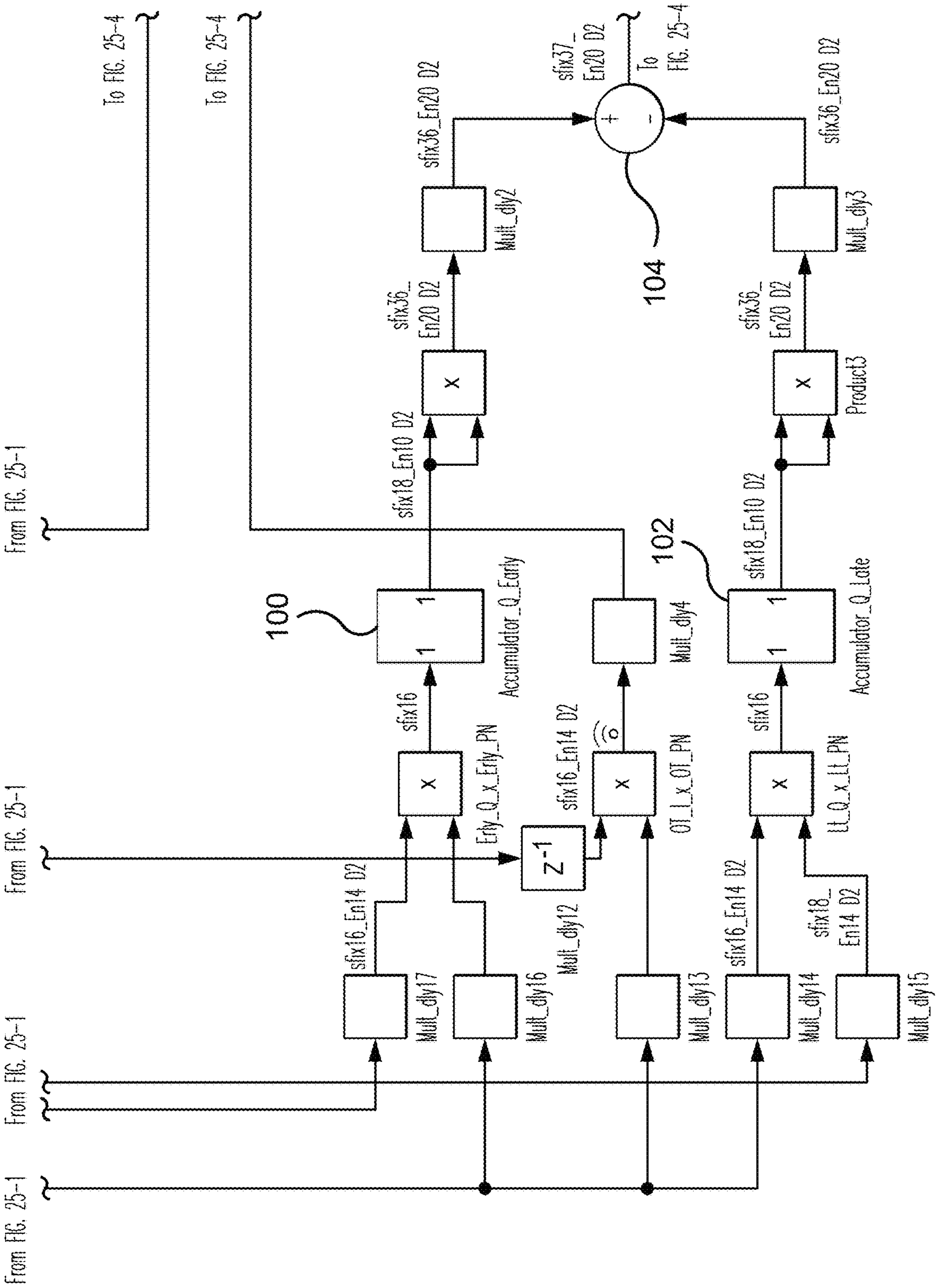
Figures 4, 25:
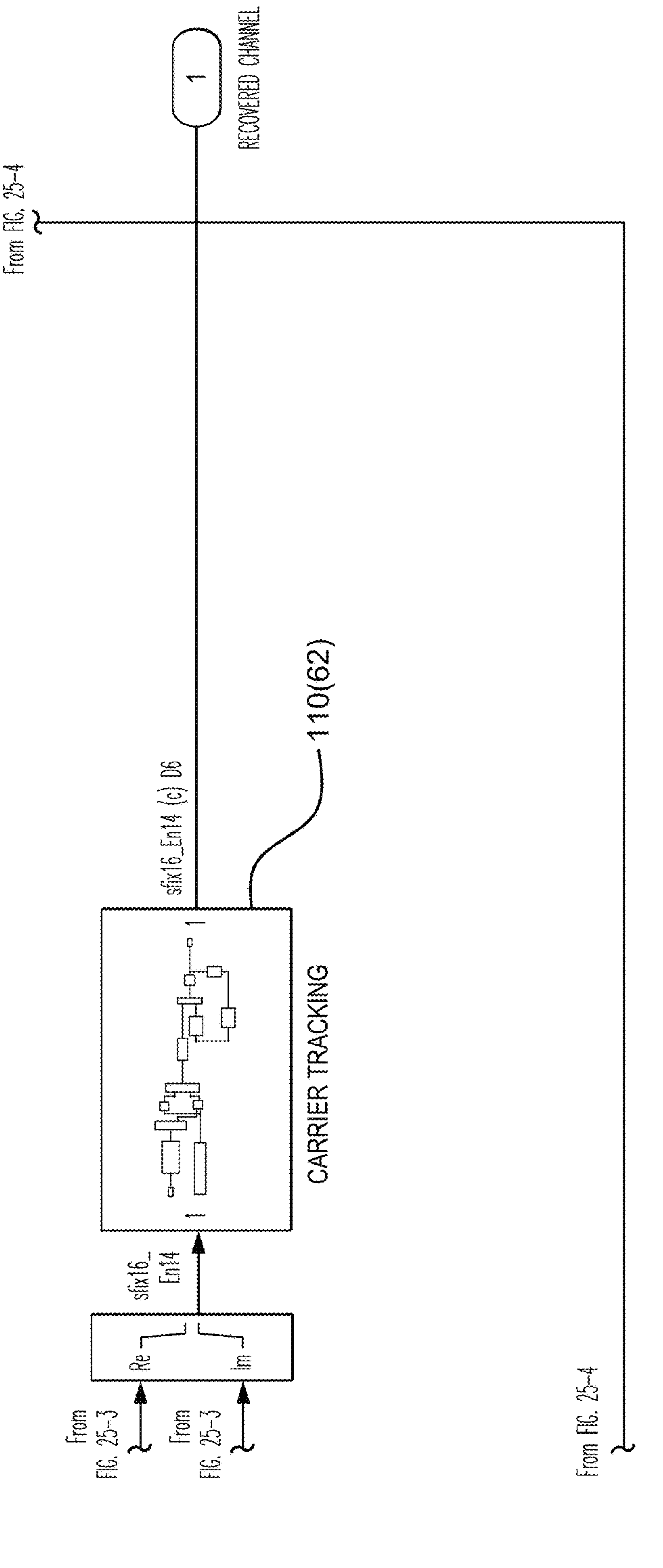

FIG. 25 captures the implementation of the SACC preamble integrated receiver HDL-Optimized Simulink Modeling.

The incoming samples from the PN Acquisition (SAMPLES_IN) is fed to real-to-complex block 90 to separate I and Q samples of the incoming QPSK into I branch 92 and Q branch 94. These branches 92, 94 are subsequently split into two branches for each of the I and Q branches, i.e., early branch 96 and late branch 98 for the I branch 92, and early branch 100 and late branch 102 for the Q branch 94, to identify the early and late samples that are subsequently multiplied with the local early and late PN samples. The early sample can be identified by adding a delay ($Z^{-6}$) to indicate its location. The output of the multiplication passes through a Root Raised Cosine (RRC) Receive Filter to act as the Loop Pass Filter (LPF) 104. Each of the early and late components are then squared and combined to present the ($I^2$) that will be then added to the error from the quadrature branch that follows a replica of the same procedure. This will result in ($I^2+Q^2$) that will be the input of the Loop Filter (LF) 106 to provide an error signal update.

Figure 26:
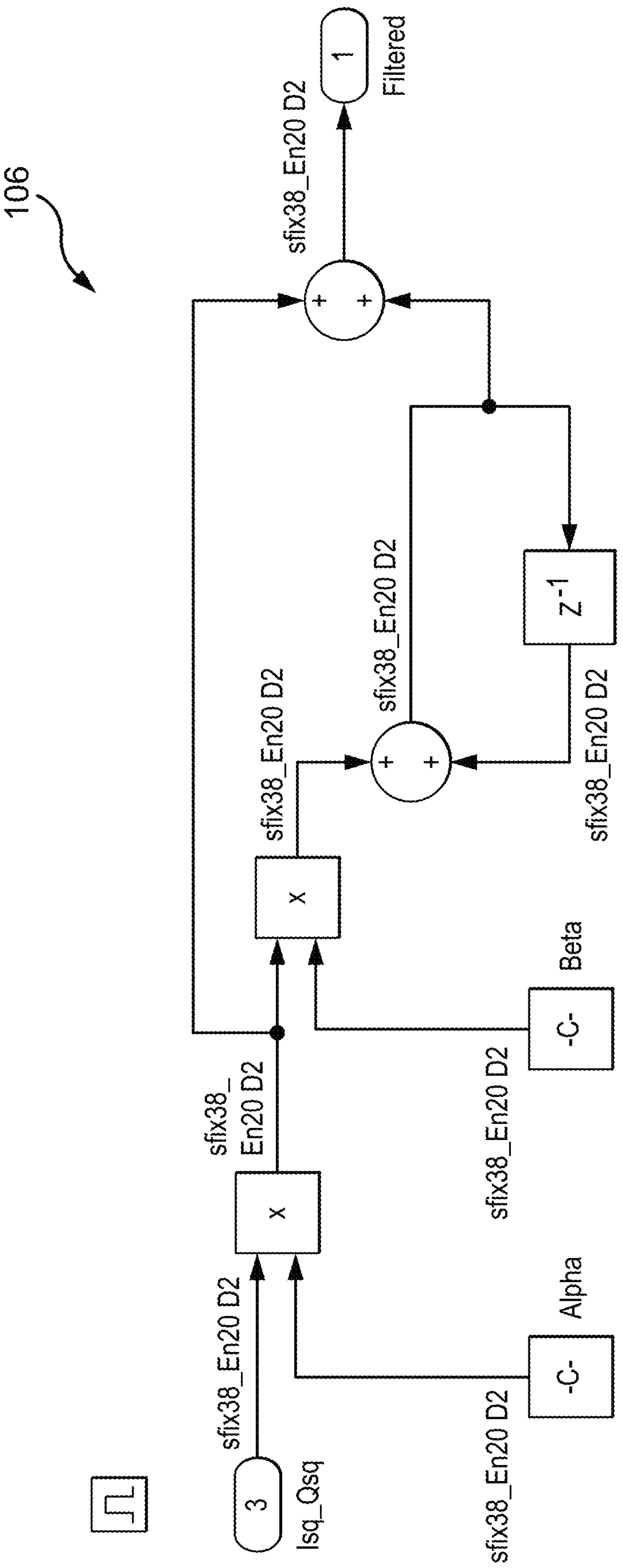
FIG. 26 is a diagram of the Loop Filter Simulink Modeling.

The LF 106 shown in FIGS. 25-26, which can be correlated with the Loop Filter 72,74 depicted in FIGS. 5 and 9, is a $2^{nd}$ order loop filter that has values of Alpha (α=0.00903320) and Beta (β=0.0012070) based on the Integrated Receiver design for the TDRSS STGT MA receiver. The output of the LF 106 is the error computed that will specify the early and late PN updates shown in FIG. 27.

Figure 27:
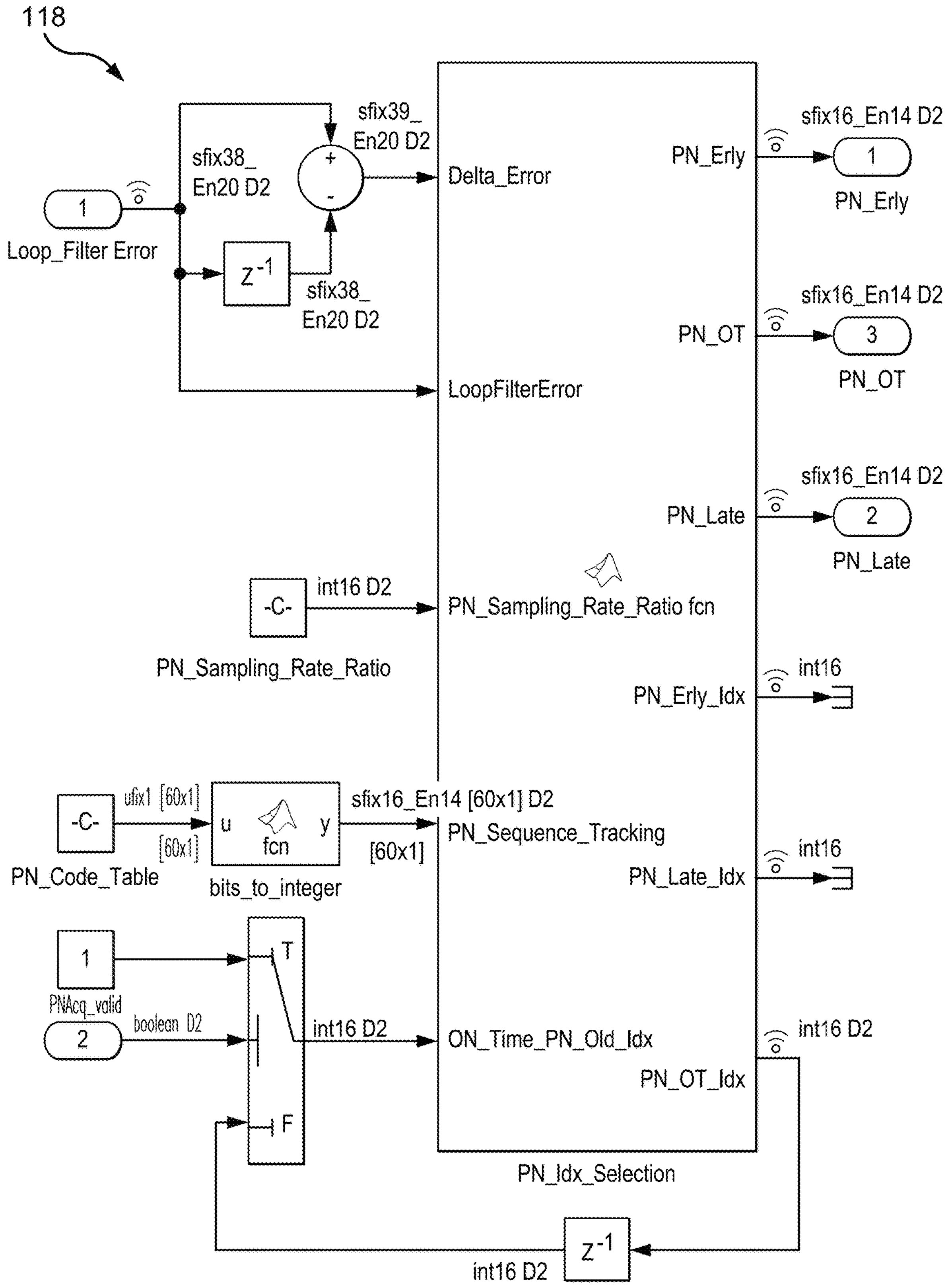
FIG. 27 depicts the Local PN Look-Up Table.

As depicted in FIG. 27, instead of implementing a Numerical Controlled Oscillator (NCO) to increase or decrease the frequency of locally generated PN samples, a Look-Up Table (LUT) 118 manages to compute the indices and values of the proper early and late samples based on the previous on-time PN samples and the incoming computed error. The calculations of the on-time, early, and late PN indices can be computed through Equations (0.1)-(0.3).

$$PN_{idx,OT} = \frac{(1+e_{LF})\times\Delta f_{QPSK}}{\Delta f_{PN}} \tag{0.1}$$

$$PN_{idx,Erly} = PN_{idx,OT} - \left(\frac{\Delta f_{QPSK}}{\Delta f_{PN}}\right)\Big/2 \tag{0.2}$$

$$PN_{idx,Late} = PN_{idx,OT} + \left(\frac{\Delta f_{QPSK}}{\Delta f_{PN}}\right)\Big/2 \tag{0.3}$$

Here, $PN_{idx,OT}$ is the index of the on-time PN sample, $e_{LF}$ is the error computed by the Loop Filter (LF), $\Delta f_{QPSK}$ is the sampling frequency of the incoming QPSK samples, $\Delta f_{PN}$ is the sampling frequency of the local PN sequence generated for tracking, $PN_{idx,Erly}$, $PN_{idx,Late}$ is the index of the early and late PN sample respectively.

A MATLAB function has been designed to represent a discriminator function that can identify the amount of shift required to synchronize the local PN sequence with the incoming signal based on the loop filter error. The MATLAB script for the Discrimination function is shown in FIG. 28.

Figure 29:
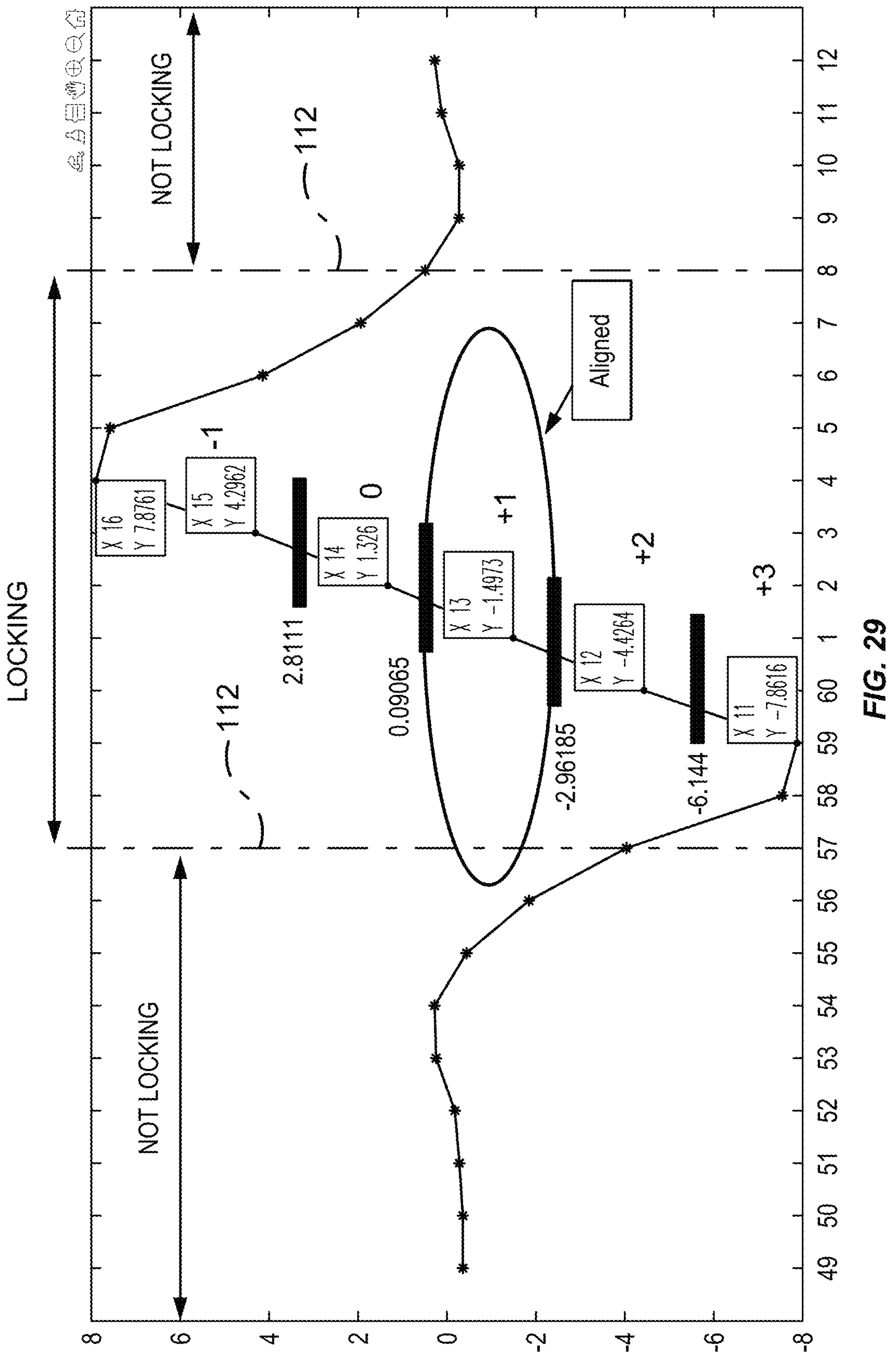
FIG. 29 is representative of the output of the Discrimination Function.

The output of the discrimination function is shown in FIG. 29. The x-axis represents the indices of the local PN sequence, while the y-axis represents the loop filter error value. The dash-dot lines 112 characterize the boundaries of the PN tracking operation range. As long as the PN acquisition provides the indices within a ½ a chip accuracy, the PN tracking will be able to adjust the alignment to synchronize with the incoming signal. This mode of operation is performed when the PN tracking is locked. If the local PN sequence is out of the identified locking range, the loop filter error will not be able to reflect the proper alignment required.

Similarly, a MATLAB script function is coded to compute the early and late indices and values based on the previous on-time PN sample by circularly shifting the indices for the early and late local PN sequence to match the PN sequence embedded in the incoming signal to determine the on-time PN index and value. FIG. 30 represents the implemented function in the case when the local PN sequence is lagging the incoming signal. Additional conditional statements are similarly added when the PN sequence is leading the incoming signal.

Figure 31:
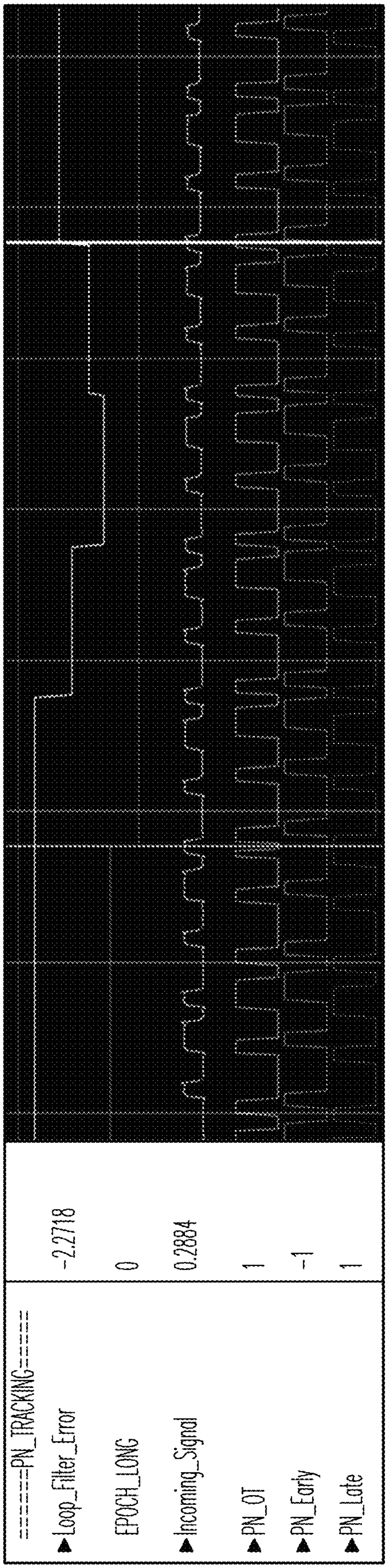
FIG. 31 is representative of the Non-Coherent PN Tracking Logic Analyzer Waveforms.

FIG. 31 displays the waveforms for the non-coherent PN tracking implementation. An intentionally created misalignment is used to validate the functionality of the PN tracking. Once the PN acquisition is performed, a valid signal is generated (EPOCH_LONG) to identify the starting of the PN tracking. At the right, there is a state shown when the loop filter reaches a constant value where it identifies that the incoming signal (Incoming_Signal) is aligned with the local PN sequence (PN_OT). It can be visualized that the waveform of the Incoming_Signal is aligned with the waveform of (PN_OT) once the loop error is within the inner limits of the discriminator function.

It is noted that the PN tracking loop can only be tested when the timing difference between the incoming and local PN codes is within a ½ chip which occurs only after successful PN Acquisition.

Carrier Tracking

Figure 32:
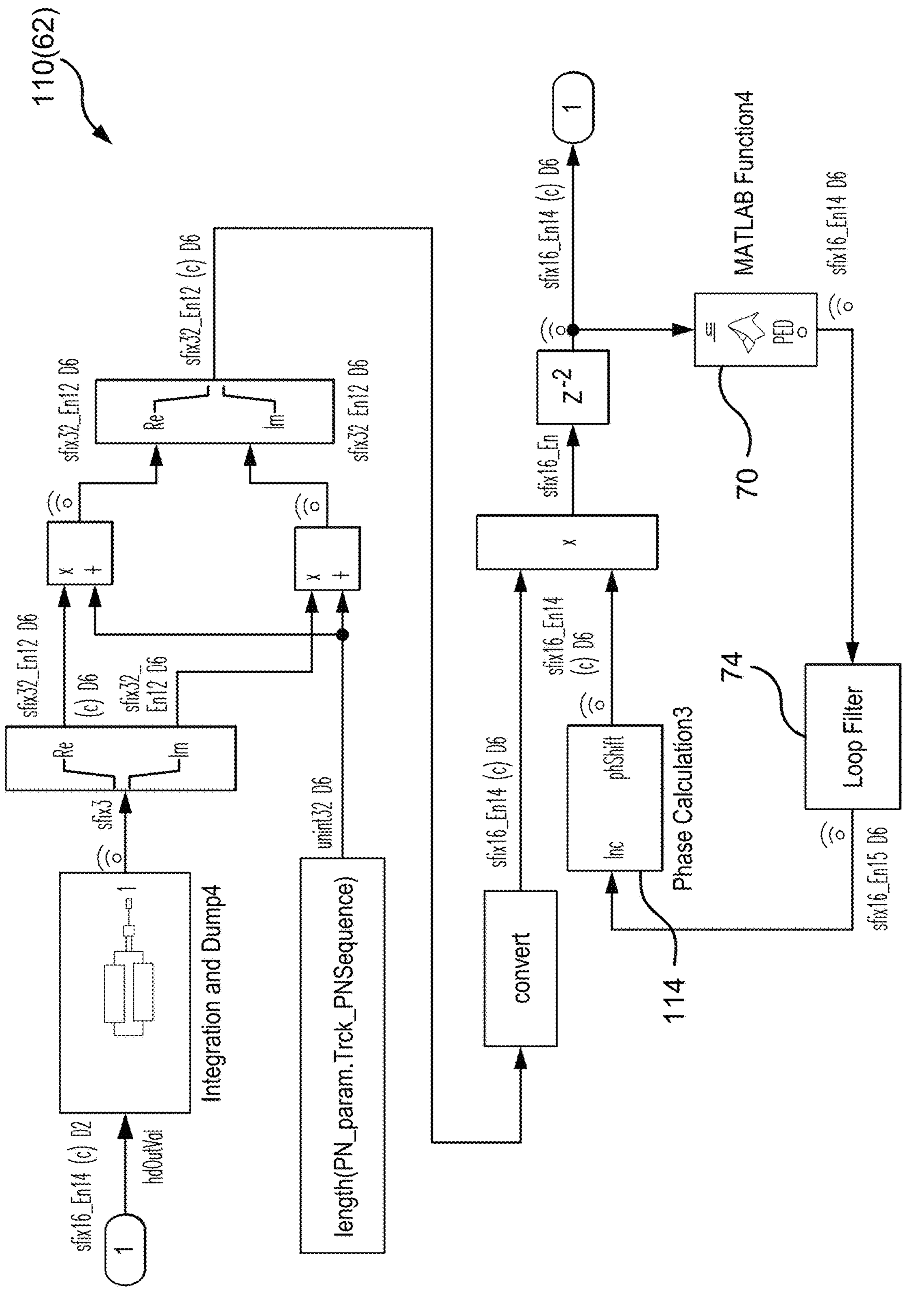
FIG. 32 is a diagram of the Carrier Tracking Simulink Modeling.

Carrier Tracking Loop 110 (62), shown in FIGS. 25 and 32, as well as in FIGS. 5 and 9, operates simultaneously with the PN tracking. The PN Tracking provides continuously an on-time signal, which is fed to the Carrier Tracking Loop 110 (62), to compare the new sample with the previous sample, and to calculate a phase error with the Phase Error Detection (PED) block 70, also shown in FIG. 9. This Error is then filtered by the Loop Filter 74 (also shown in FIGS. 5 and 9), and the correcting phase is calculated by the Phase Calculation block 114, which corrects the next incoming sample. Eventually, the Phase Calculation block 114 produces a signal which fully tracks the input phase/frequency and therefore the residual frequency offset is removed, and the signal can be recovered. Block 110 (in FIG. 25) represents the carrier tracking functionality. Once the PN tracking is locked, it provides the on-time PN sequence for the carrier tracking shown in FIG. 32.

In case of Binary Phase Shift Keying (BPSK), the PED phase error calculation can be estimated by $$e(n) = \text{sign}(\text{Re}(y(n))) \times \text{Im}(y(n)) \quad (0.4)$$

Here, e(n) is the error signal, and will only be zero when y(n) is purely real.

Following the PED block 70 is the loop filter 74 that uses a proportional-plus-integrator (PI) filter, as shown in FIG. 32 that weights the PED error generated representing the phase and frequency offsets against all previous errors. To perform this function, the loop filter 74 is characterized by two gain values ($K_1$ and $K_2$) that can be utilized by a preferable damping factor ζ and normalized loop bandwidth $B_{loop}$. $K_1$ and $K_2$ can be given by $$K_1 = \frac{4\zeta\theta/\Delta}{MK} \quad (0.5)$$

$$K_2 = \frac{4\zeta\theta/\Delta}{MK} \quad (0.6)$$

Here, M is the number of samples per symbol associated with the input signal and K is the detector gain. The normalized loop bandwidth range is defined as $B_{loop} \in [0,1]$, where the damping factor ζ describes the behavior of the system as follows $$\zeta = \begin{cases} <1, & \text{Underdamp} \\ =1, & \text{Critically Damped} \\ >1, & \text{Overdamped} \end{cases} \quad (0.7)$$

θ and Δ can be computed using Eqs. 0.8 and 0.9, respectively $$\theta = \frac{B_{loop}}{M(\zeta + 0.25/\zeta)} \quad (0.8)$$

$$\Delta = 1 + 2\zeta\theta + \theta^2 \quad (0.9)$$

SACC Mission Data Integrated Receiver (Mode 2 of the S_IR)

This subsection details the implementation of the integrated receiver S_IR 54 during the Mission Data Phase, also referred to herein as Mode 2. The mode switching between Mode 1 and Mode 2 is especially critical and a robust handshake has been implemented to ensure the tracking loops remain aligned along all Phases and during their transitions.

As was presented in the previous paragraphs, the overall SACC timeline consists of 3 different Phases: Preamble phase, Transition (Transition A and Transition B) phase, and Mission Data phase. Mode 1 is active during Preamble and Transition. As soon as Transition ends, Mode 2 is activated for the Mission Data. The reason for this switch is that, once the tracking loops are locked, different channels need to be buffered so they can be combined. A critical aspect is the different rate of the Mission Data, which requires the Integration and Dump blocks to integrate over a different period. This issue leads to a new path for Mode 2 to be implemented.

Figure 33:
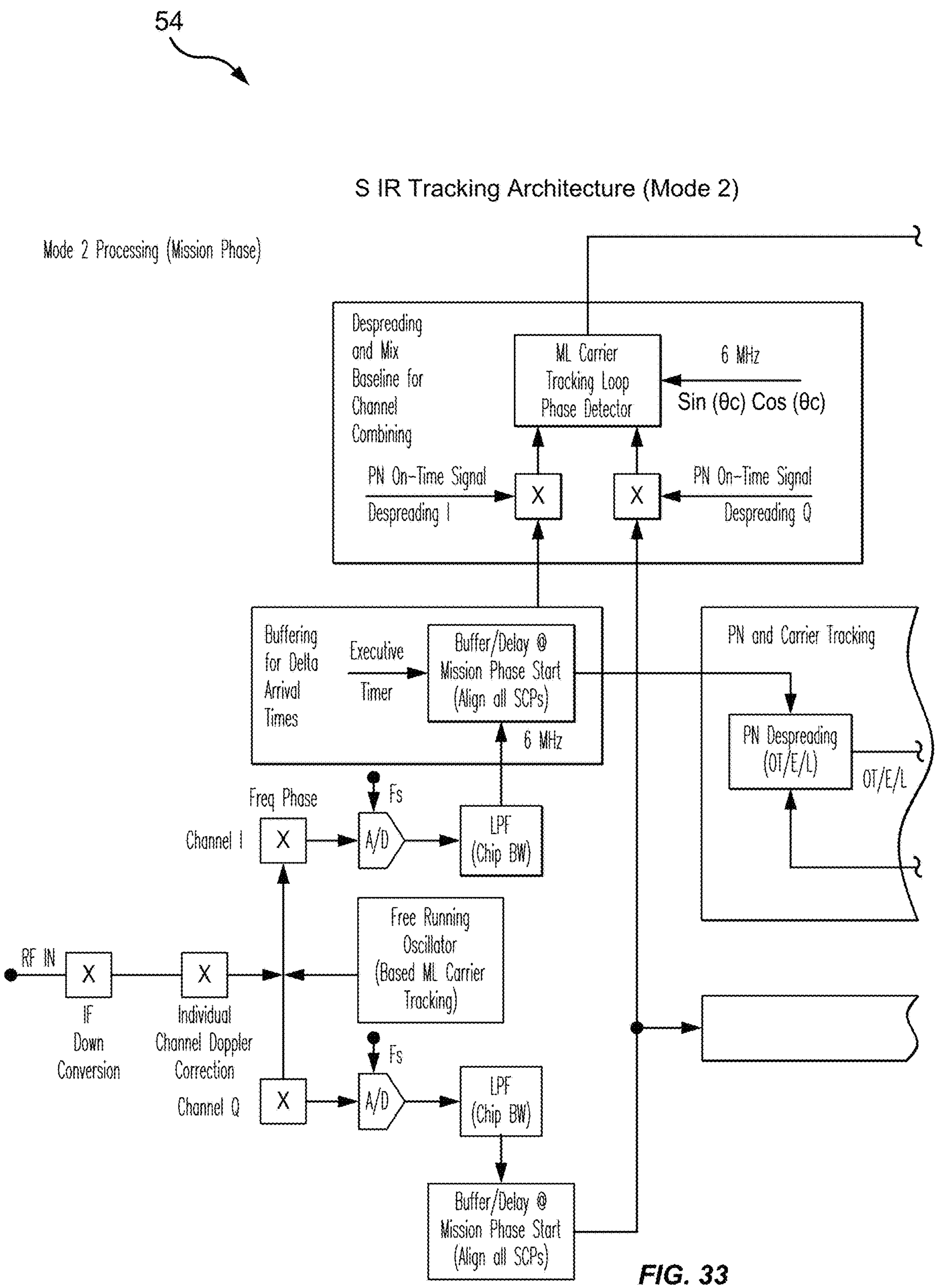
FIG. 33 is a diagram representative of another implementation of Mode 2 of the S_IR.
Figure 33:
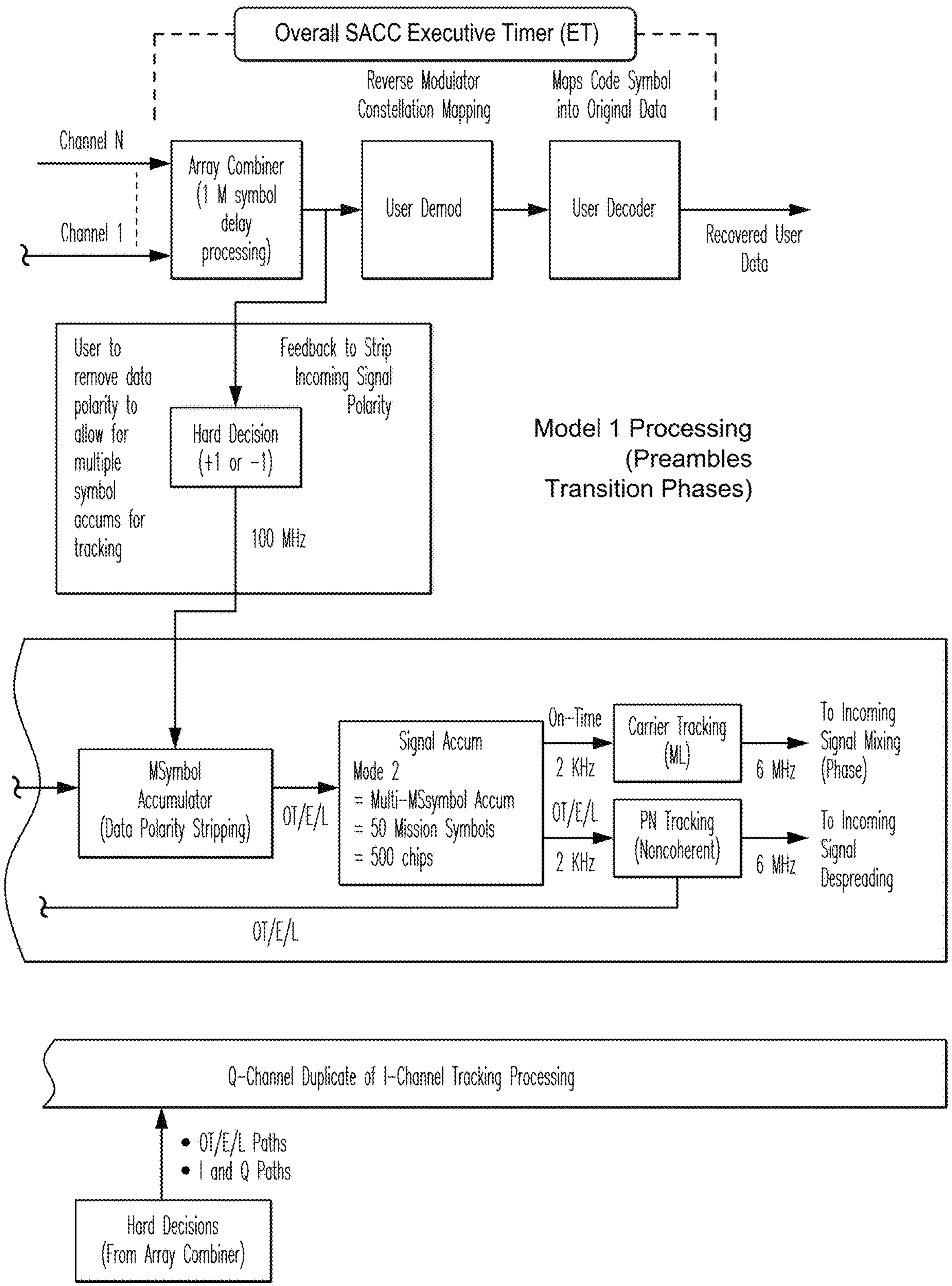

The complete implementation is shown in FIG. 33, where the right portion of the diagram corresponds to the Mode 1 path, which includes the PN tracking, and Carrier Tracking performed during this preamble and transition phase. The left portion of the implementation depicted in FIG. 33 corresponds to the Mode 2 path, which is used only during the Mission Data phase. Because of the different Mission and Preamble Symbol rates, a different set of accumulators are used.

Figure 34:
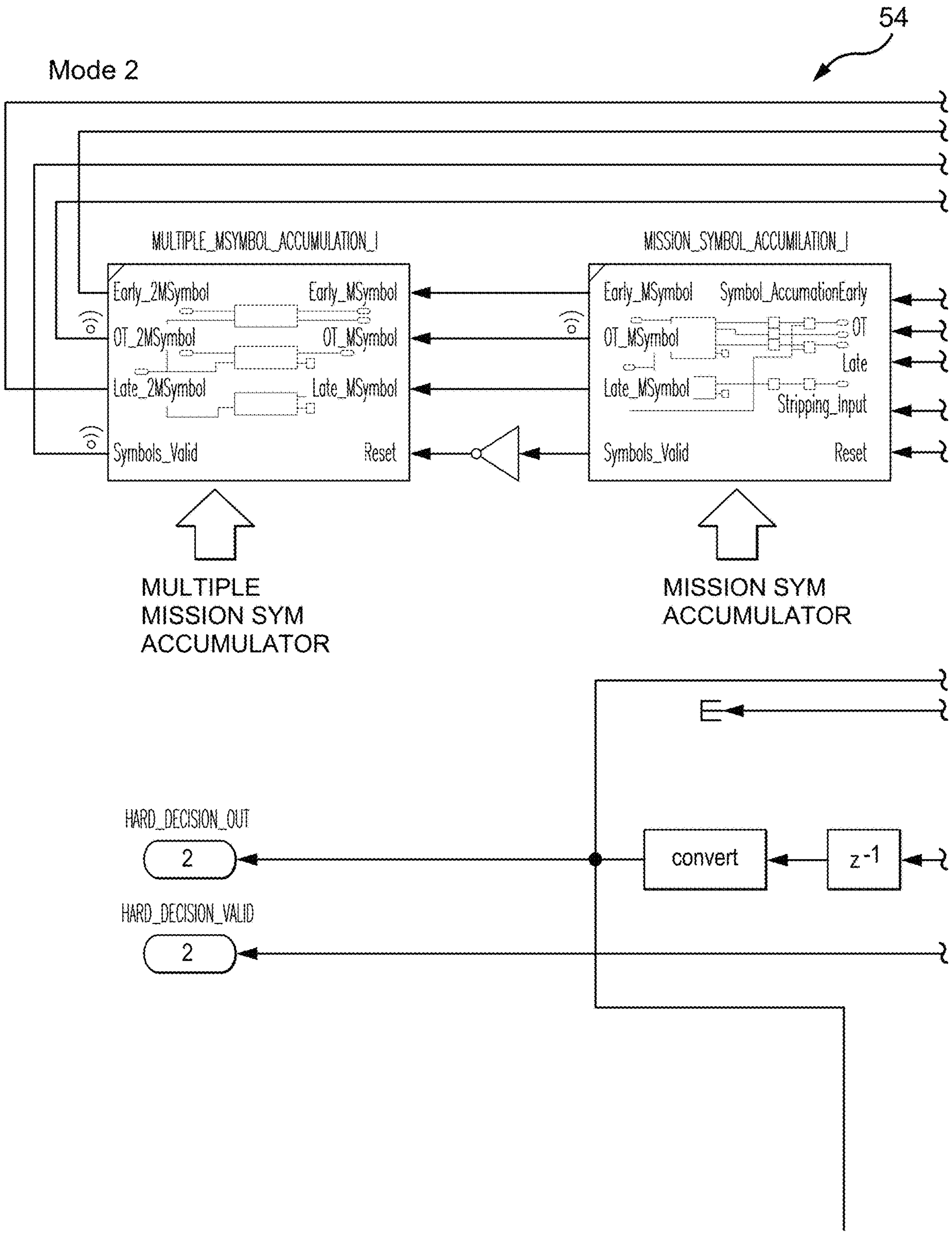
FIG. 34 shows the Zoomed in Mode 2 of the S_IR implementation shown in FIG. 33.
Figure 34:
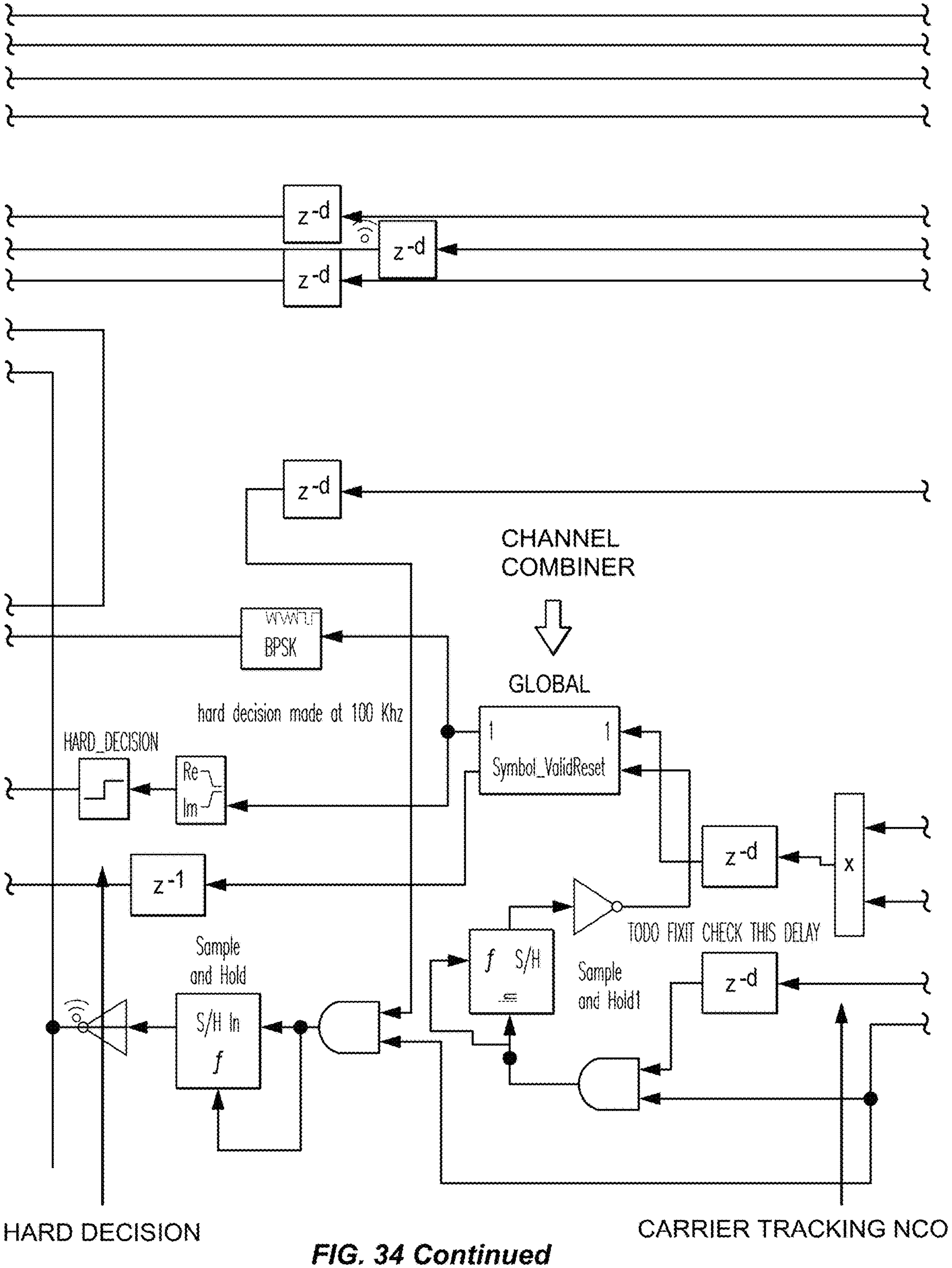
Figure 34:
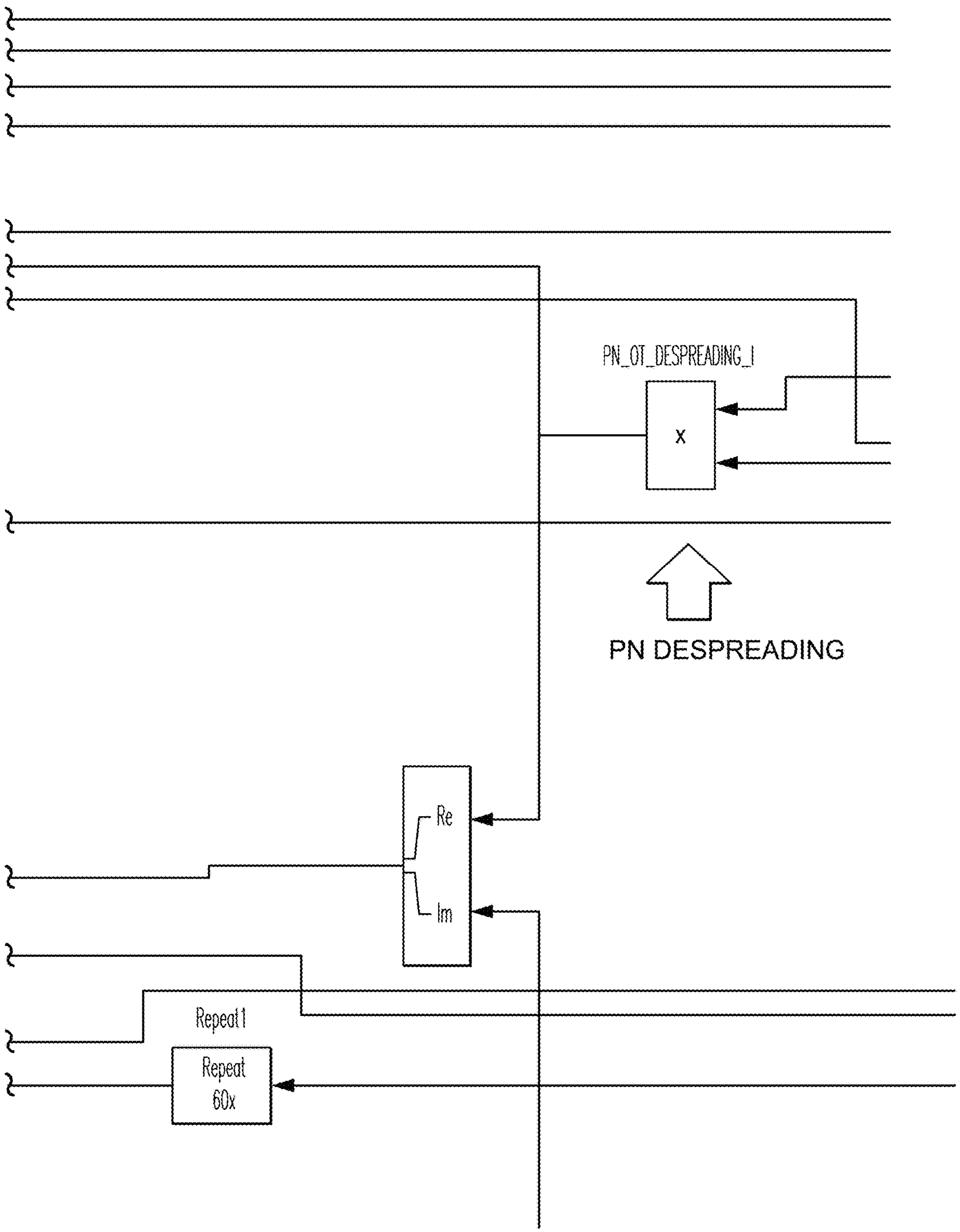

FIG. 34 depicts a zoomed-in image of the left portion of FIG. 33 for the Mode 2 representation of the S_IR implementation 54. In Mode 2, both the despreaded PN signal and carrier-tracked signal for a given channel are used to combine with the rest of the nodes channels, and a hard decision routine runs that is used for two purposes: (a) to serve as the polarity stripping input for the Mission Symbol Accumulator, and (b) as the input for the BPSK demodulator.

Figure 35:
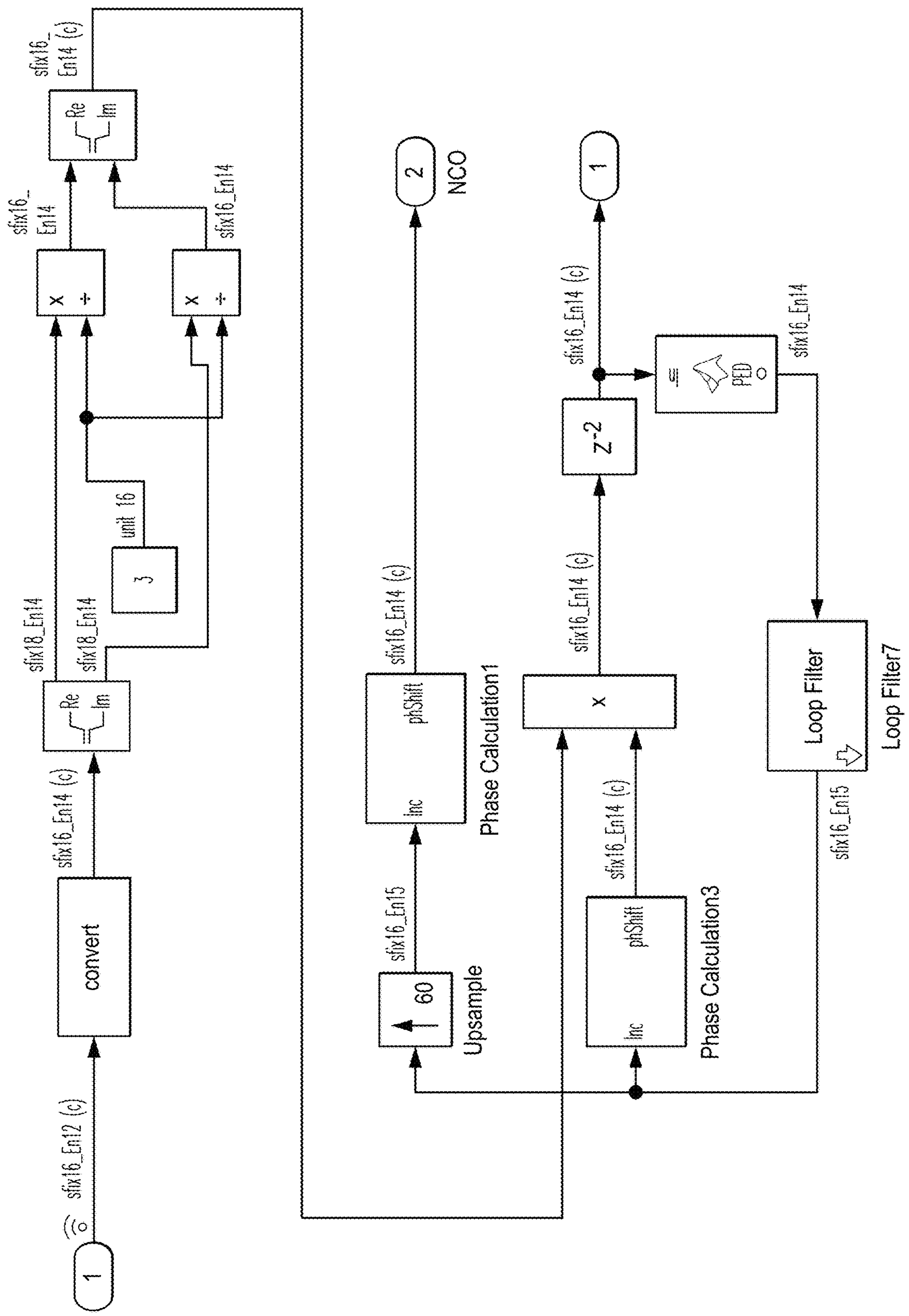
FIG. 35 is a diagram showing an Additional NCO computation at a different rate for Mode 2 where an additional Phase Calculation path has been added.

The different Preamble and Mission Symbol rates require additional changes to other portions of the model. For example, since the NCO output from the Carrier Tracking is needed at a different rate for the Mode 2, an additional Phase Calculation path has been added to provide the required input in Mode 2, as shown in FIG. 35.

Channel Emulator

A channel emulator is required to test the robustness of the model. This emulator includes mixing the received signal with a dynamic Doppler and adding AWGN. The subsequent subsections describe the process of implementing and testing the dynamic Doppler and AWGN addition in a standalone fashion before integrating it in the model.

Dynamic Doppler Modeling

When static Doppler is added to the receiver, the Coarse Frequency Compensation (CFC) and the Fine Frequency Compensation (FFC) are applied to successfully eliminate the static Doppler and to track the carrier. For a more realistic scenario, a dynamic Doppler with linear frequency increment is modelled to test the performance of the CFC and FFC. A stand-alone model was built to emulate this dynamic Doppler which is embedded in the SACC integrated receiver is shown in FIG. 36.

Figure 36:
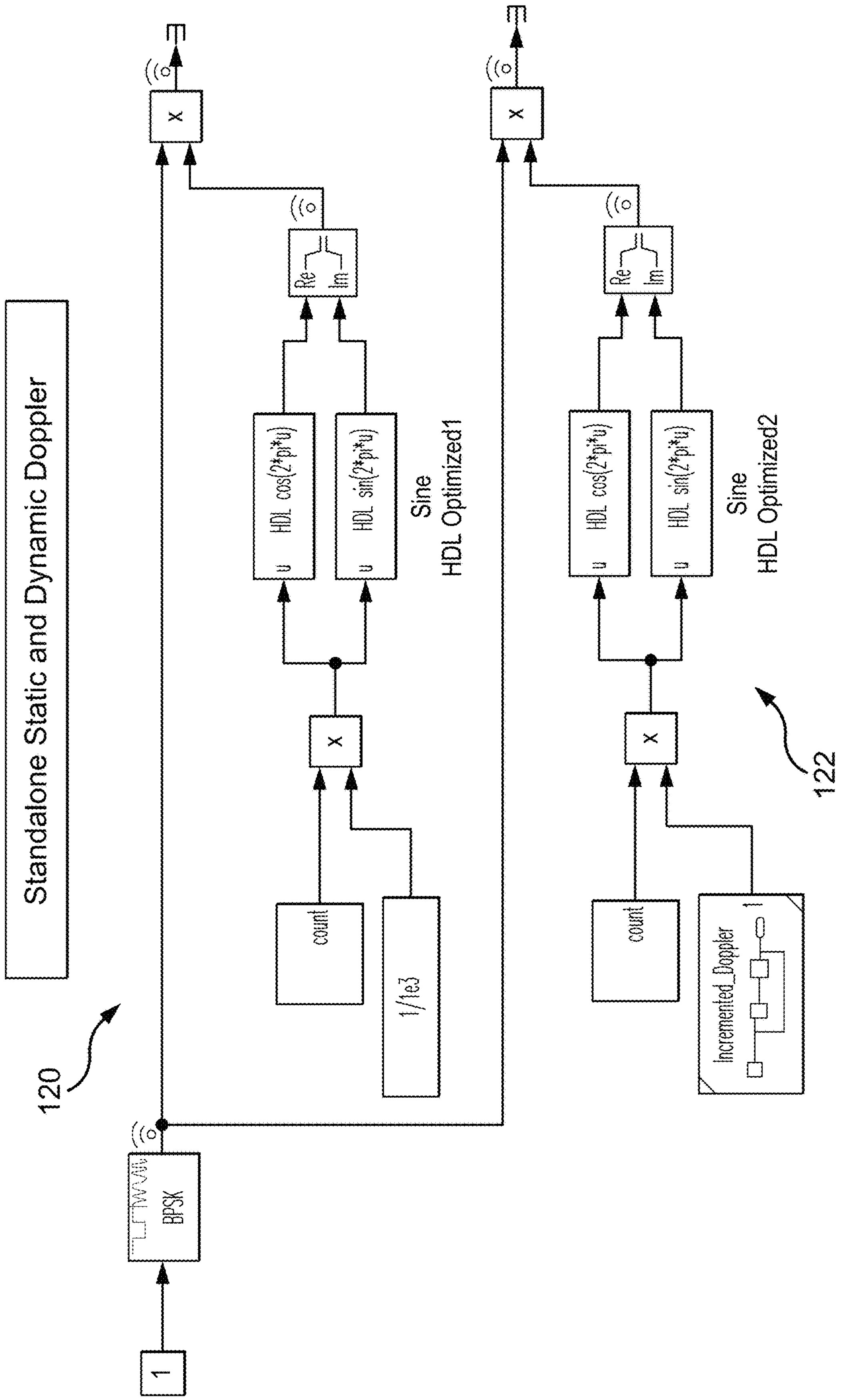
FIG. 36 is representative of the Stand-alone Static and Dynamic Doppler Modeling.
Figure 37:
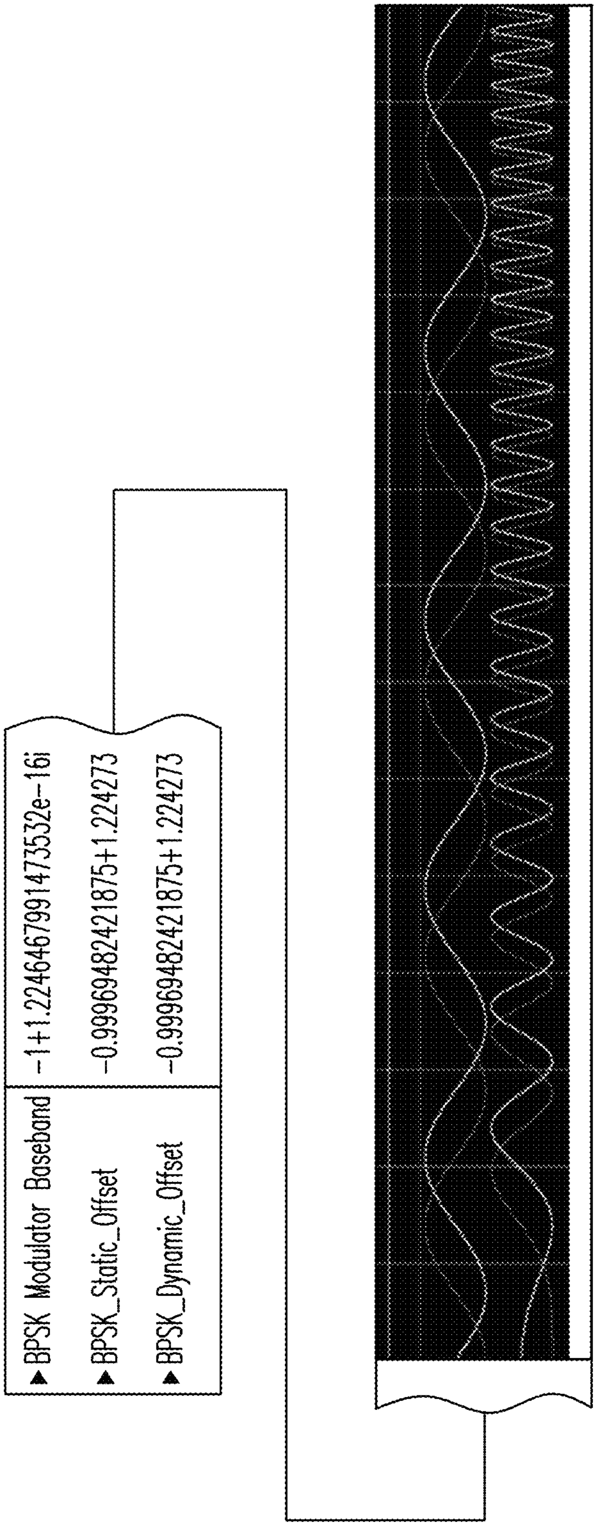
FIG. 37 is a diagram showing the Static and Dynamic Doppler Output Waveforms.

The upper branch 120 in FIG. 36 is designed to mix a cosine and sine wave with the BPSK baseband modulated received signal with a static Doppler, while the lower branch 122 is designed to generate the dynamic Doppler. FIG. 37 illustrates the waveforms showing the output signal of this stand-alone model. The BPSK_Static_Offset has a constant frequency, while the BPSK_Dynamic_Offset is designed to have a linear increment in frequency by time.

AWGN Modeling

Figure 38:
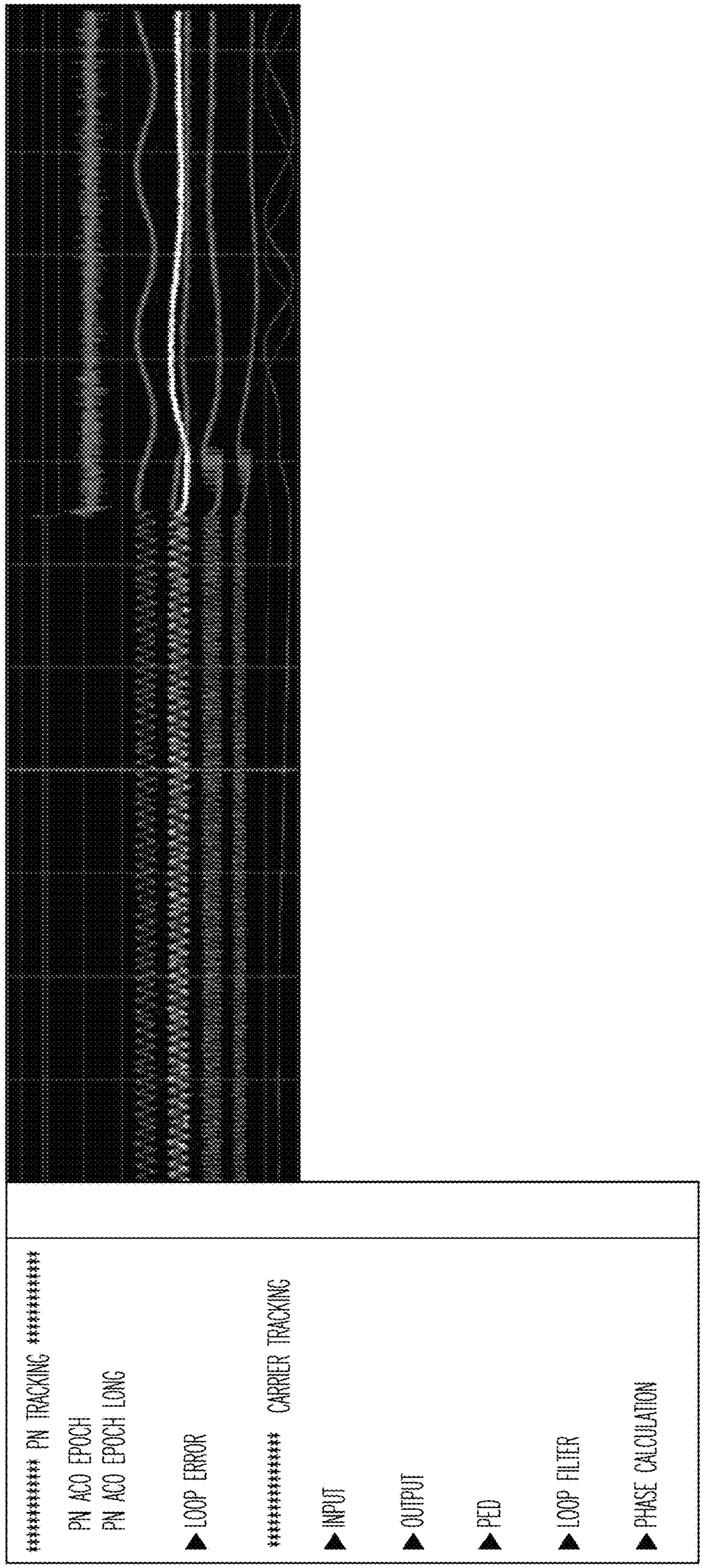
FIG. 38 is a diagram depicting the AWGN level equivalent to −10 dB included in the channel emulator.

The AWGN (Additive White Gaussian Noise) was added to the received signal in a simulation environment, by modeling a channel emulator where a desired AWGN level can be added. The channel emulator can be integrated in the HW platform. Given the number of correlations performed during the PN Acquisitions, a level of AWGN can be added that leads to an input SNR of −10 dB to the receiver. As depicted in FIG. 38, the signal can be recovered with a resulting output SNR of +1 dB.

The SACC Smallsat Relay System (SSRS)

Figure 39:
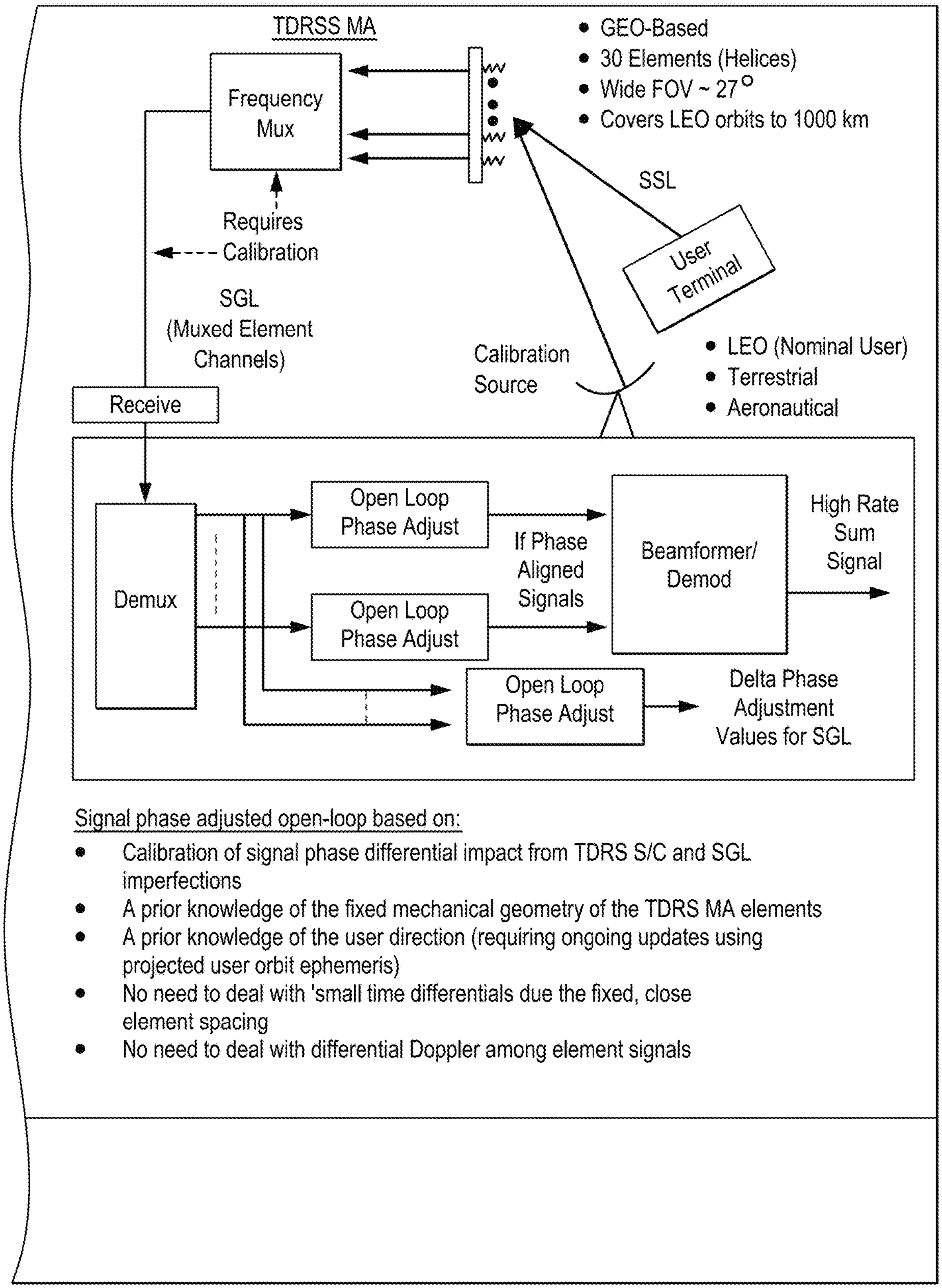
FIG. 39 is a block-diagram representative of the Spaced-Based Phased Arrays for Data Relay (SACC Small Relay System (SSRS) and TDRSS MA).

In the previous paragraphs, the details of the subject SACC system 10 and its ground-based processing are disclosed. The SACC system can be operationalized to create a new data relay concept. FIG. 39 presents the unique Data Relay Satellite System architecture that can use the principles of the subject SACC technology. The key unique features of the SACC Smallsat Relay System are presented in FIG. 39 in comparison with those of the TDRSS MA. As seen in FIG. 39, the SSRS offers all the benefits of a large space-based Phased Array by using a swarm of simple smallsat transponder nodes. Moreover, since these nodes need neither precise intra-swarm frequency nor time coordination, the terminology 'uncoupled' smallsats may be used. This is in stark contrast to the node requirements for the SBA system which are more complex and burdensome on the nodes in the swarm.

The SACC system 10 effectively creates the 'Phased-Array' functionality by using smallsat transponders (also referred to herein as transponder nodes). The phase determination that is normally mathematically derived using user directionality and antenna geometry is now replaced by the subject SACC GT processing. It is emphasized that all the information required to derive phase adjustments for coherent combing is embedded in the underlying SACC signal structure. As a result, it is noteworthy that there is no need to calibrate the phase impacts from any of the satellite links whether it be SSLs, SGLs or Xlinks. This introduces architectural and operational flexibilities that are extremely valuable. Also, it is emphasized that the nodes simply constitute uncoupled transponders with no onboard processing required other than frequency translation.

Another key SSRS feature is the ability to accommodate multiple simultaneous users. Similar to what is implemented for the NASA TDRSS (Tracking and Data Relay System) MA service, the MA capability is constructed by using CDMA. Consistent with TDRSS MA, the SSRS exploits Gold PN Codes because they have excellent cross-correlation properties. Using truly orthogonal codes would introduce unnecessary timing burdens on the SSRS users. By using the Beacon signal concept, presented in the previous paragraphs, which already has PN coding, a specific Gold Code for each user is assigned.

During the mission data transmission time, where the basic SACC signal does not typically use a PN Code, a user Gold Code 'overlay' code is introduced which would be about 10 times the data symbol rate consistent with TDRSS MA to ensure sufficient PN despreading and mitigation of PN self-noise effects. The SACC MA GT processing would add PN acquisition and track functions to the Mission processing design shown earlier.

The subject SSRS technology has the potential to be employed as a robust and efficient way to use a swarm of smallsats/nodes to relay communications. Moreover, the ability to implement this by simply using 'uncoupled' nodes that are simple bent pipe transponders yields a fairly inexpensive, resilient and novel approach that is applicable across user regimes.

Summarizing the afore-presented principles, a novel processing scheme and an associated architecture is proposed which facilitates a swarm of smallsats to provide a high data rate relay system. By performing all the processing on the ground, there are effectively no burdens imposed on the smallsat nodes which can be simple transponders. Moreover, there are no requirements for coordination or coupling between the nodes of the swarm which further reduces complexity and enhances robustness of the subject processing scheme. The nodes act as independent 'elements' of a virtual phased array which simultaneously provides a wide FOV and high gain directivity after coherent combining at the SACC ground terminal. The simplicity of the present approach makes it viable for deployment across all user regimes from Aeronautical to Deep Space.

There are additional benefits associated with the subject SACC system, including:

- The SACC methodology can benefit any swarm of nodes acting as a relay, including UAVs, and is not limited to smallsat conops.
- The SACC digital processor currently utilizes a COTS FPGA and COTS RF Front End, but it can be integrated into any SoC or SoM hardware platform that meets the requirements for internal oscillator, clocks, and RF front-end capabilities.
- SACC's multiplexing technique can be tailored to specific needs and is not limited to FDMA, TDMA, or CDMA.
- SACC's loop bandwidths can be adjusted to accommodate various design parameters, such as sampling rates and PN code lengths.
- VHDL code for synthesizing the FPGA can be generated using a modeling environment other than Simulink and HDL Coder.
- The SACC concept is versatile and can be applied to different systems regardless of the digital modulation scheme or encoding used, including those beyond BPSK or QPSK with convolutional encoding.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A system for coherent combining of signals transmitted from nodes arranged in a swarm, comprising:

a Swarm Array Coherent Combining (SACC) system configured for Destination-Based Arraying (DBA) of a plurality of individual signals transmitted from a plurality of nodes arranged in a swarm, said SACC system including:

a destination receiver, and a RF Link (RFL) operatively coupled between said plurality of nodes and said destination receiver, said RFL supporting transmission of said plurality of individual signals from said plurality of nodes to said destination receiver over a plurality of node channels, each of said plurality of node channels being associated with a respective one of said plurality of nodes, said destination receiver being configured for processing of said plurality of individual signals transmitted from said plurality of nodes to said destination receiver to extract a phasing and timing of each individual signal of said plurality of individual signals for subsequent coherent combining of said plurality of individual signals transmitted by said plurality of nodes.

2. The system of claim 1, further including a Beacon signal structure incorporated in each individual signal at the beginning of the transmission from a respective node, wherein said RFL is configured to multiplex said plurality of individual signals transmitted from said plurality of nodes to obtain multiplexed individual signals, and wherein said destination receiver is configured to demultiplex said multiplexed individual signals and to individually process each demultiplexed individual signal received at said destination receiver using said Beacon signal structure.

3. The system of claim 2, wherein said destination receiver further includes a closed-loop phase tracking subsystem operatively coupled to said each demultiplexed individual signal received at said destination receiver for continuous closed-loop phase tracking of said each demultiplexed individual signal, said closed-loop phase tracking being coordinated with said Beacon signal structure.

4. The system of claim 3, wherein said each individual signal is buried in noise and wherein said each individual signal is exposed to ongoing differential Doppler profile, said system further comprising a signal feedback/correlation sub-subsystem included in said destination receiver in operative coupling to said closed-loop phase tracking subsystem, said signal feedback/correlation sub-system being configured to extract said each individual signal from noise to enable said closed-loop carrier tracking sub-system of said each individual signal, thereby accounting for said ongoing differential Doppler profile.

5. The system of claim 4, wherein said each individual signal includes a Beacon signal structure and a Mission Data phase, wherein said Beacon signal structure is transmitted at a beginning of said Mission Data phase, wherein said Beacon signal structure is configured with a Preamble phase having a PN (Pseudo-Noise) code and low rate data, a Transition A phase following said Preamble phase, and a Transition B phase following said Transition A phase, wherein said destination receiver further includes a Beacon Demodulator (BD) Processing Sub-System configured to demodulate said Beacon signal structure by closed-loop tracking of said PN code and low rate data of said Preamble Phase of said Beacon signal structure to obtain an end time Tp of said Preamble Phase of said Beacon signal structure of said each individual signal, wherein at said end time Tp of said Preamble Phase, said plurality of individual signals are at baseband, thus being coherent and time synchronized for subsequent combining.

6. The system of claim 5, further comprising a plurality of delay buffers, wherein each delay buffer of said plurality thereof is associated with a respective node channel of said plurality thereof, wherein said destination receiver is further configured to store, subsequent to said end time Tp of said Preamble Phase of each said individual signal, incoming signal samples of said each individual signal in said delay buffer associated with said respective node channel until a receipt of said plurality of individual signals transmitted by said plurality of nodes and storing thereof in said plurality of delay buffers has been completed, and to process, in a coordinated fashion, contents of said plurality of delay buffers.

7. The system of claim 6, further including:

a plurality of SACC Channel Processor (SCP) incorporated in said destination receiver, each SCP corresponding to a respective one of said plurality of node channels, an Array Combiner Processing Sub-System operatively coupled to outputs of said plurality of SCPs, and a Swarm Demodulator (SD) Processing Sub-System operatively coupled to an output of said Array Combiner Processing Sub-System;

wherein, said each SCP of said GT receiver is configured to, subsequent to completing processing of said Preamble Phase and storing said incoming signal samples arriving after said Preamble Phase of said individual signals in said plurality of delay buffers, performing said Transition A phase processing by continuing said Beacon Signal demodulation by said closed-loop carrier tracking sub-system, and to send said tracked carriers of said plurality of node channels obtained in said Transition A phase to an input of said Array Combiner Processing Sub-System to obtain an Arrayed Combined Signal, and to send said Array Combined Signal from said output of said Array Combiner Processing Sub-System to an input of said SD Processing Sub-System.

8. The system of claim 7, wherein said SD Processing Sub-System is configured to process said Arrayed Combined Signal to generate a Recovered Swarm demodulated symbols, including a Recovered Mission Code and a Recovered Symbol Clock, and wherein said feedback/correlation subsystem is configured to feedback said Recovered Mission Code and Recovered Symbol Clock from said SD Processing Sub-System to said plurality of SCPs to correlate each individual signal's Mission Data phase for being extracted from noise and for tracking said each individual signal.

9. The system of claim 8, wherein said BD Processing Sub-System is further configured to process said respective individual signal, to detect said respective individual signal presence through acquisition of said PN code, and to demodulate said Preamble Phase of said respective individual signal for initiating the closed-loop phase tracking to be performed through said Preamble Phase, said Transition A and Transition B phases, and said Mission Data Phase.

10. The system of claim 9, wherein said signal feedback/correlation sub-system is operatively coupled between said BD Processing Sub-System, and wherein said signal feedback/correlation sub-system includes a Feedback Correlator (FC) Processing Sub-System operatively coupled to an output of said SD Processing Sub-System to receive therefrom said Recovered Mission Code Symbols and Recovered signal clock for correlation the Recovered Swarm Demodulated Symbols with delayed noisy node samples over duration of accumulation of N symbol, thus producing a correlation combined signal having a sufficient SNR (signal-to-noise ratio), and a Feedback Carrier Loop (FCL) Processing Sub-System operatively coupled to said FC Processing Sub-System to receive therefrom said correlation combined signal having SNR sufficient to drive the closed-loop carrier tracking of said each node's individual signal.

11. The system of claim 10, wherein said destination receiver further comprises:

a Front-End Phase Tuner (FT) operatively coupled between a Front end Receiver of said SCP and said FC/FCL Processing Sub-Systems, said FT Processing Sub-System being configured to mix each individual signal to create I and Q signals for a delay and feedback correlation at said FC Processing Sub-System prior to feedback carrier tracking at said FCL Processing Sub-System.

12. The system of claim 11, wherein said destination receiver further includes a SACC Integrated Receiver (S_IR) embedded in said each SCP of said plurality of SCPs, said SACC S_IR including a SACC destination receiver Executive Timer (ET) coupled to said plurality of SPC's, said SACC destination receiver ET being configured to monitor precise Mission Data phase start time for said each individual signal transmitted by said respective node in accordance to said end-time Tp and a predetermined duration of said Transition A at Transition B phases, and an Individual Channel Buffering Correction Sub-System operatively coupled to said SACC ET and between said Front-End Receiver and said Array Combiner Processing Sub-System, said Individual Channel Buffering Correction Sub-System being configured for up-front buffering, in accordance with notifications from said SACC destination receiver ET, to account for differential arrival time of said individual signals transmitted by said plurality of nodes.

13. The system of claim 12, further including a Polarity Stripping Processing Sub-System integrated with said SACC S_IR, said Polarity Stripping Processing Sub-System being configured to process said Combined Signal recovered at said output of said Array Combiner Processing Sub-System, and to make a decision on a polarity of said Mission Data in accordance with said Combined Signal by adding together a predetermined number of polarity-striped Mission Symbols to obtain an SNR equivalent that a single Preamble symbol provides for a successful tracking during the Beacon phase.

14. A method for coherent combining of signals transmitted from mobile nodes arranged in a swarm, comprising:

(A) establishing a swarm array coherent combining (SACC) system configured for Destination-Based Arraying (DBA) of signals transmitted from nodes arranged in a swarm, said SACC system including:

a destination receiver, and an RF Link (RFL) operatively coupled between a plurality of nodes and said destination receiver for conveying a plurality of individual signals over a plurality of node channels, each individual signal being transmitted by a respective node over a respective unit channel of said plurality of unit channels to said destination receiver;

(B) transmitting said plurality of individual signals in multiplexed fashion:

(C) receiving said multiplexed individual signals at said destination receiver; and (D) demultiplexing and processing each individual signal at said destination receiver to extract a phasing and timing of said each individual signal for subsequent coherent combining of said plurality of individual signals transmitted by said plurality of nodes.

15. The method of claim 14, wherein each individual signal is buried in noise and wherein each individual signal is exposed to ongoing differential Doppler profile, said method further including:

configuring said destination receiver with a closed-loop phase tracking sub-system operatively coupled to each demultiplexed individual signal for continuous closed-loop phase tracking of each individual signal, and a signal Feedback/Correlation Processing Sub-Subsystem included in said destination receiver in operative coupling to said closed-loop phase tracking sub-system, said signal Feedback/Correlation Processing Sub-System being configured to extract said each individual signal from noise to enable said closed-loop carrier tracking sub-system of said each individual signal, thereby accounting for said ongoing differential Doppler profile.

16. The method of claim 15, wherein said each individual signal includes a Beacon Signal and a Mission Data, said method further comprising:

in said step (B), transmitting said Beacon signal at a beginning of said Mission Data phase, wherein said Beacon signal includes a Preamble phase having a PN (Pseudo-Noise) code and low rate data, a Transition A phase following said Preamble phase, and Transition B phase following said Transition A phase, and in said step (D), starting said Beacon Signal demodulation by closed-loop tracking, at said GT receiver of said PN code and low rate data of said Preamble Phase of said Beacon Signal to obtain an end time Tp of said Preamble Phase of said Beacon signal of said each individual signal, wherein at said end time Tp of said Preamble Phase, said plurality of individual signals are at baseband, thus being coherent and time synchronized for subsequent combining.

17. The method of claim 16, further comprising:

in said step (A), inserting said each node channel with a respective delay buffer, and in said step (D), subsequent to said end time Tp of said Preamble Phase of each said individual signal, storing incoming signal samples of each individual signal in said respective delay buffer until a receipt of said plurality of individual signals transmitted by said plurality of nodes and storing thereof in said plurality of respective delay buffers have been completed, and processing in a coordinated fashion, contents of said plurality of respective delay buffers by said destination receiver.

18. The method of claim 17, further comprising:

in said step (A), configuring said destination receiver with a plurality of SACC Channel Processor (SCP), each SCP corresponding to a respective one of said plurality of node channels, operatively coupling an Array Combiner Processing Sub-System to an output of said each SCP, and operatively coupling a Swarm Demodulator (SD) Processing Sub-System to an output of said Array Combiner Processing Sub-System; and in said step (D), subsequent to completing the processing of said Preamble Phase and storing said individual signals in said respective delay buffers, performing said Transition A phase processing by continuing said Beacon Signal demodulation by continuous closed-loop carrier tracking, and sending said tracked carrier of said plurality of destination channels obtained in said Transition A phase to an input of said Array Combiner Processing Sub-System to obtain an Arrayed Combined Signal, and coupling said arrayed combined signal from said output of said Array Combiner Processing Sub-System to an input of said SD Processing Sub-System.

19. The method of claim 18, further comprising:

configuring said SD processing Sub-System to process said Arrayed Combined Signal and to generate a Recovered Swarm demodulated symbols, including a Recovered Mission Code and a Recovered Symbol Clock, and feedbacking said Recovered Mission Code and Recovered Symbol Clock to said plurality of SCPs to correlate each individual signal's Mission Data for being extracted from noise and for tracking said each individual signal channel.

20. The method of claim 19, further comprising:

in said step (A), configuring said GT receiver with a Beacon Demodulated (BD) Processing Sub-System operatively coupled between said Beacon Signal of a respective individual signal and said Array Combiner Processing Sub-System, and configuring said BD Processing Sub-System to process said respective individual signal, to detect said respective individual signal presence through said PN code acquisition, and to demodulate said Preamble Phase of said respective individual signal for initiating the closed-loop phase tracking to be performed through said Preamble Phase, said Transition A and Transition B phases, and said Mission Data Phase.

21. The method of claim 20, further comprising:

in said step (A), configuring said Feedback/Correlation Processing Sub-System with a Feedback Correlator (FC) Processing Sub-System operatively coupled to an input of said SD Processing Sub-System to receive therefrom said Recovered Mission Code Symbols and Recovered signal clock for correlation to produce a correlation combined signal having a sufficient SNR (signal-to-noise ratio), and a Feedback Carrier Loop (FCL) Processing Sub-System operatively coupled to said FC Processing Sub-System to receive therefrom said correlation combined signal having said SNR sufficient to drive the closed-loop carrier tracking of said each node's individual signal.

22. The method of claim 21, further comprising:

in said step (A) operatively coupling a Front-End Phase Tuner (FT) between a Front end Receiver of said SCP and said FC/FCL Processing Sub-Systems, said FT Processing Sub-System being configured to mix individual signals to create I and Q components thereof for a delay and feedback correlation at said FC Processing Sub-System prior to feedback carrier tracking at said FCL Processing Sub-System.

23. The method of claim 22, further comprising:

in step (A), operatively coupling SACC destination receiver Executive Timer (ET) to said plurality of SPC's, said SACC destination receiver ET being configured to monitor precise Mission Data phase start time for said each individual signal transmitted by said respective node in accordance to said end-time Tp and a predetermined duration of said Transition A at Transition B phases, and in said step (D), notifying said each SCP an amount of delay buffering needed prior to sending each processed individual signal from said respective delay buffer to said Array Combiner Processing Sub-System.

24. The method of claim 23, further comprising:

in said step (A), operatively coupling an Individual Channel Buffering Correction Sub-System to said SACC destination receiver ET and between said Front-End Receiver and said Array Combiner Processing Sub-System, and configuring said Individual Channel Buffering Correction Sub-System for upfront buffering, in accordance with notifications from said SACC destination receiver ET to account for differential arrival times of said individual signals transmitted by said plurality of nodes.

25. The method of claim 24, further comprising:

in said step (A), embedding a SACC Integrated Receiver (S_IR) in each SCP of said plurality of SCPs, integrating said SACC destination receiver ET, said Individual Channel Buffering Correction Sub-System and a Polarity Stripping Processing Sub-System in said SACC S_IR, and in said step (D), operating said SACC S_IR intermittently in Mode 1 corresponding to said Beacon Signal including said Preamble Phase and said Transition A and Transition B phases, and in Mode 2 corresponding to said Mission Data Phase, in said Mode 2, recovering said Arrayed Combined Signal at said output of said Array Combiner Processing Sub-System, and making a decision on a polarity of said Mission Data in accordance with said Arrayed Combined Signal by adding a predetermined number of polarity-striped Mission Symbols to obtain an SNR equivalent that a single Preamble symbol provides for a successful tracking during the Beacon phase.

26. The method of claim 25, further comprising:

in said step (A), coupling a Swarm Decoder Processing Sub-System to the output of said SD Processing Sub-System to decode said Recovered Mission Code Symbols and to output a Recovered Mission Data.

27. The method of claim 26, further comprising:

in said step (A), configuring said destination receiver with said Beacon Demodulator (BD) Processing Sub-System, a PN Acquisition sub-system operatively coupled to said Front-End Receiver of said GT receiver, a PN Tracking Processing Sub-System operatively coupled to said PN Acquisition Processing Sub-System, said Carrier Tracking Processing Sub-System operatively coupled said PN Tracking Processing Sub-System, and said Swarm Symbol Decoder Processing Sub-System operatively coupled to said SD Processing Sub-System.

28. The method of claim 27, further comprising:

in said step (D), operating said SACC S_IR in said Mode 1, wherein said PN Tracking Processing Sub-System operates to track PN code acquired by said PN Acquisition Processing Sub-System, and recover Preamble Data from said Beacon signal of said individual signal, despread the tracked PN code obtained by said PN Tracking Processing Sub-System, and submitting despread tracked PN code of said PN Tracking Processing Sub-System to said Carrier Tracking Processing Sub-System to eliminate carrier offset caused by differential Doppler profile.

29. The method of claim 25, wherein each said node includes a transponder, further comprising:

configuring a SACC Smallsat Relay System (SSRS) including a plurality of transponders uncoupled from each other, each transponder in said plurality thereof being configured to receive and transmit an individual signal, receiving a plurality of said individual signals from said transponders at said Front-End Receiver of said SACC system, demultiplexing said plurality of individual signals, processing each demultiplexed individual signal through a respective SACC Channel Processor and continuously closed-loop tracking of noise-dominated demultiplexed individual signals to obtain baseband and time-synchronized signals, combining said baseband and time-synchronized signals at said signal combiner to recover a high rate combined signal, and feedbacking said high rate combined signal to each said SCP, and extract said individual signals from noise.

* * * * *